US012594657B2

(12) United States Patent
Bush et al.

(10) Patent No.: US 12,594,657 B2
(45) Date of Patent: Apr. 7, 2026

(54) MULTI-HEADED POWER TOOL AND SYSTEMS FOR FASTENING HEADS THEREON

(71) Applicant: STANLEY BLACK & DECKER, INC., New Britain, CT (US)

(72) Inventors: Dennis A. Bush, Dillsburg, PA (US); James Batterden, Timonium, MD (US); Matthew Masison, Towson, MD (US); Lukas Purasson, Towson, MD (US); Joseph P. Kelleher, Parkville, MD (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/977,184

(22) Filed: Dec. 11, 2024

(65) Prior Publication Data

US 2025/0178176 A1 Jun. 5, 2025

Related U.S. Application Data

(63) Continuation-in-part of application No. 18/960,691, filed on Nov. 26, 2024.

(Continued)

(51) Int. Cl.
*B25F 3/00* (2006.01)
*B25F 5/02* (2006.01)

(52) U.S. Cl.
CPC . *B25F 3/00* (2013.01); *B25F 5/02* (2013.01)

(58) Field of Classification Search
None
See application file for complete search history.

(56) References Cited

U.S. PATENT DOCUMENTS

| | | | |
|---|---|---|---|
| 4,489,792 | A | 12/1984 | Fahim et al. |
| 4,784,542 | A | 11/1988 | Tack et al. |

(Continued)

FOREIGN PATENT DOCUMENTS

| | | | |
|---|---|---|---|
| CN | 204076204 | U | 1/2015 |
| CN | 204935583 | U | 1/2016 |

(Continued)

OTHER PUBLICATIONS

Patent Cooperation Treaty, International Search Report and Written Opinion issued in international patent application No. PCT/US2024/057531, mailed Mar. 11, 2025, pp. 1-28.

*Primary Examiner* — Eyamindae C Jallow
(74) *Attorney, Agent, or Firm* — Brake Hughes Bellermann LLP

(57) ABSTRACT

A power tool includes a head interface coupled to a forward end of an output shaft and a tool head element for engagement on the head interface. The tool head element has a housing including an input shaft configured to removably couple with the output shaft and a collar comprising locking elements. In embodiments, locking elements are biased inwardly towards the input shaft by biasing elements (springs). In others, magnet(s) and/or ball locking elements may be utilized. Upon attachment of the tool head element to the head interface, the tool head element may held by the provided elements (e.g., locking elements, biasing springs, magnets, balls) onto the head interface and a drive connection between the output shaft and input shaft is established. Thus, when a motor and transmission assembly of the tool is operated, the input shaft rotates with the output shaft about the axis and thus drives the tool head element.

15 Claims, 49 Drawing Sheets

Related U.S. Application Data

(60) Provisional application No. 63/645,706, filed on May 10, 2024, provisional application No. 63/604,689, filed on Nov. 30, 2023.

(56) References Cited

U.S. PATENT DOCUMENTS

| | | | | | |
|---|---|---|---|---|---|
| 4,824,298 | A | 4/1989 | Lippacher et al. | | |
| 5,197,749 | A | 3/1993 | Moore et al. | | |
| 5,207,528 | A | 5/1993 | Ludwig | | |
| 5,409,243 | A | 4/1995 | Shadeck et al. | | |
| 5,658,193 | A | 8/1997 | Mccambridge | | |
| 5,711,380 | A | 1/1998 | Chen | | |
| 6,056,298 | A | 5/2000 | Williams | | |
| 7,051,568 | B2 | 5/2006 | Ciotti | | |
| 7,596,872 | B2 | 10/2009 | Clarke et al. | | |
| 7,712,746 | B2 | 5/2010 | Manschitz et al. | | |
| 7,806,636 | B2 | 10/2010 | Puzio | | |
| 8,201,835 | B2 | 6/2012 | Haas | | |
| 8,322,457 | B2 | 12/2012 | Mok et al. | | |
| 8,403,340 | B2 | 3/2013 | Valiani | | |
| 8,608,413 | B2 | 12/2013 | Miyanaga | | |
| 8,695,725 | B2 * | 4/2014 | Lau | B25F 5/02 | 173/171 |
| 8,770,898 | B2 | 7/2014 | Nordlin | | |
| 9,144,847 | B2 | 9/2015 | Tseng | | |
| 9,156,093 | B2 | 10/2015 | Meyers | | |
| 9,162,353 | B2 | 10/2015 | Ciotti | | |
| 9,346,096 | B2 | 5/2016 | Ziliani et al. | | |
| 9,364,942 | B2 | 6/2016 | Puzio et al. | | |
| 9,388,885 | B2 | 7/2016 | Hartranft et al. | | |
| 9,573,263 | B2 | 2/2017 | Bowles et al. | | |
| 9,579,782 | B2 | 2/2017 | Tussing | | |
| 9,718,135 | B2 | 8/2017 | Schenk | | |
| 9,751,176 | B2 | 9/2017 | Mcroberts et al. | | |
| 9,764,452 | B2 | 9/2017 | Koch | | |
| 10,011,008 | B2 | 7/2018 | Herr et al. | | |
| 10,265,816 | B2 | 4/2019 | Ebeling | | |
| 10,442,009 | B2 | 10/2019 | Sergyeyenko et al. | | |
| 10,722,949 | B2 | 7/2020 | Kreuzer | | |
| 10,800,015 | B2 | 10/2020 | Zhang | | |
| 11,034,002 | B2 * | 6/2021 | Gordon | B25B 23/0028 | |
| 11,130,243 | B2 | 9/2021 | Son | | |
| 11,426,850 | B2 | 8/2022 | Lefavour et al. | | |
| 11,453,108 | B2 | 9/2022 | Rubens et al. | | |
| 11,534,897 | B2 * | 12/2022 | Kaye, Jr. | B25B 23/0035 | |
| 2001/0023525 | A1 | 9/2001 | Driessen | | |
| 2002/0020972 | A1 | 2/2002 | Yaksich | | |
| 2002/0192043 | A1 | 12/2002 | Lin | | |
| 2008/0136125 | A1 | 6/2008 | Hirt et al. | | |
| 2010/0108338 | A1 | 5/2010 | Hirt | | |
| 2010/0281695 | A1 | 11/2010 | Nie | | |
| 2011/0127731 | A1 | 6/2011 | Woecht et al. | | |
| 2011/0233878 | A1 | 9/2011 | Wan et al. | | |
| 2011/0272172 | A1 | 11/2011 | Lau et al. | | |
| 2011/0309589 | A1 | 12/2011 | Maras | | |
| 2012/0024556 | A1 | 2/2012 | Zhu | | |
| 2012/0319398 | A1 | 12/2012 | Schweizer et al. | | |
| 2013/0093142 | A1 | 4/2013 | Saur et al. | | |
| 2013/0093149 | A1 | 4/2013 | Saur et al. | | |
| 2013/0228355 | A1 * | 9/2013 | Kuehne | B25F 5/02 | 173/29 |
| 2013/0237367 | A1 | 9/2013 | Roehm | | |
| 2013/0333907 | A1 | 12/2013 | Hecht et al. | | |
| 2014/0020919 | A1 | 1/2014 | Dvorak et al. | | |
| 2014/0131958 | A1 | 5/2014 | Roehm et al. | | |
| 2014/0131959 | A1 | 5/2014 | Tussing | | |
| 2014/0133898 | A1 | 5/2014 | Tussing | | |
| 2014/0182873 | A1 | 7/2014 | Fankhauser et al. | | |
| 2014/0346744 | A1 * | 11/2014 | Herr | B25D 17/00 | 279/144 |
| 2014/0367928 | A1 | 12/2014 | Yew et al. | | |
| 2015/0040341 | A1 | 2/2015 | Wiedemann et al. | | |
| 2015/0090471 | A1 | 4/2015 | Tao | | |
| 2015/0115550 | A1 | 4/2015 | Schenk et al. | | |
| 2015/0115554 | A1 | 4/2015 | Tussing | | |
| 2015/0174752 | A1 * | 6/2015 | Lu | F16D 1/116 | 279/9.1 |
| 2015/0209945 | A1 | 7/2015 | Ulrich et al. | | |
| 2015/0266170 | A1 | 9/2015 | Weller | | |
| 2015/0314375 | A1 | 11/2015 | Schenk | | |
| 2015/0321305 | A1 | 11/2015 | Saur et al. | | |
| 2015/0343583 | A1 * | 12/2015 | McRoberts | B23Q 5/045 | 173/213 |
| 2016/0082583 | A1 | 3/2016 | Sergyeyenko et al. | | |
| 2016/0158929 | A1 | 6/2016 | Brennenstuhl et al. | | |
| 2016/0227694 | A1 * | 8/2016 | Bermudez | A01G 3/062 | |
| 2016/0303729 | A1 | 10/2016 | Blum et al. | | |
| 2016/0346911 | A1 | 12/2016 | Blum et al. | | |
| 2017/0028543 | A1 | 2/2017 | Chen et al. | | |
| 2018/0029214 | A1 | 2/2018 | Brennenstuhl et al. | | |
| 2018/0272516 | A1 | 9/2018 | Hecht et al. | | |
| 2018/0345475 | A1 | 12/2018 | Qian | | |
| 2018/0361556 | A1 | 12/2018 | Junkersdorf et al. | | |
| 2018/0370009 | A1 | 12/2018 | Junkersdorf et al. | | |
| 2019/0015963 | A1 | 1/2019 | Moylan et al. | | |
| 2019/0160639 | A1 | 5/2019 | Lefavour et al. | | |
| 2019/0184528 | A1 | 6/2019 | Herr et al. | | |
| 2019/0217400 | A1 | 7/2019 | Ding et al. | | |
| 2019/0217459 | A1 | 7/2019 | Gregorich et al. | | |
| 2019/0291247 | A1 | 9/2019 | Gordon et al. | | |
| 2019/0308309 | A1 * | 10/2019 | Gregorich | B23B 45/003 | |
| 2019/0329394 | A1 | 10/2019 | Fielitz et al. | | |
| 2019/0329395 | A1 | 10/2019 | Fielitz et al. | | |
| 2019/0329396 | A1 | 10/2019 | Fielitz | | |
| 2019/0389046 | A1 | 12/2019 | Crowell et al. | | |
| 2020/0180090 | A1 | 6/2020 | Fehrenbacher et al. | | |
| 2020/0230795 | A1 | 7/2020 | Carlson et al. | | |
| 2020/0384625 | A1 | 12/2020 | Zugen et al. | | |
| 2021/0039241 | A1 * | 2/2021 | Baumann | B25F 3/00 | |
| 2021/0101235 | A1 | 4/2021 | Schneider | | |
| 2021/0138617 | A1 | 5/2021 | Czirjak et al. | | |
| 2021/0169211 | A1 | 6/2021 | Rubens et al. | | |
| 2021/0252680 | A1 | 8/2021 | Herr et al. | | |
| 2022/0023957 | A1 | 1/2022 | Botello | | |
| 2022/0032414 | A1 | 2/2022 | Galli et al. | | |
| 2022/0143858 | A1 | 5/2022 | Moss et al. | | |
| 2022/0297205 | A1 | 9/2022 | Sanogo et al. | | |
| 2022/0331942 | A1 | 10/2022 | Lourenco et al. | | |
| 2023/0108174 | A1 | 4/2023 | Li et al. | | |

FOREIGN PATENT DOCUMENTS

| | | | |
|---|---|---|---|
| CN | 206048102 | U | 3/2017 |
| CN | 206732937 | U | 12/2017 |
| CN | 209021994 | U | 6/2019 |
| CN | 111230813 | A | 6/2020 |
| CN | 210909152 | U | 7/2020 |
| CN | 113001476 | A | 6/2021 |
| CN | 215393693 | U | 1/2022 |
| DE | 4019727 | A1 | 2/1992 |
| DE | 4105515 | A1 | 8/1992 |
| DE | 19621610 | A1 | 12/1997 |
| DE | 19818148 | A1 | 10/1999 |
| DE | 10109956 | | 11/2001 |
| DE | 102007036312 | A1 | 2/2009 |
| DE | 202009014717 | U1 | 1/2010 |
| DE | 202010005370 | U1 | 8/2010 |
| DE | 102009034964 | A1 | 3/2011 |
| DE | 202011051408 | U1 | 12/2011 |
| DE | 102012220835 | A1 | 5/2014 |
| DE | 102012220905 | A1 | 5/2014 |
| DE | 202013100891 | U1 | 6/2014 |
| DE | 202013008724 | U1 | 1/2015 |
| DE | 102014207713 | A1 | 10/2015 |
| DE | 102015204806 | A1 | 12/2015 |
| DE | 202016102081 | U1 | 5/2016 |
| DE | 102015200826 | A1 | 7/2016 |
| DE | 102015200828 | A1 | 7/2016 |
| DE | 102015200831 | A1 | 7/2016 |
| DE | 202016104002 | U1 | 8/2016 |
| DE | 102015206622 | A1 | 10/2016 |
| DE | 102016104075 | A1 | 9/2017 |
| DE | 202018103045 | U1 | 6/2018 |

(56) References Cited

FOREIGN PATENT DOCUMENTS

| | | | | |
|---|---|---|---|---|
| DE | 102014112288 | B4 | 10/2018 | |
| DE | 102017004200 | A1 | 10/2018 | |
| DE | 102017222832 | A1 | 6/2019 | |
| DE | 102017222862 | A1 | 6/2019 | |
| DE | 102018219934 | A1 | 6/2019 | |
| DE | 102019131292 | A1 | 5/2021 | |
| EP | 0734296 | A1 | 12/1993 | |
| EP | 1084798 | A2 | 3/2001 | |
| EP | 1236538 | A2 | 9/2002 | |
| EP | 1375080 | A2 | 1/2004 | |
| EP | 1391269 | A2 | 2/2004 | |
| EP | 1749620 | A1 | 2/2007 | |
| EP | 1941973 | A2 | 7/2008 | |
| EP | 2363246 | A2 | 9/2011 | |
| EP | 2383076 | A2 | 11/2011 | |
| EP | 2949431 | A1 * | 12/2015 | ................ B25F 3/00 |
| EP | 3005495 | A1 | 4/2016 | |
| EP | 3053708 | A1 | 8/2016 | |
| EP | 2803449 | B1 | 4/2017 | |
| EP | 3153280 | A1 | 4/2017 | |
| EP | 3168005 | A1 | 5/2017 | |
| EP | 3178613 | A1 | 6/2017 | |
| EP | 2822715 | B1 | 12/2017 | |
| EP | 2732956 | B1 | 9/2018 | |
| EP | 3418000 | A1 | 12/2018 | |
| EP | 3587034 | B1 | 1/2020 | |
| EP | 3616847 | A1 | 3/2020 | |
| EP | 3651714 | A1 | 5/2020 | |
| EP | 3539725 | B1 | 2/2021 | |
| EP | 3939727 | B1 | 11/2022 | |
| GB | 2375981 | A | 12/2002 | |
| WO | 2011104105 | A1 | 9/2011 | |
| WO | 2013057180 | A1 | 4/2013 | |
| WO | 2017001423 | A1 | 1/2017 | |
| WO | 2018/114592 | A1 | 6/2018 | |
| WO | 2019/115302 | A1 | 6/2019 | |
| WO | 2019/115305 | A1 | 6/2019 | |
| WO | 2020/221722 | A1 | 11/2020 | |
| WO | 2020/229363 | A1 | 11/2020 | |

* cited by examiner

MULTI-HEADED POWER TOOL AND SYSTEMS FOR FASTENING HEADS THEREON

CROSS REFERENCE TO RELATED APPLICATION(S)

This application is a continuation-in-part of U.S. patent application Ser. No. 18/960,691, filed Nov. 26, 2024, which claims priority to U.S. Provisional Patent Application Ser. No. 63/645,706, filed May 10, 2024 and U.S. Provisional Patent Application Ser. No. 63/604,689, filed Nov. 30, 2023, all contents of each of which are hereby incorporated by reference in their entirety.

BACKGROUND

Field

This disclosure relates, in general, to the field of power tools. In particular, the present disclosure is related to improvements for attaching multiple heads to a base power tool.

Description of Related Art

Power tools with removable chucks and/or tool heads are generally known. However, the devices used to connect the chucks/tool heads tend to require multiple steps for a user to assemble each tool head therein. For example, alignment, rotation, and adjustment—are typically required for applying the chucks and/or tool heads to known tools. Further, while ball bearings and compression springs are examples of known mechanical devices attachment of tool heads, such devices sometimes fail to be user friendly.

Connections and ease of use may be improved.

SUMMARY

It is an aspect of this disclosure to provide a power tool that includes: a housing; a motor and transmission assembly received in the housing; a trigger for activating the motor and transmission assembly; an output shaft driven by the motor and transmission assembly via a back end thereof for rotation about an axis; a head interface coupled to a forward end of the output shaft, the head interface including a mating surface; a tool head element configured for selective engagement on the head interface, the tool head element including: a housing including an input shaft configured to removably couple with the output shaft; and a collar having at least one locking element; wherein, upon attachment of the tool head element to the head interface, the at least one locking element is aligned onto the head interface and held by the at least one locking element to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

Another aspect provides a method of using the power tool noted above.

Other aspects, features, and advantages of the present disclosure will become apparent from the following detailed description, the accompanying drawings, and the appended claims.

BRIEF DESCRIPTION OF THE DRAWINGS

The drawings described herein are for illustrative purposes only of selected embodiments and not all possible implementations, and are not intended to limit the scope of the present disclosure.

DETAILED DESCRIPTION

As evident by the drawings and below description, this disclosure relates to a quick and secure way of attaching multiple tool heads (or chucks) to a base power tool or main body. As will be described, the disclosed tool heads are designed such that no action is needed from the user for assembling tool head(s) other than pushing the tool head onto the base unit. To remove or change the tool head, a collar is pulled and the tool head is removed. The disclosed embodiments provide examples of structures that radially and axially constrain variable application heads onto the main body or base of a multi-use power tool, independent of torque transfer.

These and other features and advantageous effects are evident by the details below.

Figure 1:
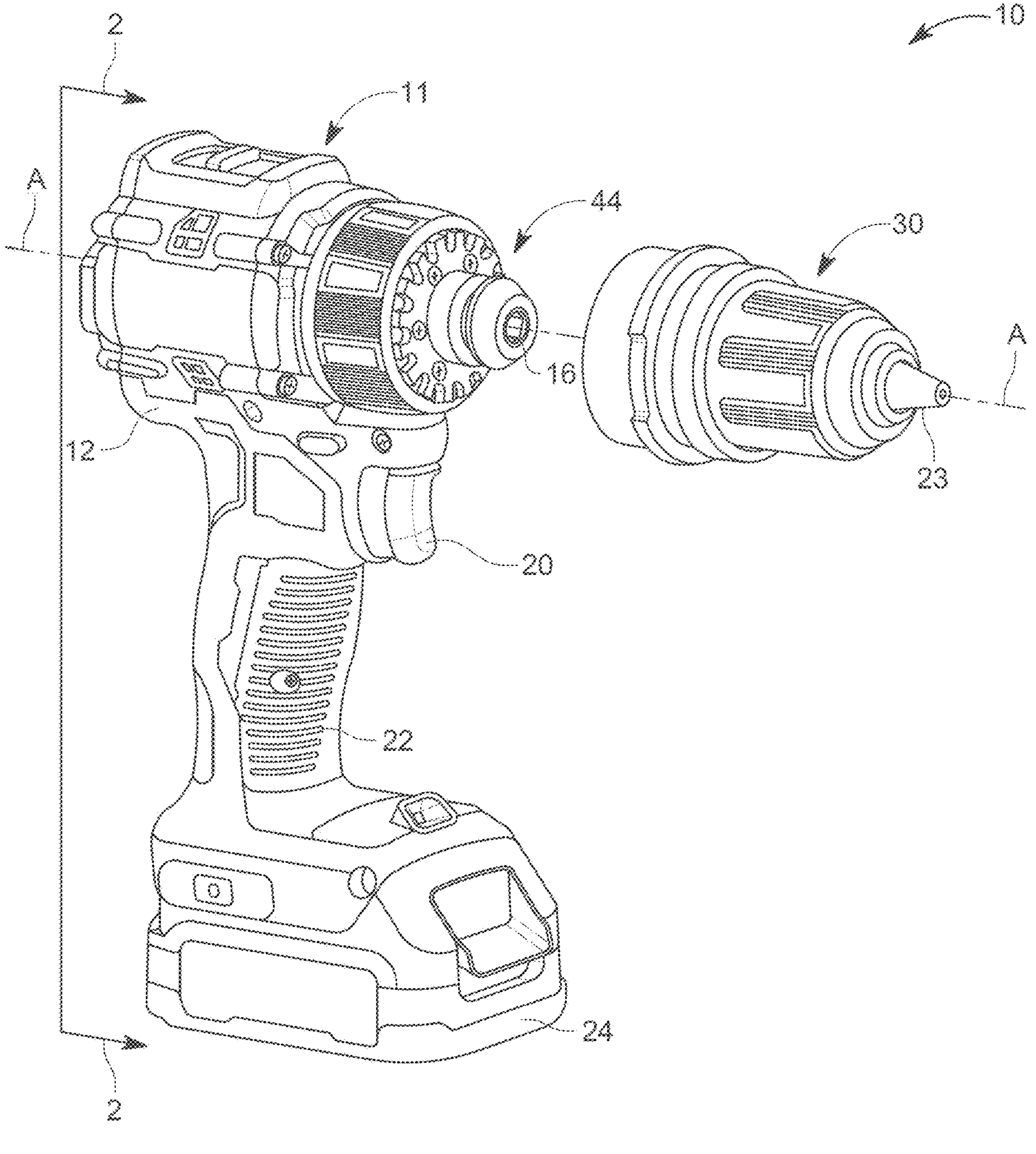
FIG. 1 shows an exploded view from a front angle of a power tool with a tool head assembly in accordance with an embodiment of the disclosure.
Figure 2:
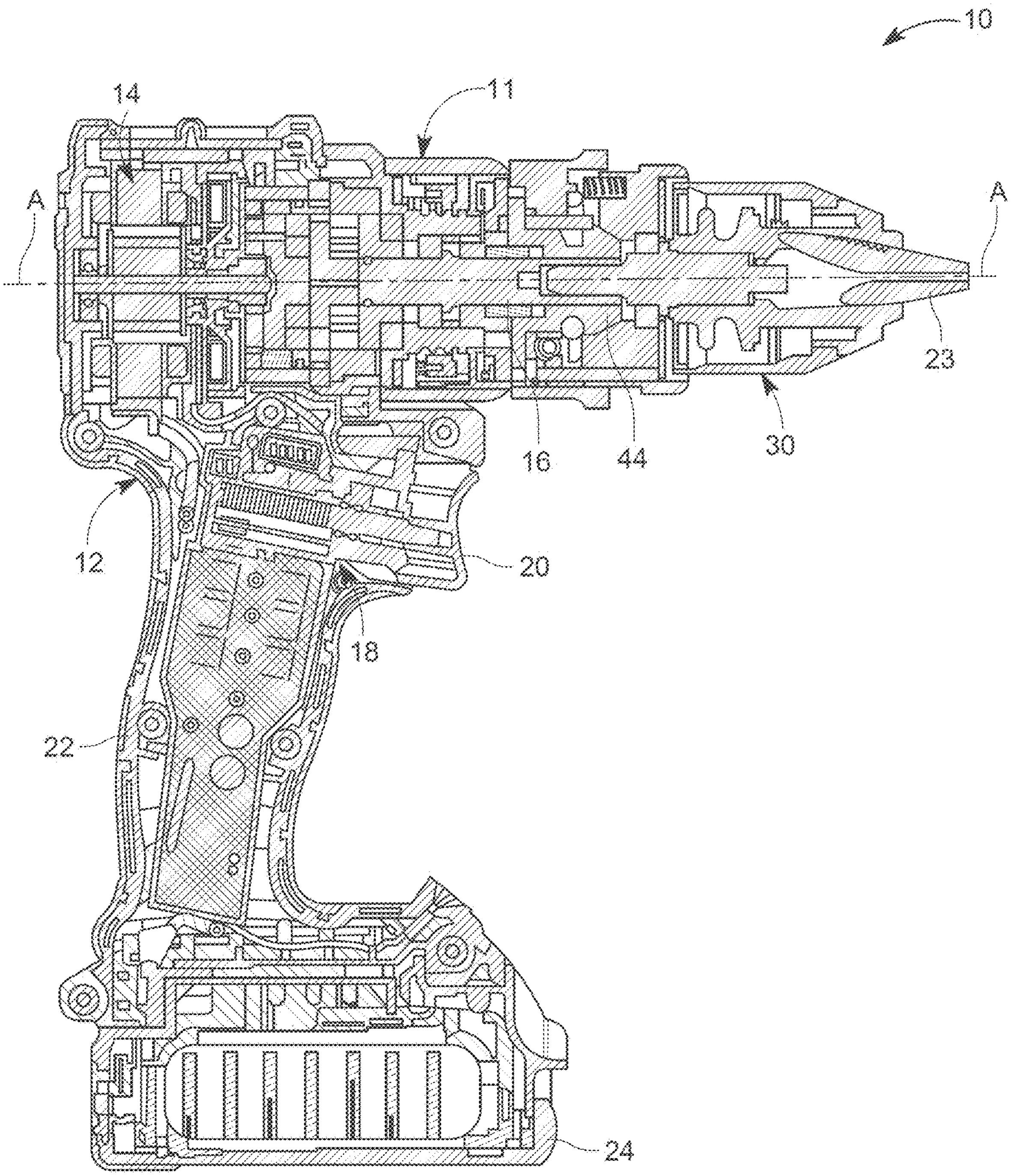
FIG. 2 shows a cross-sectional view through line 2-2 of the power tool of FIG. 1 upon assembly, in accordance with an embodiment.
Figure 3:
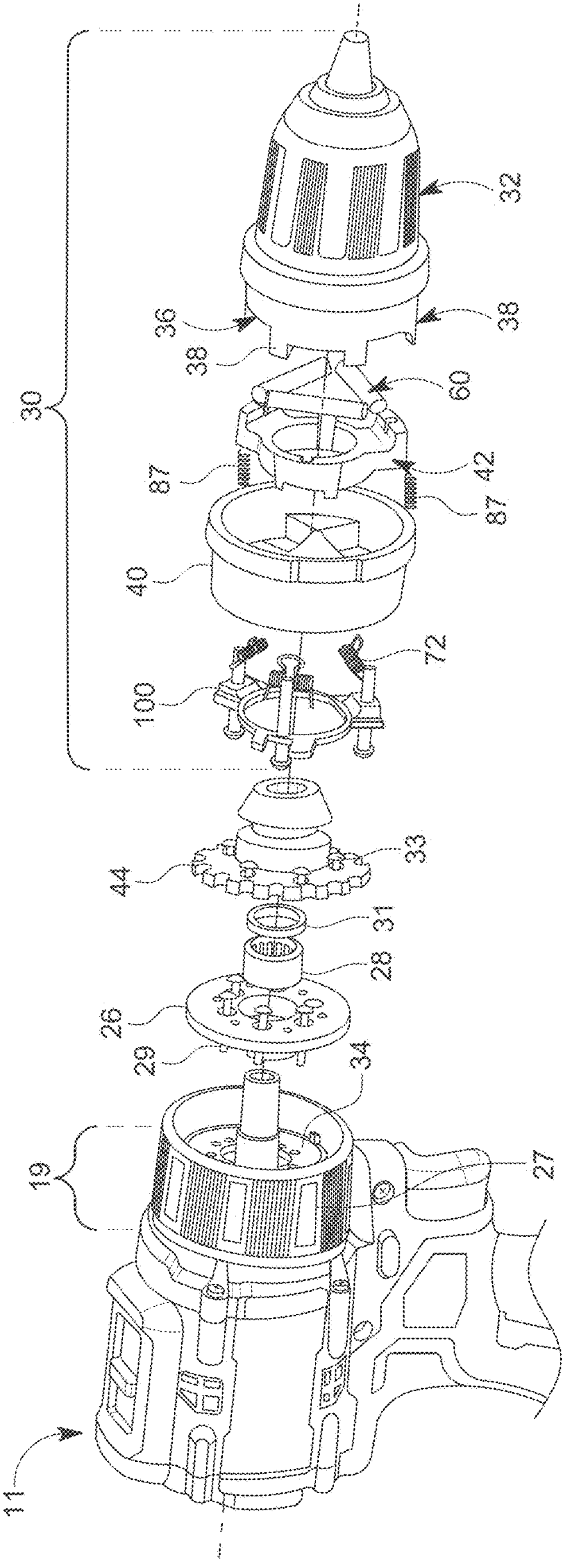
FIG. 3 shows an exploded view from a front angle of parts of the power tool and a tool head assembly in accordance with an embodiment.

With reference to FIGS. 1-3 of the drawings, a power tool 10 is constructed in accordance with the teachings of the present disclosure. As those skilled in the art will appreciate, the power tool 10 may be either a corded (e.g., AC powered) or cordless (e.g., DC battery operated) device. In an embodiment, the power tool 10 is a portable device. In embodiments, the power tool 10 may be a drill, a screwdriver, impact driver, driver or hammer drill, or other power tool, as determined by the attached end effector, or tool head element 30. As will be described, the tool 10 includes a main body portion 11 that is configured to receive multiple types of tool heads, chucks, or end effectors, each generally referred to herein and throughout this disclosure as a "tool head element," 30, which is described in greater detail later. Examples of such tool head elements include, but are not limited to, a standard chuck, a hammer chuck, a right angle tool head, offset and/or quick release bit holder designs, which are designed to attach to a base unit or housing, for example. The tool head elements 30 may include a number of drill elements, for example. However, such examples of the type of tool head elements and tool attachments as described and/or shown in the illustrative embodiments of the Figures are not intended to be limiting. That is, the tool attachments shown in the Figures relate to rotary fastening, but are not limited to rotary fastening. Those skilled in the art understand that other types of features (besides fastening or drilling) may be utilized as part of a tool head element 30 that is attached to a base or main body 11 of a power tool 10. Each tool head element 30 includes a fastening system as described herein which includes a tool part housing 32 and a collar 40 (described in detail later).

Figure 44:
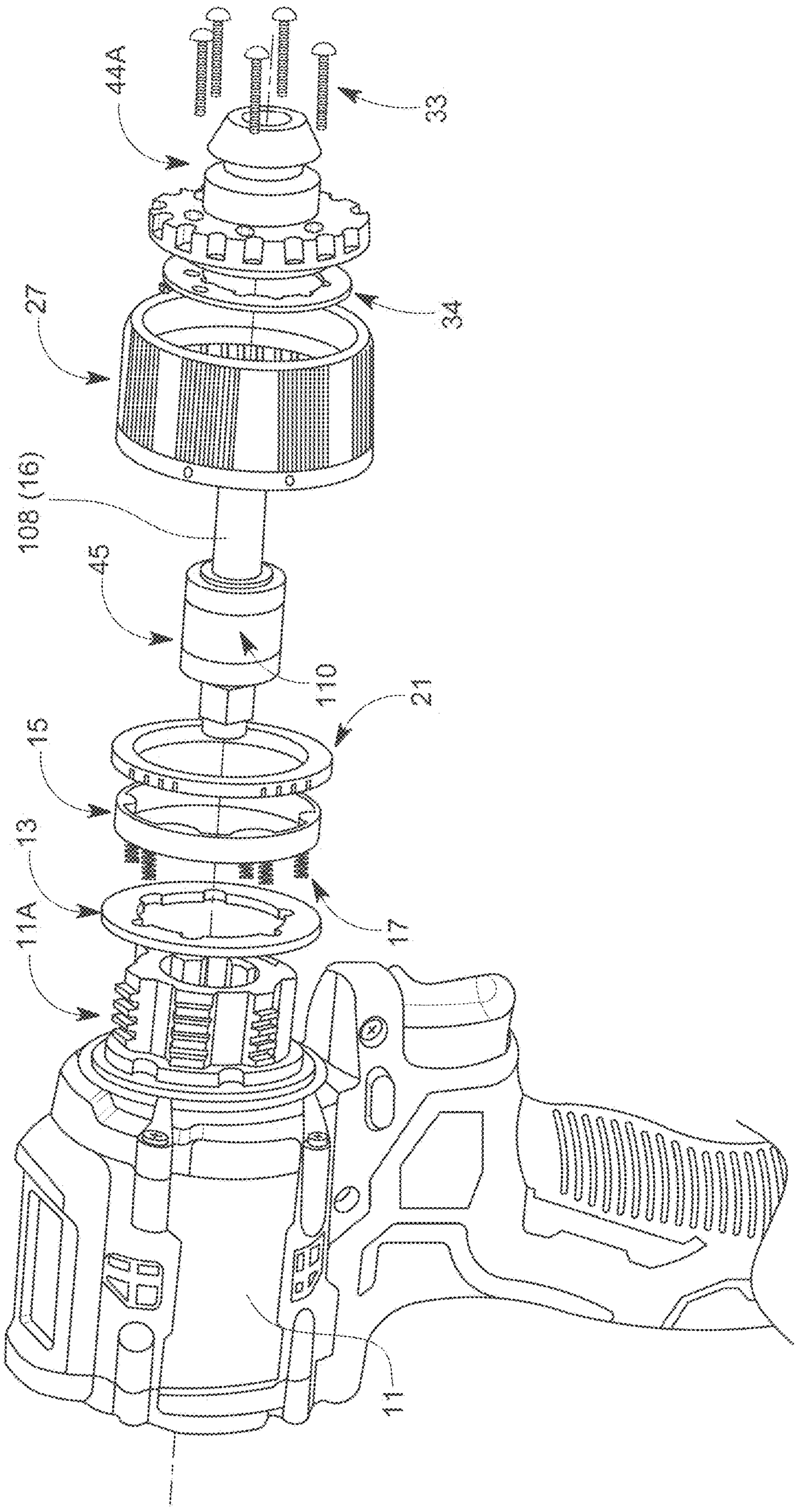
FIG. 44 shows an exploded view from a front angle of parts of the power tool and a tool head assembly with the spindle and bearings of FIG. 38 in accordance with another embodiment.
Figure 47:
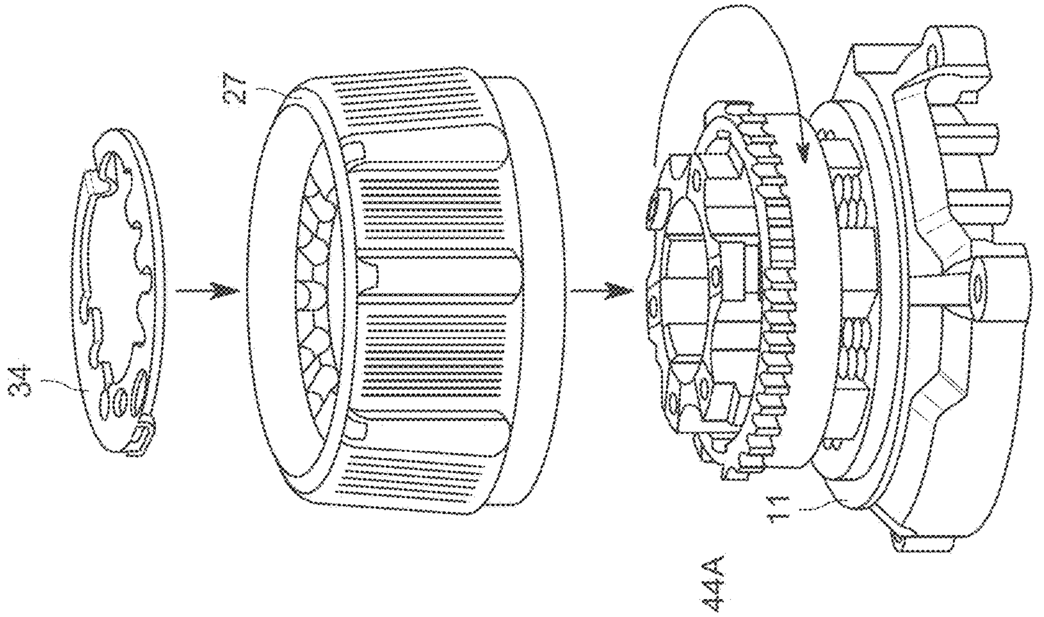

An exemplary power tool 10 is shown in FIGS. 1-2. In this non-limiting, illustrative embodiment, the power tool 10 has a main body portion 11 having a housing 12, a motor and transmission assembly 14, an output shaft 16 (or output spindle), a trigger assembly 18 with trigger button 20 on a handle 22, a clutch housing mechanism or arrangement 19, and a removable battery pack 24. The clutch housing arrangement 19 includes common or known parts as understood by those skilled in the art, such as shown and described with reference to FIG. 44. FIG. 44 shows an exploded view of the clutch housing arrangement 19, spindle and bearings arrangement 45, universal head interface 44 or 44A, and additional parts, according to an embodiment. For example, the clutch housing arrangement 19 may include a clutch washer 13, clutch spring holder 15, clutch springs 17, and a clutch nut 21 that are enclosed or surrounded by a clutch collar 27 on an extended clutch housing portion 11A of main body portion 11. Also shown in FIG. 44 is a detent plate 34, which is commonly used in clutch housing arrangement 19. The detent plate 34 is connected to the clutch collar 27 (see FIG. 3) and of the clutch housing arrangement 19 on the main body portion 11. Generally, in embodiments, the detent plate 34 includes a frame surrounding a central opening to accommodate insertion of parts therethrough. The detent plate 34 provides positions and feedback to a user when moving the clutch collar between different settings. The clutch housing arrangement 19 is assembled with the detent plate 34 attached to a front surface thereof, as shown in FIG. 47. Other devices, such as a spindle lock and the like are also known and not necessarily described. Those skilled in the art will understand that several of the components of main body portion 11 of power tool 10, such as the motor and transmission assembly 14, the trigger assembly 18 and the battery pack 24, are conventional in nature and need not be described in significant detail in this application.

The housing 12 may include a pair of clam shells or mating shells in the form of halves that cooperate to define a body, the handle 22 and a battery interface that may be configured to receive the battery pack 24. The handle 22 is configured to be coupled to the power source. In embodiments, the power source includes the battery pack 24, or, as previously mentioned, an AC power connection to receive power from an AC power source (not shown).

The trigger assembly 18 and the battery pack 24 are mechanically coupled to the handle 22 and are electrically coupled to the motor and transmission assembly 14 in a conventional manner that is not specifically shown but which is readily understood by and within the capabilities of a person of ordinary skill in the art. The trigger is designed for selectively activating the motor and transmission assembly 14, and thus use of an attached tool head element 30. In one embodiment, the power tool 10 includes other sources of power (e.g., alternating current (AC) power cord/cable, compressed air source and/or other sources of power) coupled to a distal end of the handle 22 (i.e., in place of the battery interface that receives the battery pack 24). In one embodiment, the trigger assembly 18 is a variable speed trigger. The trigger assembly 18 may be configured to be operatively coupled to the housing 12 for selectively actuating and controlling the speed of the motor, for example, by controlling a pulse width modulation (PWM) signal delivered to the motor. The handle 22 may be configured to house the trigger assembly 18 in a conventional manner, while the body can define a motor cavity into which the motor and transmission assembly 14 may be received. The housing 12 may be configured with an exterior gear case housing (not shown) that can be coupled to a front side of the body and configured to shroud or cover all or portions of the transmission assembly 14 and a clutch mechanism. In the particular example shown, however, the clam shell housing halves are configured to shroud or cover the motor and transmission assembly 14 and the clutch mechanism.

The motor and transmission assembly 14 may include a motor and an optional adapter plate. The motor of the motor and transmission assembly 14 is disposed/received in the housing 12 (such as seen in FIG. 2). The motor may be housed in a motor receiving portion or motor cavity of a drive train or a body portion of the housing 12. The motor may include a output motor shaft rotatable about an axis A-A, which extends into the transmission receiving portion of the drive train of the housing 12. The motor may be electrically coupled to the trigger assembly 18 and the battery pack 24, such that it selectively provide electric power to the motor and transmission assembly 14 in a manner that is generally well known in the art, so as to permit the user of the power tool 10 to control the speed and direction with which the rotatable output motor shaft rotates. The adapter plate may be fixedly coupled to an end of the motor. A motor pinion having a plurality of gear teeth may be coupled for rotation with the rotatable output motor shaft. The motor may be any type of motor, such as a brushless or electronically commutated motor, a DC electric motor, or a universal motor. As described herein and understood by those having skill in the art, the motor shaft is configured to transmit torque from the motor output shaft to an output member (e.g., an output shaft or output spindle) which in turn provides torque to an end effector or tool head element 30 (e.g., via a clutch assembly).

The transmission of the assembly 14 may comprise a transmission housing and a transmission. The transmission housing may be a hollow, generally tubular structure that is configured to house the transmission and portions of the clutch mechanism. The transmission housing may be received into the motor cavity and may engage the clam shell housing halves such that the transmission housing is axially fixed and non-rotatably engaged to the housing 12. In embodiments, the transmission may be a single speed transmission. In other embodiments, the transmission may include a multi-speed transmission having a number of gears and settings that allow the speed reduction through the transmission to be changed, in a manner well understood to a person of ordinary skill in the art. In embodiments, the transmission may be a planetary-type transmission having an input planetary stage and an output planetary stage that may be received in a central cavity of the transmission housing. It will be appreciated, however, that the power tool 10 is not limited to using a two-stage, single speed transmission; rather, the teachings of the present disclosure have application to other types of transmissions, including those that are operable in more than one speed ratio and/or those that comprise fewer or more than two planetary stages (i.e., a single stage planetary transmission or a transmission having at least one planetary stage disposed between the input and output planetary stages).

The power tool 10 may also include an output member 16 in the form of an output shaft or output spindle (see, e.g., 108) that is at least partially received in and rotatable (via activation of trigger button 20 and motor and transmission assembly 14) about axis A-A relative to the housing 12. The output member may be interchangeably referred to herein as output shaft 16.

Generally, the tool head element 30 of the power tool 10 is mounted to the output spindle 16 of the power tool 10. The tool head element 30 is operatively coupled to the housing 12 and is configured to perform an operation on a workpiece (not shown) via its associated work device. The associated work device of the tool head element 30 may be configured as a power tool accessory, such as a drill bit, an expansion bit, a screw driver bit, and/or other tool bits, according to non-limiting embodiments. The tool head element 30 may include a tool bit holder portion 23, such as chuck jaws, therein. In one embodiment, the tool head element 30 may be a keyless chuck, although it should be understood that the tool holder can have other tool holder configurations such as a quick release tool holder, a hex tool holder, or a keyed tool holder/chuck. The tool bit holder portion 23 may include an opening for receipt of a tool, such as a drill bit, or be a tool itself. As generally understood by those skilled in the art and thus not described in detail here, the tool head element 30 may be configured such that a portion thereof (e.g., tool part housing 32) is rotated to adjust a width of the opening of the tool bit holder portion 23 to receive and lock an associated tool therein, so that power and operation via trigger is applied to the tool head element 30 and its tool(s).

Figure 4:
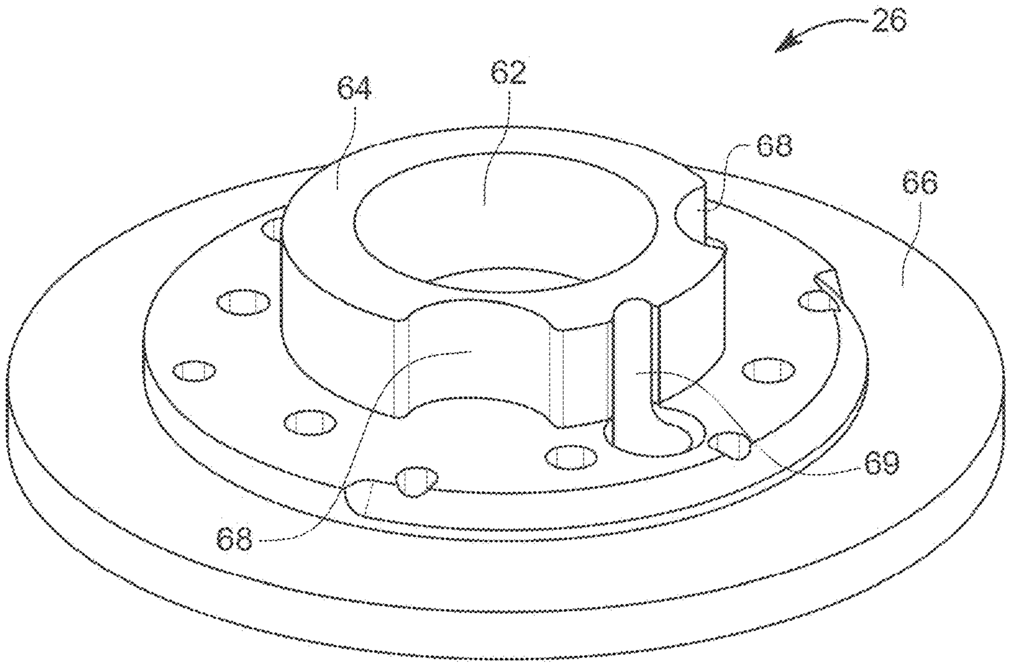
FIGS. 4-5 show a first isometric view and a second isometric view, respectively, of an adapter plate used in the power tool of FIG. 1 in accordance with an embodiment.
Figure 5:
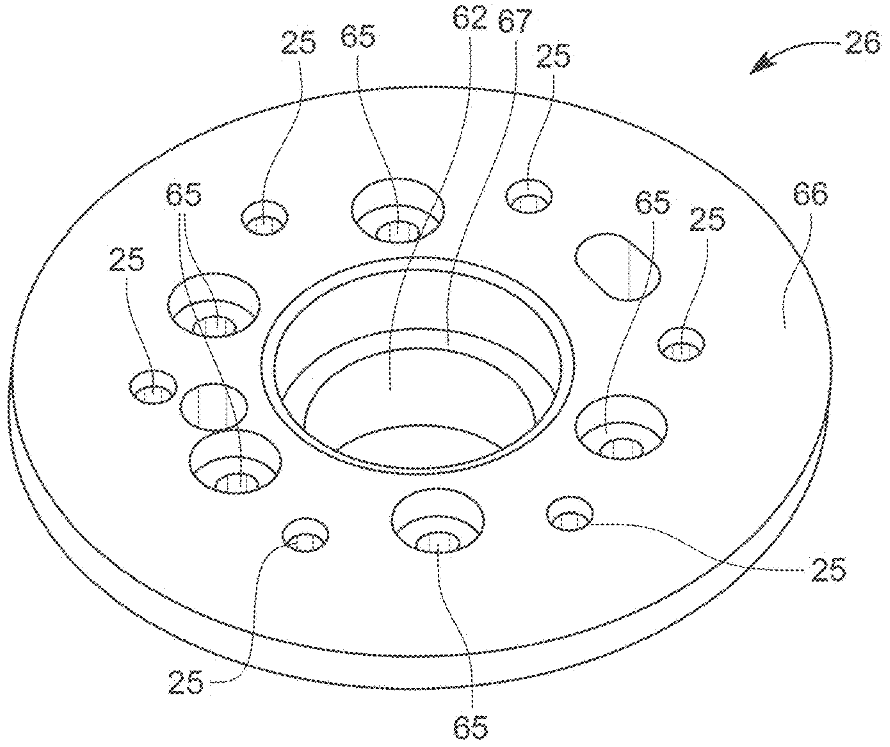

More specifically, each tool head element 30 is configured for attachment to the output shaft 16 via a universal head interface 44 or 44A that is, according to some embodiments, coupled to an adapter plate 26 on the main body portion 11. As shown in FIGS. 4-5, in embodiments, the adapter plate 26 includes a central opening 62 therein to accommodate a second end of the output shaft 16 therethrough. The first isometric view of FIG. 4 shows a back surface of the adapter plate 26, i.e., the surface that is placed against interface of the main body portion 11 for attachment thereto. The second isometric view of FIG. 5 shows a front surface of the adapter plate 26, i.e., a surface that is front or forward facing from the main body portion 11. According to embodiments herein, the adapter plate 26 includes a projection 64 surrounding the opening 62 which extends from a connection plate 66 or flange. An outer diameter of the connection plate 66 or flange may be based on a diameter or dimensions of an interface on the main body portion 11 to which the adapter plate 26 is connected (see, e.g., FIG. 3), in accordance with some embodiments herein. The projection 64 may have an outer diameter that is configured to interface with a clutch housing/mechanism. An inner diameter of the central opening 62 may be dimensioned or sized based on dimensions (e.g., diameter) of the output shaft 16; that is, the central opening 62 may be sized to allow rotation and clearance of the output shaft 16 therein. Further, relief portions 68 and 69 are provided in the projection 64 to provide clearance for a washer and clutch housing tab of the main body portion 11; that is, as one non-limiting example, such cutouts may be provided for clearance to a washer providing a detent function on the clutch. The relief portions 68, 69 may be concave such that they extend into an outer diameter of the projection 64, as shown in FIG. 4. The adapter plate 26 is connected to a front face or interface of the main body portion 11 via fasteners 29 or screws being placed through holes 65 (see FIG. 3 and FIG. 5) in the flange/connection plate 66 and secured to main body portion 11. Additional holes 25 are provided in the connection plate 66 for connection to the head interface 44, as described later below. As shown in FIG. 5, in embodiments, the back side of the projection 64 includes a detent 67 for accommodating a bearing (e.g., needle bearing 28 as shown in FIG. 3, or similar roller bearing) of the tool. The detent 67 may be sized or dimensioned to allow receipt of an outer diameter of the bearing and at least part (a first part) of a length of the bearing 28 therein. For assembly, then, the back surface of the adapter plate 26, i.e., the projection 64, is positioned to face the interface of the main body portion 11. The central opening 62 of the adapter plate 26 is aligned with the second end of the output shaft 16 and the shaft 16 pushed therethrough, such that the projection 64 is received within the clutch housing. Fasteners 29 or screws are used to secure the adapter plate 26. The front surface of the adapter plate 26 is then accessible such that bearing 28 may then be placed in the detent 67 and around the extending output shaft 16.

Figure 6:
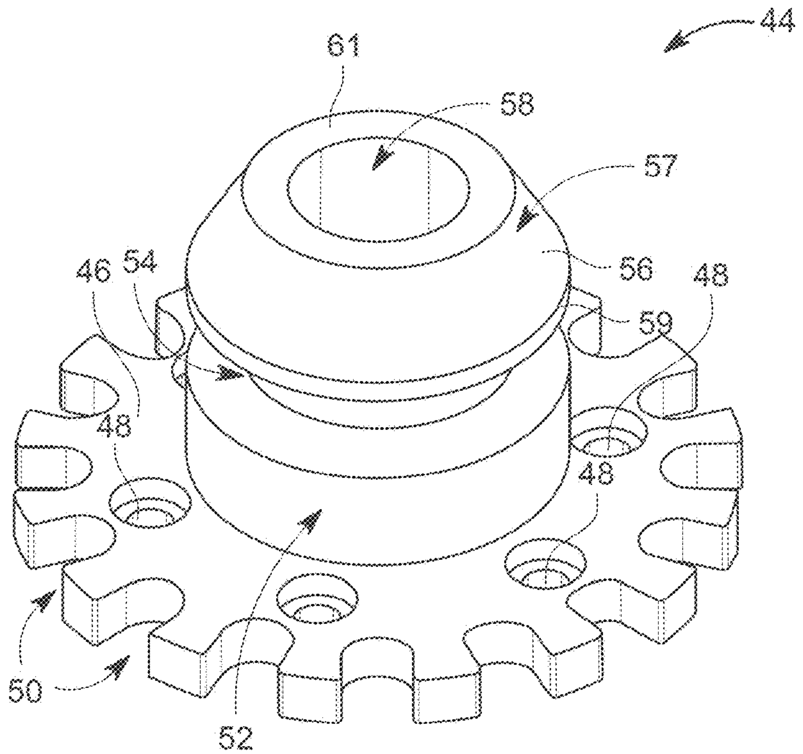
FIGS. 6, 7, and 8 show a first isometric view, a second isometric view, and a cross sectional view of a head interface used in the power tool in accordance with an embodiment.
Figure 7:
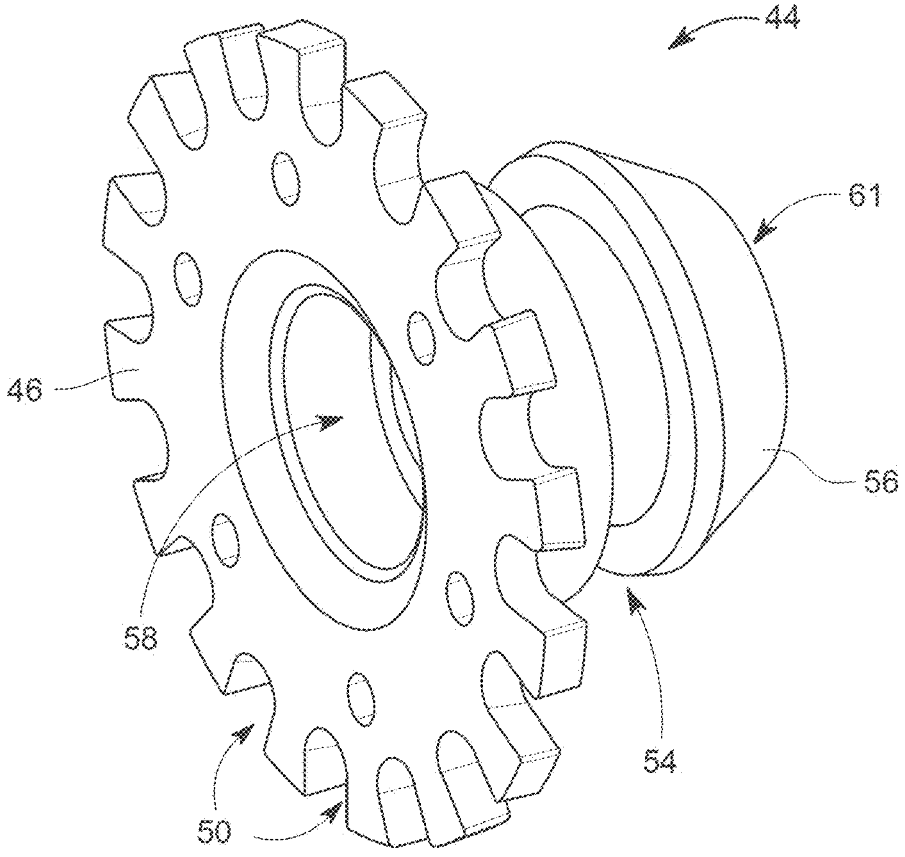
Figure 8:
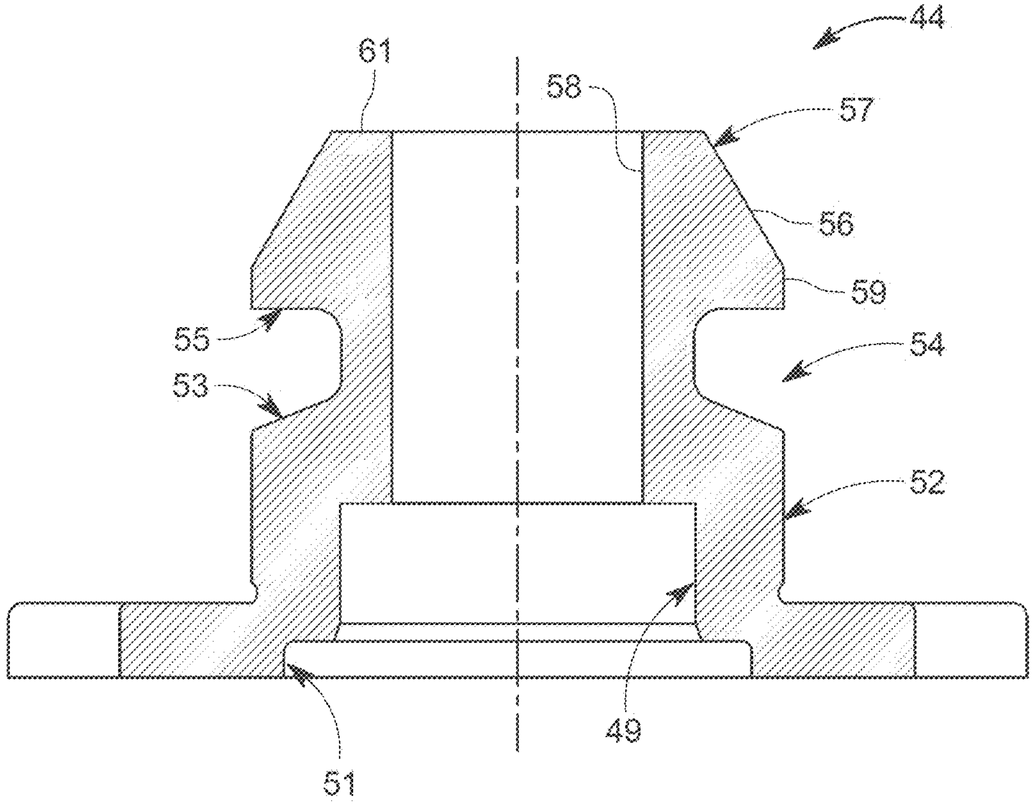

As noted, the adapter plate 26 may be used in some embodiments for connecting a universal head interface 44, such as shown in FIGS. 6-8, thereto. In the embodiment shown in FIGS. 6-8, the universal head interface 44 is designed to be placed around a portion of the output shaft 16 and connected to the adapter plate 26, with the bearing 28 and a seal 31 (see FIG. 3) therebetween.

Figure 38:
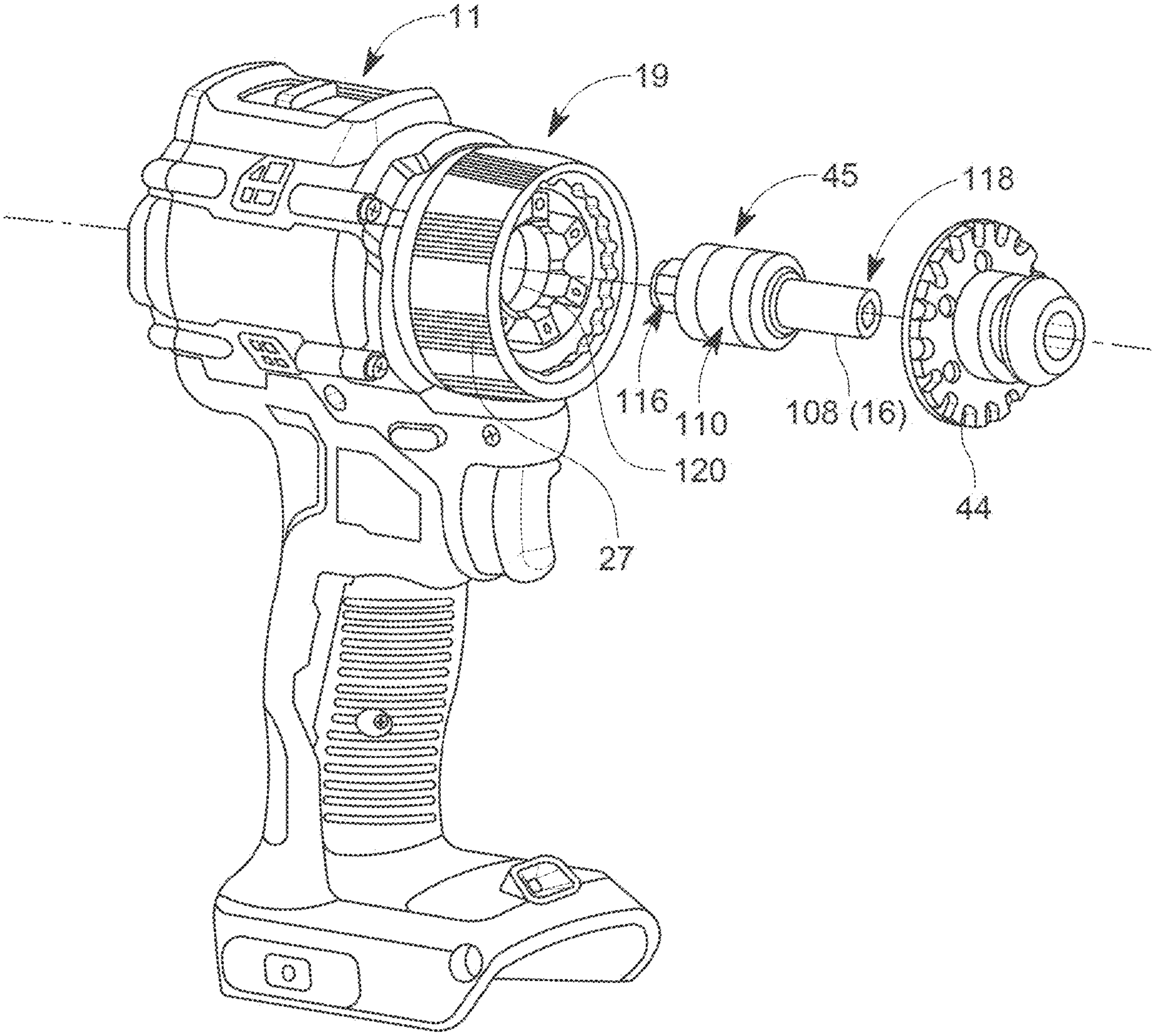
FIG. 38 shows a first isometric view of a spindle and bearings used in the power tool of FIG. 1 in accordance with an embodiment.
Figure 45:
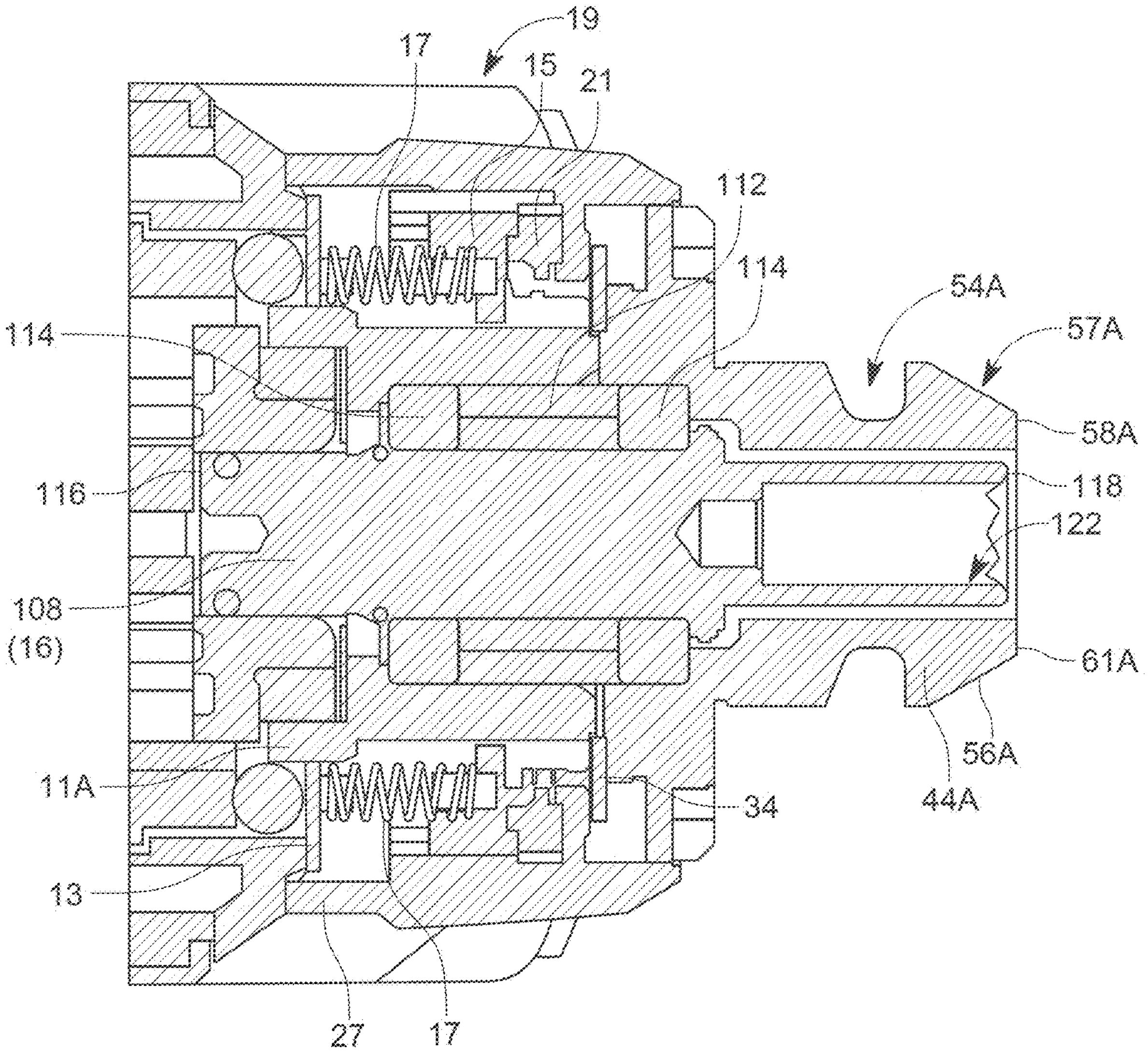
FIG. 45 shows a cross sectional view, in an axial direction, of an assembly of the parts of FIG. 38.

Alternatively, in another embodiment, a universal head interface 44A may be configured to attach to the main body portion 11 via a combination spindle and bearings arrangement, labeled as 45 as shown in FIGS. 38 and 44, for example. The output shaft 16 may be connected to the spindle and bearings arrangement 45, which is designed for insertion into an opening 120 (see FIG. 38) of the main body portion 11. That is, a first end of the output shaft 16 may be connected to the main body portion 11, while a second end of the output shaft 16 is used for attachment to/with the arrangement 45 and thus the universal head interface 44A (see FIG. 44). An outer diameter of the output shaft 16 and/or the portion (e.g., front end) of the spindle and bearings arrangement 45 may be based on a diameter or dimensions of an interface on the main body portion 11 and/or the universal head interface 44, in accordance with embodiments. FIG. 45 shows a cross sectional view, in an axial direction, of the universal head interface 44 secured and assembled to the main body portion 11 via the clutch housing arrangement 19.

The spindle and bearings arrangement 45 allows for tool head element(s) to be more directly tied to a spindle, output shaft 16, etc. for rotation and/or operation of its associate tool, using less parts and less dimensions (e.g., reduced stackup) by removing elements therefrom, while still maintaining the connection for operating.

In accordance with embodiments, the spindle and bearing arrangement 45 may include a spindle body 108 (i.e., the output member 16 that is at least partially received in and rotatable (via activation of trigger button 20 and motor and transmission assembly 14) about axis A-A relative to the housing 12, according to this particular embodiment) with a first end 116 and a second end 118, and a central opening therein that is sized to allow for clearance and insertion of the output shaft 16 placed therein. The first end 116 may be referred to as a back end, whereas the second end 118 may be referred to as a front end according to embodiments. The output shaft 16/spindle body 108 may be pushed through the central opening of a bearing set 110, for example, for rotation of the spindle body 108 along the axis. The bearing set 110 may be placed around the spindle body 108 as part of the arrangement 45. In an embodiment, the bearing set 110 is provided generally in a center of the spindle body 108, with ends 116 and 118 accessible on either side. As shown in FIG. 45, for example, in embodiments, the bearing set 110 includes one or more bearing spacers 112 flanked by spindle bearings 114 on either side. As noted previously, first end 116 of the arrangement 45 may be placed into the main body portion 11, through opening 120, such that the second end 118 is accessible via a front end of the tool 10. The second end 118 may include a receiving opening 122 therein, which is shown in FIG. 45, for example. The receiving opening 122 of spindle body 108 is accessible through a central bore 58A of the universal head interface 44A (see FIG. 39 and FIG. 41, and description below) when assembled, and is configured to receive an input shaft 70 of a tool head element 30 when the tool head element 30 is attached to the head interface 44A (which is described in detail later below with reference to FIGS. 9-10A). FIG. 44 shows an exemplary illustrated embodiment with the universal head interface 44A that designed for connection to clutch collar 27 (provided on main body portion 11) with detent plate 34 therebetween, with the universal head interface 44A configured to receive spindle and bearing arrangement 45 therein.

Figure 48:
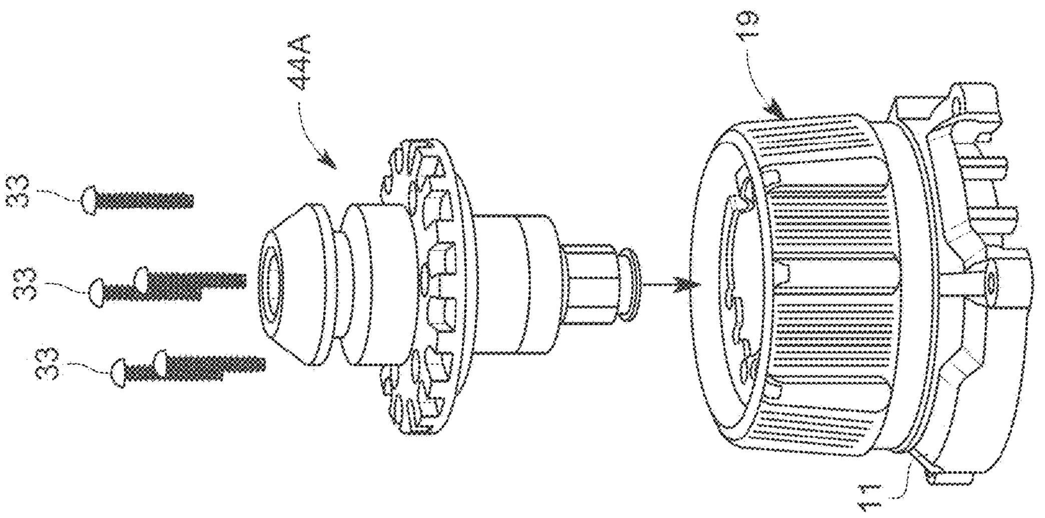
FIGS. 46-48 show a process of assembling and mounting the universal head interface to the tool using the spindle and bearings of FIGS. 38-40 in accordance with an embodiment.
Figure 46:
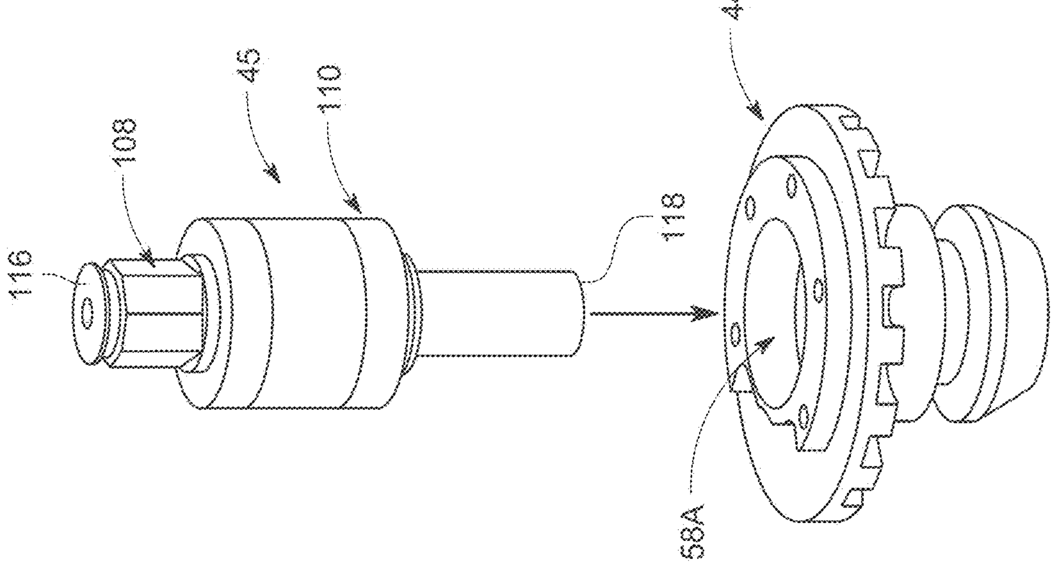

FIGS. 46-48 show a process of assembling and mounting the universal head interface 44A using the spindle and bearings arrangement 45 of FIGS. 38-45, in accordance with an embodiment. Generally, the spindle and bearings arrangement 45 is inserted into and at least partially through central bore 58A via a back of the universal head interface 44A, as shown in FIG. 46. The clutch housing arrangement 19 is assembled with the detent plate 34 attached to a front surface thereof, as known in the art and as shown in FIG. 47. The universal head interface 44 is coupled to the main body portion 11 via the spindle and bearings arrangement 45, wherein first end 116 of the spindle and bearings arrangement 45 is inserted and secured in the opening 120 for rotational attachment at the forward/first end of the output shaft 16/spindle body 108, as shown in FIG. 48. Second end 118 of the spindle and bearings arrangement 45 is configured for insertion into, and shown inserted through, the universal head interface 44A, such that opening 122 (for connecting parts of the tool head element 30) is accessible within the head interface 44A (described below).

The universal head interface 44 or 44A is designed to be placed around the output shaft 16, whether using the adapter plate 26 (and its related parts), or the spindle and bearings arrangement 45 (and its related parts) (i.e., the spindle body 108 being the output shaft 16).

In the embodiment utilizing adapter plate 26 (e.g., FIG. 3), the universal head interface 44 shown in FIGS. 6-8 may be implemented in the power tool 10. The first isometric view of FIG. 6 shows a front facing portion of the head interface 44, i.e., the portion that is used to connect and interact with the tool head element 30. The second isometric view of FIG. 7 shows a back surface (of flange 46) of the head interface 44. The back surface of the head interface 44 is a surface that is placed against the adapter plate 26 and used to connect the head interface 44 to the plate 26 and thus the clutch housing arrangement 19 and main body portion 11.

The cross-sectional view of FIG. 8 shows additional features of the head interface 44 in accordance with an embodiment.

The universal head interface 44 has a first end and a second end, with the central bore 58 extending therebetween. The first end has a flange 46 extending radially relative to the central bore 58 that is used for attachment to the main body portion 11, and the second end has a leading flat edge 61. An outer diameter of the flange 46 may be based on the outer diameter or dimensions of the adapter plate 26, in accordance with embodiments. In other embodiments, an outer diameter of the flange 46 may be based on the inner diameter or dimensions of the clutch housing arrangement 19/main body portion 11. The flange 46 has holes 48 for fasteners 33 (e.g., screws) which are aligned with corresponding holes 25 provided on the adapter plate 26 or provided on/through the detent plate 34 and into the main body portion 11. Flange 46 may be placed against the adapter plate 26 and the head interface 44 may be attached to the main body portion 11 via interface fasteners 33 or screws placed through the aligned holes 48 and 25 (see FIG. 3). Any number of fasteners or holes may be utilized for attachment of the universal head interface 44 and the number shown in the Figures is not intended to be limiting. As shown in FIGS. 6-7, flange 46 may include a number of receiving grooves 50 along a circumference or periphery thereof in accordance with embodiments herein. In another embodiment, the receiving grooves 50 may be provided on a front surface of the flange 46. Such receiving grooves 50 may be dimensioned and configured to receive corresponding teeth 78 or castellations of the collar 40 (described later). The leading edge 61 at the second end of the head interface 44 may be a flat surface extending radially from the bore 58.

To attach the universal head interface 44 to the main body portion 11, the central bore 58 or opening thereof is aligned with the output shaft 16 effectively extending through the adapter plate 26 and/or detent plate 34. That is, the second end of the output shaft 16 is inserted through an opening of the central bore 58 in the back surface of the head interface 44 (i.e., the opening on a back side of the flange 46, shown in FIG. 7).

The central bore 58 is configured to receive at least a portion of the output shaft 16 therein (see, e.g., FIGS. 1-2), according to embodiments, such that the shaft 16 extends towards the first end of the head interface 44 and at least a portion of the second end of the output shaft 16 is accessible through leading edge 61 and the bore 58. An inner diameter of the central bore 58 may be dimensioned or sized based on dimensions (e.g., diameter) of the output shaft 16 in an embodiment; that is, the central bore 58 may be sized to allow rotation and clearance of the output shaft 16 therein.

Further, as shown in FIG. 8, in embodiments, the central bore 58 may include notches 49 and 51. Notch 49 (or bore 49) is provided for accommodating seal 31 and bearing 28. Notch 51 (or bore 51) may be provided to engage a ball bearing for particular tool head element(s) 30, such as a right angle attachment. In embodiments, the notches 49 and 51 include stepped diameters that may gradually increase in size as compared to the diameter of the central bore 58. The size or dimension of the notch 49 may correspond to and accommodate a size of the seal 31. The notch 51 may be sized or dimensioned to allow receipt of an outer diameter of the bearing and at least a second part of a length (or remaining length) of the bearing 28 (e.g., that extends from or is not received in the adapter plate 26).

Between the flange 46 and leading edge 61 and surrounding central bore 58 of the head interface 44 are a number of interface surfaces for connection with tool head element 30, according to an exemplary embodiment. In embodiments, as shown FIG. 8, there may be a first interface portion 52 and a second interface portion 57, with a circumferential groove 54 therebetween, surrounding the bore 58. First interface portion 52 may extend axially from the flange 46 and towards the leading edge 61. First interface portion 52 may include an outer surface having an outer diameter, in accordance with embodiments herein. Second interface portion 57 acts as a piloting surface and may include, in accordance with embodiments herein, a mating surface 56 and an interfacing edge 59 that has an outer diameter. The outer diameter surface of first interface portion 52 and the interface edge 59 of the second interface portion 57 are configured to interfaces with a spring holder frame 42 (described with reference to FIGS. 16-17) and locking elements 60 when the tool head element 30 is attached to the main body portion 11. In embodiments, the outer diameters of the outer surface of first interface portion 52 and the edge 59 of the second interface portion 57 may be substantially equal or the same. In embodiments, the leading edge 61 has a smaller diameter than the interfacing edge 59.

The mating surface 56 of the head interface 44 assists in alignment and engagement of locking elements 60, which is understood by the description later below with reference to FIGS. 24-27, for example. Generally, during assembly, collar 40 remains relatively stationary. In embodiments, the mating surface 56 may include a chamfered surface that extends between leading edge 61 and the interfacing edge 59 and is positioned circumferentially around bore 58. More specifically, in one particular embodiment, the mating surface 56 is an angled surface that extends between a first diameter at the leading edge 61 and a second diameter at the interfacing edge 59. According to embodiments, the mating surface 56 is a tapered surface or cone shaped surface that tapers outwardly relative to the axis A-A. That is, the surface 56 tapers outwardly from the first diameter at the leading edge 61 of the front end to the second diameter of interfacing edge 59. In a non-limiting embodiment, the tapered surface is provided at an angle of about 30 degrees relative to the axis A-A.

However, the illustrated example of the mating surface 56 is not intended to be limiting in any way to a tapered surface. That is, in other embodiments, the mating surface 56 may include step or curve provided along the angled surface between the leading edge 61 and interfacing edge 59.

As shown in FIG. 8, for example, the circumferential groove 54 is provided axially behind the mating surface 56, or, as previously noted, between the first and second interface portions 52 and 57. The groove 54 is flanked by locking surfaces 53, 55 that are part of each interface portion 52, 57, respectively. Locking surfaces 53 and 55 are surfaces utilized for locking and securing locking elements 60 within the head interface 44, as discussed in greater detail later.

Turning now to the exemplary embodiment utilizing the spindle and bearings arrangement 45 (e.g., see FIG. 38 and FIG. 44) for connecting to the main body portion 11, universal head interface 44A may be provided in accordance with embodiments herein. An exemplary embodiment of universal head interface 44A is shown in FIGS. 38-41. For purposes of clarity and brevity, like elements and components throughout FIGS. 38-41 are labeled with similar designations and numbering (plus "A") as discussed with reference to FIGS. 6-8. Thus, although not discussed entirely in detail herein, one of ordinary skill in the art should understand that various features associated with FIGS. 6-8 are similar to those features previously discussed. Additionally, it should be understood that the features shown in each of the individual figures is not meant to be limited solely to the illustrated embodiments. That is, the features described throughout this disclosure may be interchanged and/or used with other embodiments than those they are shown and/or described with reference to.

Figure 39:
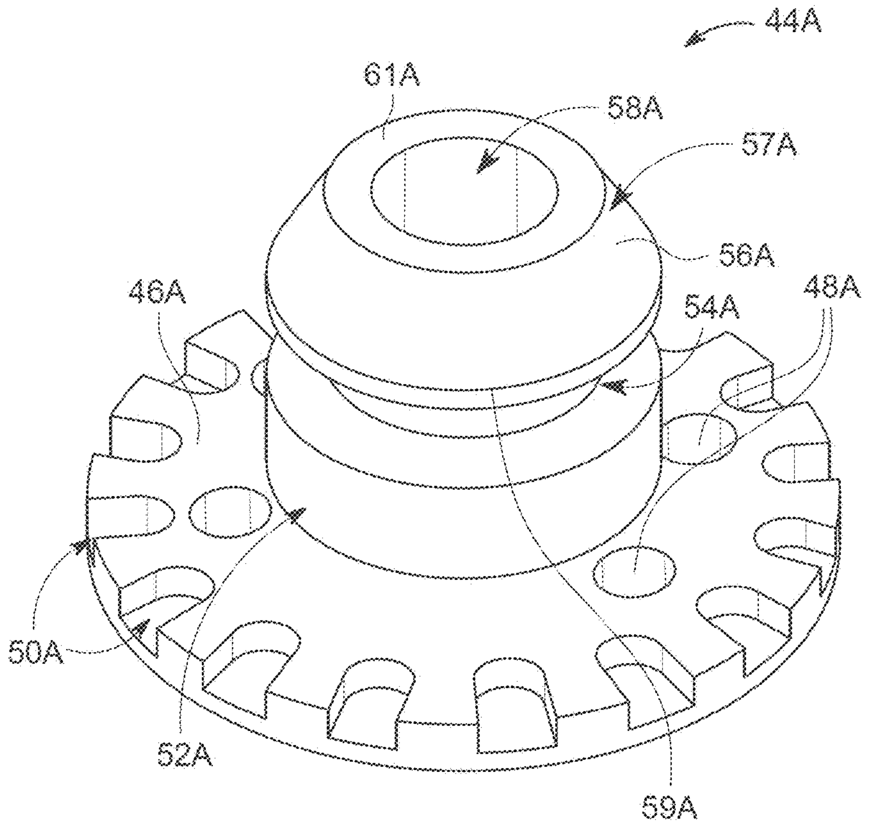
FIGS. 39, 40, and 41 show a first isometric view, a second isometric view, and a cross sectional view of a head interface used in the power tool in accordance with another embodiment.
Figure 40:
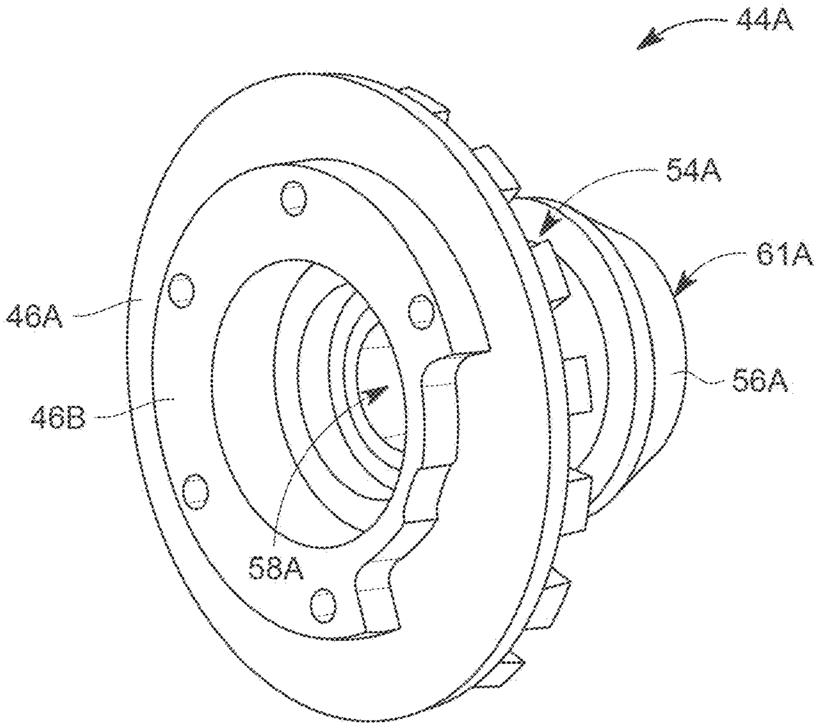
Figure 41:
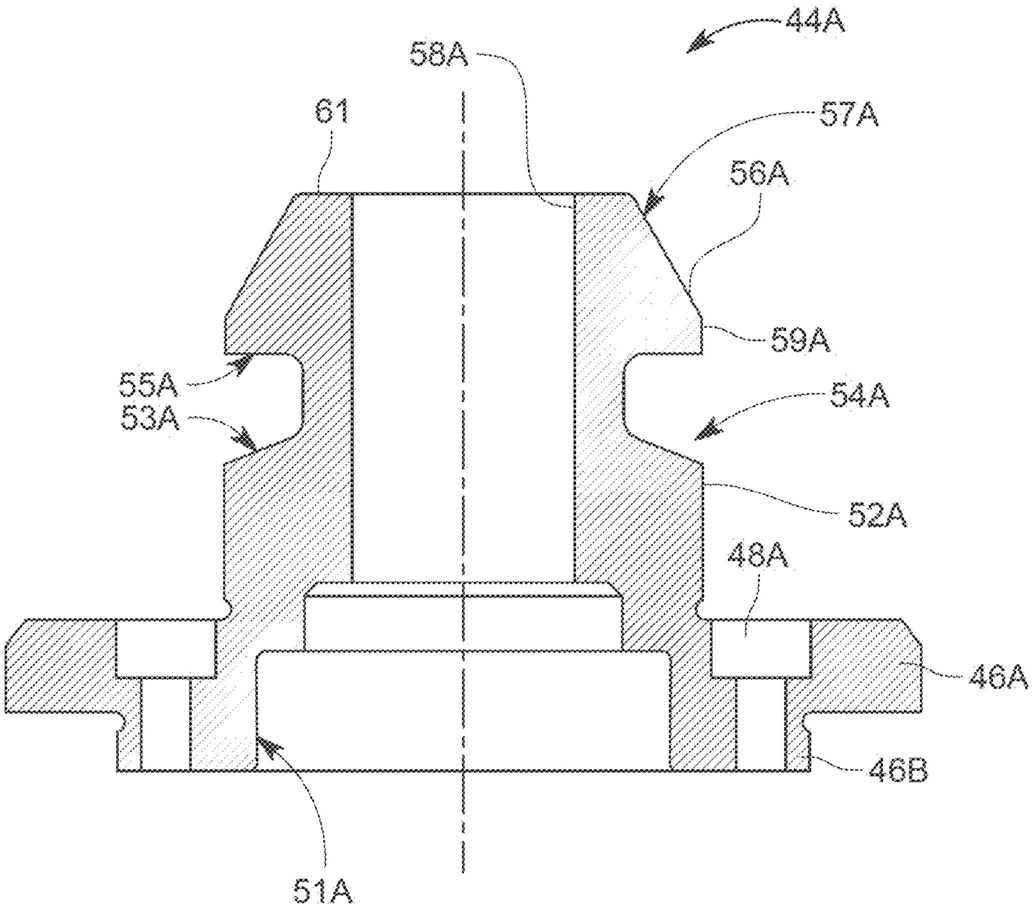

For the features shown and labeled in FIGS. 39-41, the first isometric view of universal head interface 44A in FIG. 39 shows a front facing portion thereof, i.e., the portion that is used to connect and interact with the tool head element 30. The second isometric view of FIG. 40 shows a back surface of the head interface 44A placed against the detent plate 34. The back surface (of flange 46A) of the head interface 44A is a surface that is placed against the detent plate 34 (see FIG. 45) and used to connect the head interface 44A to the clutch housing arrangement 19 and thus main body portion 11. As shown in FIG. 40 and FIG. 41, the back surface of flange 46A may include an alignment flange 46B. Alignment flange 46B is configured for aligning against the frame of the detent plate 34 and the clutch housing arrangement 19 as shown in FIG. 45. The second end 118 of the output shaft 16/spindle body 108 of the spindle and bearings arrangement 45 is inserted into the central bore 58A, thus providing securement of the output shaft 16 to the head interface 44A. The cross-sectional view of FIG. 41 shows additional features of the head interface 44A in accordance with an embodiment.

As previously described with reference to interface 44, the universal head interface 44A has a first end and a second end, with the central bore 58A extending therebetween. Also shown in FIGS. 39-41 are flange 46A, extending radially relative to the central bore 58A, that is used for attachment to the main body portion 11, and leading flat edge 61A (also referred to herein as a leading edge 61A), acting as a piloting surface. An outer diameter of the flange 46A may be based on the outer diameter or dimensions of the detent plate 34 and/or the inner diameter of the clutch housing arrangement 19, in accordance with embodiments. In other embodiments, an outer diameter of the flange 46A may be based on the inner diameter or dimensions of the clutch housing arrangement 19/main body portion 11. The flange 46A has holes 48A for fasteners 33 (e.g., screws) which are aligned with corresponding holes provided on/through the detent plate 34 and/or clutch housing arrangement 19, and into the main body portion 11. Flange 46A may be placed against the detent plate 34 and the head interface 44 may be attached to the main body portion 11 via interface fasteners 33 or screws placed through the aligned holes (see FIG. 39 and FIG. 48). Any number of fasteners or holes may be utilized for attachment of the universal head interface 44A and the number shown in the Figures is not intended to be limiting. As shown in FIG. 39, for example, flange 46A may include a number of receiving grooves 50A along a circumference or periphery thereof in accordance with embodiments herein. Such receiving grooves 50A may be dimensioned and configured to receive corresponding teeth 78 or castellations of the collar 40 (described later). The leading edge 61A at the second end of the head interface 44A may be a flat surface extending radially from the bore 58A.

To attach the universal head interface 44A to the main body portion 11, the central bore 58A or opening thereof is aligned with the output shaft 16 effectively extending through the detent plate 34. That is, the second end 118 of the spindle body 108 of the spindle and bearings arrangement 45 is connected to the back surface of the head interface 44A.

The central bore 58A is configured to receive at least a portion of the output shaft 16/spindle body 108 therein, according to embodiments, such that the shaft 16 extends towards the first end (near edge 61A) of the head interface 44A and at least a portion of the opening 122 of the second end 118 of the spindle body 108 is accessible through leading edge 61A and the bore 58A of the head interface 44A. An inner diameter of the central bore 58A may be dimensioned or sized based on dimensions (e.g., diameter) of the spindle body 108 to allow rotation and clearance of the spindle body 108 therein.

Further, as shown in FIG. 41, in embodiments, the central bore 58A may include notches 49A and 51A for accommodating seal 31 and bearing 28, and engaging a ball bearing, as previously described. The aforementioned dimensions also apply.

Between the flange 46A and leading edge 61A and surrounding central bore 58A of the head interface 44A are a number of interface surfaces for connection with tool head element 30, according to an exemplary embodiment. In embodiments, as shown FIG. 41, there may be a first interface portion 52A and a second interface portion 57A, with a circumferential groove 54A there between, surrounding the bore 58A. First interface portion 52A may extend axially from the flange 46A and towards the leading edge 61A. First interface portion 52A may include an outer surface having an outer diameter, in accordance with embodiments herein. Second interface portion 57A may include, in accordance with embodiments herein, a mating surface 56A and an interfacing edge 59A that has an outer diameter. The outer diameter surface of first interface portion 52A and the interface edge 59A of the second interface portion 57A are configured to interfaces with spring holder frame 42A (see FIGS. 42-43) and locking elements 60 when the tool head element 30 is attached to the main body portion 11. In embodiments, the outer diameters of the outer surface of first interface portion 52A and the edge 59A of the second interface portion 57A may be substantially equal or the same. In embodiments, the leading edge 61A has a smaller diameter than the interfacing edge 59A.

The mating surface 56A of the head interface 44A assists in alignment and engagement of locking elements 60, which is understood by the description later below with reference to FIGS. 24-27, for example. Generally, during assembly, collar 40 remains relatively stationary. In embodiments, the mating surface 56A may include a chamfered surface that extends between leading edge 61A and the interfacing edge 59A and is positioned circumferentially around bore 58A. More specifically, in one particular embodiment, the mating surface 56A is an angled surface that extends between a first diameter at the leading edge 61A and a second diameter at the interfacing edge 59A. According to embodiments, the mating surface 56A is a tapered surface or cone shaped surface that tapers outwardly relative to the axis A-A. That is, the surface 56A tapers outwardly from the first diameter at the leading edge 61A of the front end to the second diameter of interfacing edge 59A. In a non-limiting embodiment, the tapered surface is provided at an angle of about 30 degrees relative to the axis A-A.

However, as noted previously with regards to mating surface 56, the illustrated example of the mating surface 56A is not intended to be limiting in any way. That is, in other embodiments, the mating surface 56A may be a surface of different shape and is not limited to a tapered surface.

As shown in FIG. 41, for example, the circumferential groove 54A is provided axially behind the mating surface 56A, or, as previously noted, between the first and second interface portions 52A and 57A. The groove 54A is flanked by locking surfaces 53A, 55A that are part of each interface portion 52A, 57A, respectively. Locking surfaces 53A and 55A are surfaces utilized for locking and securing locking elements 60 within the head interface 44A, as discussed in greater detail below (with reference to head interface 44, but which also apply to head interface 44A).

Figure 9:
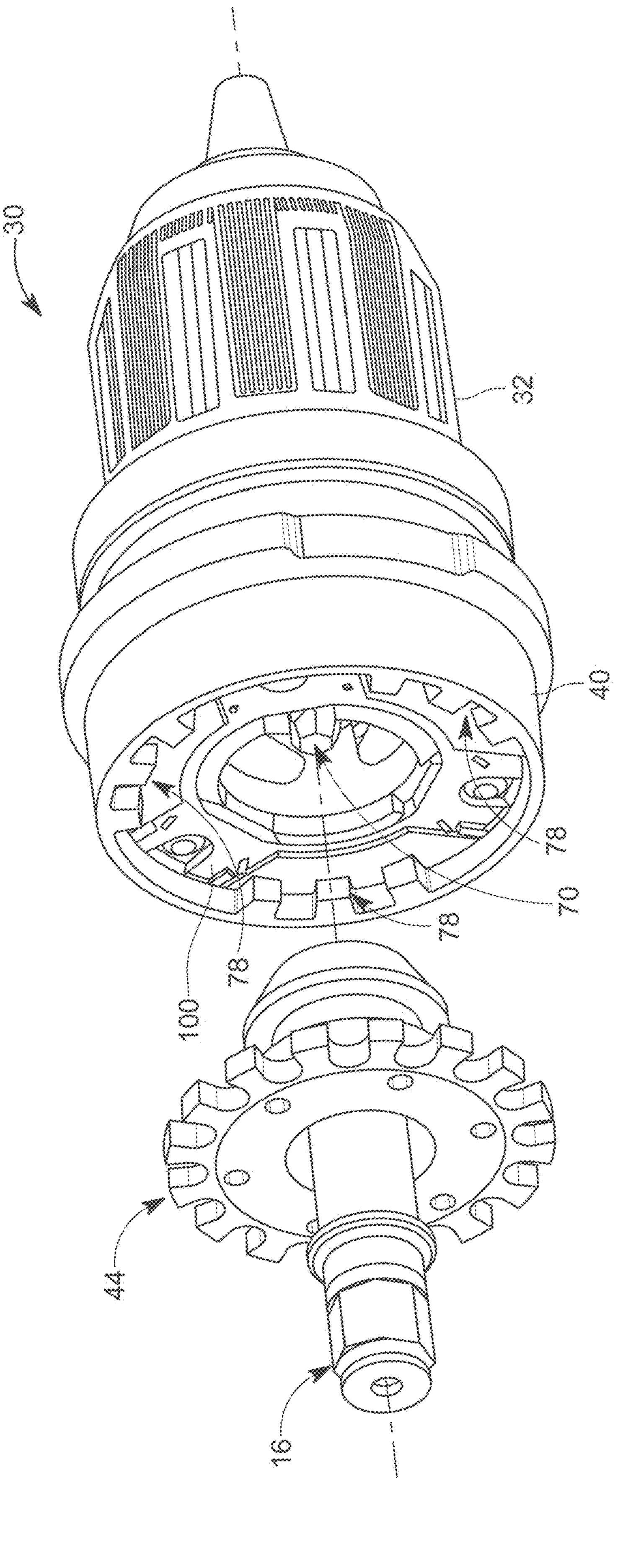
FIG. 9 shows a back angled view of the assembly of a head interface and collar in accordance with an embodiment.
Figure 10A:
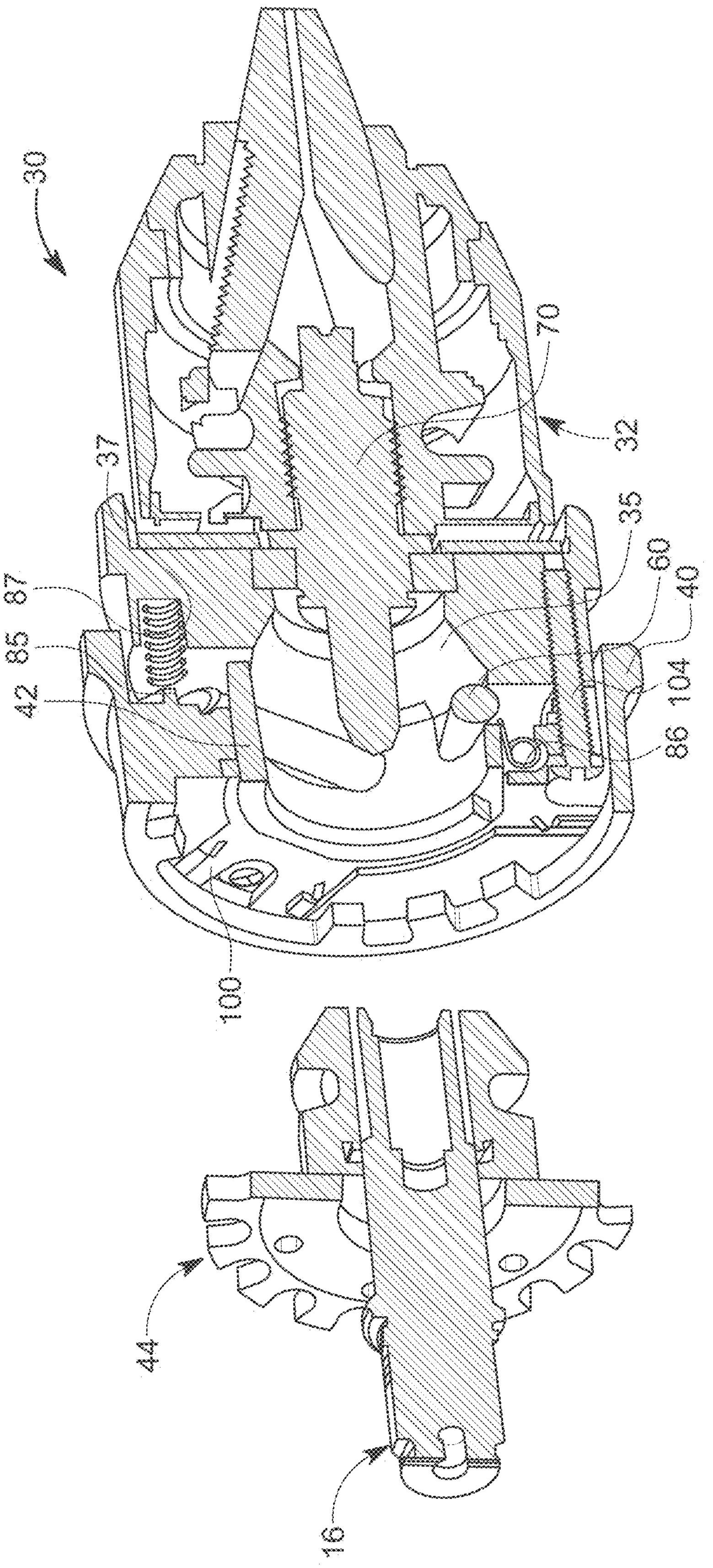
FIG. 10A and FIG. 10B show cross sectional views, in an axial direction, of the parts of FIG. 9.
Figure 10B:
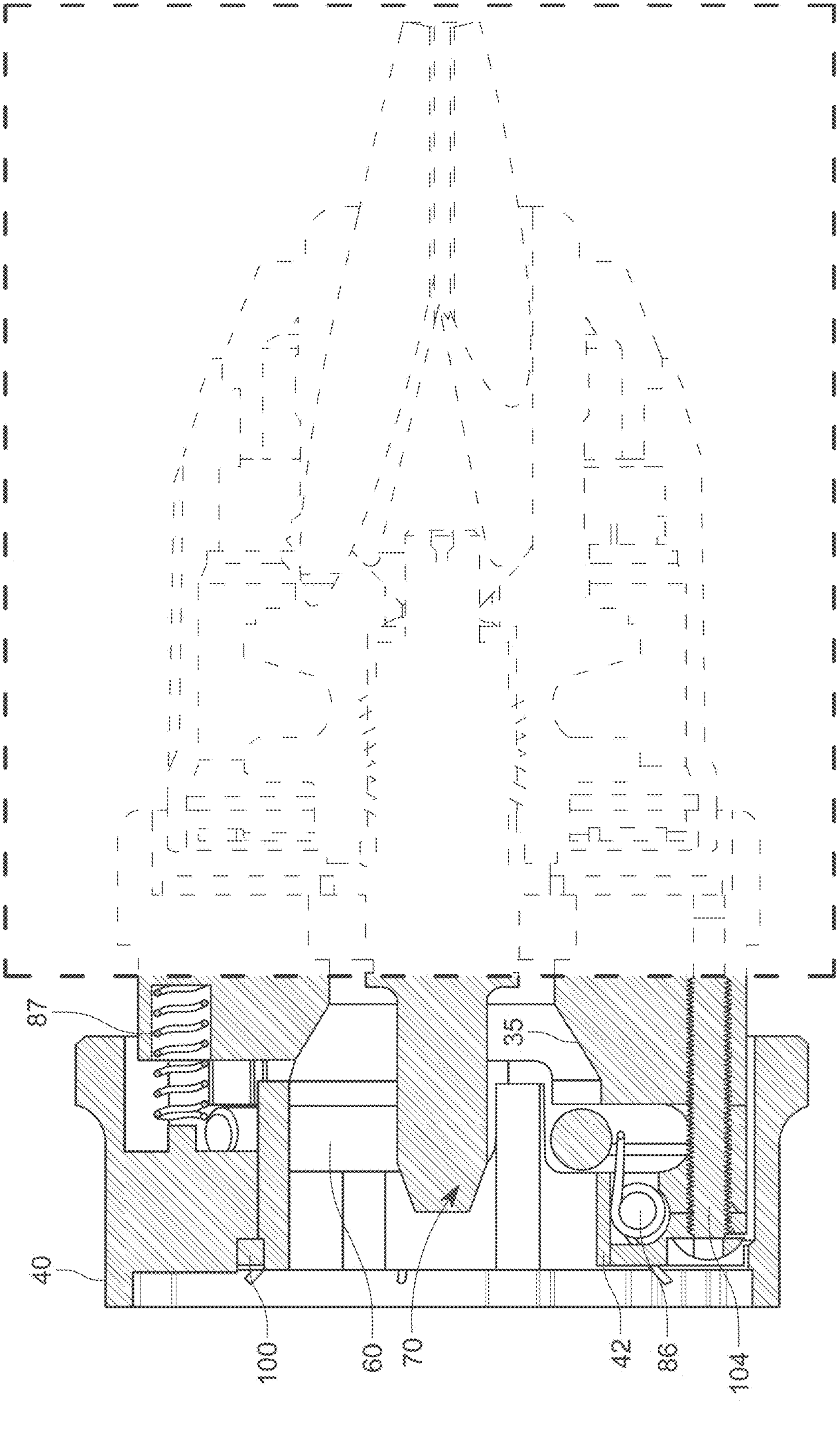

Turning now to FIGS. 9-18, features of the tool head element 30 are now described. It is noted that the following description primarily references such features with regards to universal head interface 44 as shown in FIGS. 6-8; however, this description similarly applies to use of universal head interface 44A and thus 44A may not be noted below. Nonetheless, one skilled in the art understands that the tool head element 30 is configured to operate similarly with reference to universal head interface 44A. As previously noted, each tool head element 30 is configured for selective engagement on the head interface 44 or 44A. Each tool head element 30 includes at least a tool part housing 32 and a collar 40 attached or connected thereto, such as represented by FIGS. 9-10. The tool part housing contains components and parts for the designated tool—like chuck jaws 23—and includes the input shaft 70 and one or more associated bearing(s) (not labeled, but seen in FIG. 10, for example) for rotation of input shaft 70. The tool part housing 32 includes a body with a backing surface 36 (or interface; see FIG. 3) and with holes 37 (see, e.g., FIG. 10A) for receipt of collar springs and alignment protrusions 38 (or castellations) for attaching the collar 40 thereto (see, e.g., FIGS. 19-22, as later described, showing assembly of said parts). Backing surface 36 also includes an opening in its center that includes an angled wall 35 (see, e.g., FIG. 10A and FIG. 10B) for accommodating the mating surface 56 (see, e.g., FIG. 6) of head interface 44. Input shaft 70 is configured to removably couple and effectively rotate with the output shaft 16 of the main body portion 11. FIGS. 9 and 10A generally show the method of alignment of the input shaft 70 of the tool head element 30 with the universal head interface 44 (which may contain the output shaft 16 alone or the output shaft 16 (108) of the spindle and bearings arrangement 45, and is attached to the main tool portion 11, although not shown attached in these figures). FIG. 10B shows a cross sectional view, in an axial direction, of the assembled spring cover 100, collar 40, and spring holder frame 42 et al. (described below) for attachment to the head interface 44. Upon coupling and providing power to the tool 10, speed and torque from output shaft 16 are applied/transferred to input shaft 70, e.g., for rotation thereof (and thus, rotation/movement of any tool, e.g., a drill bit tool bit holder portion 23 attached to the tool head element 30). In an embodiment, the speed and torque from output shaft 16 are applied/transferred to input shaft 70 via the spindle and bearings arrangement 45. An exemplary embodiment of features of input shaft 70 is described later with reference to FIGS. 33-37.

According to embodiments herein, the tool head element 30 includes the mechanisms for quick attachment and quick release of the tool head element from the main body portion, including, for example, collar 40 and spring holder frame 42 (or 42A), and locking elements 60. In embodiments, the collar 40 of the tool head element 30 is attached or connected to the tool part housing 32 (see, e.g., FIG. 10A). The collar 40 includes a number of locking elements 60 therein for locking the tool head element 32 to the main body portion 11 (via head interface 44 or 44A). In embodiments, the locking elements 60 may be pins or rolling elements. In an embodiment, the number of locking elements 60 is two or more. Any multiples of locking elements may be utilized; however, for illustrative purposes only, the drawings (e.g., see FIG. 17) show the use of three (3) locking elements 60 in the collar 40. Generally, locking elements 60 are configured to move radially (relative to the axial direction or axis) inward and outward based on the forces (e.g., spring forces, or forces from the head interface 44) applied thereto. In accordance with an embodiment, when moving radially e.g., moving along the angled surface of mating surface 56, 56A of the head interface, an angle of the mating surface 56, 56A (or its taper), and thus the locking elements 60 are configured to move (roll) relative to the axis A-A, is an acute angle α (see FIG. 27). More specifically, the angle α of mating surface 56, 56A may be less than ninety degrees relative to axis A-A. In embodiments, the angle α may be between approximately 20 degrees and approximately 75 degrees, inclusive. In embodiments, the angle α may be approximately 45 degrees. In yet another embodiment, the tapered mating surface 56, 56A is provided at an angle of about 30 degrees relative to the axis A-A, and thus locking elements 60 are configured to move at a similar or same angle relative to the axis A-A during attaching or removing the tool head element. Further details regarding the locking elements 60 are discussed later below.

Figure 11:
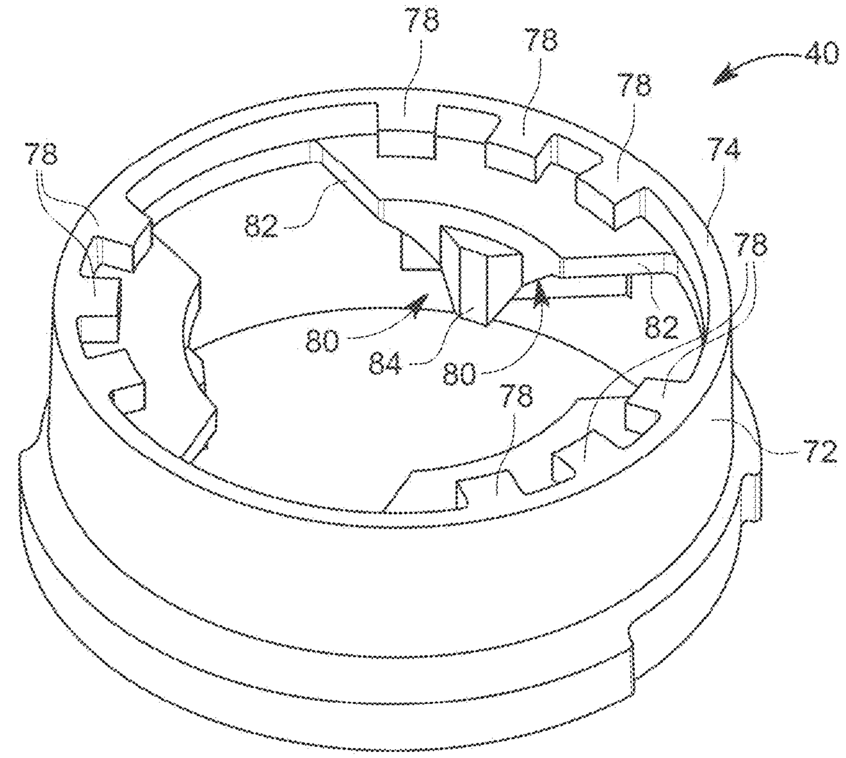
FIGS. 11-12 show a first isometric view and a second isometric view, respectively, of collar provided on a tool head element used in the power tool of FIG. 1 in accordance with an embodiment.
Figure 12:
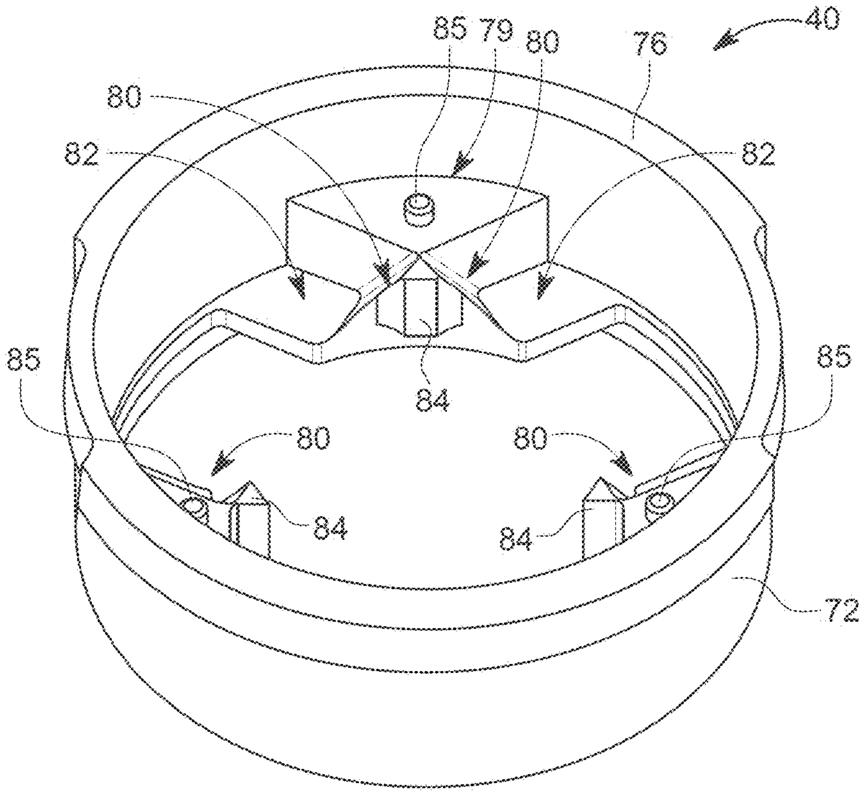
Figure 23:
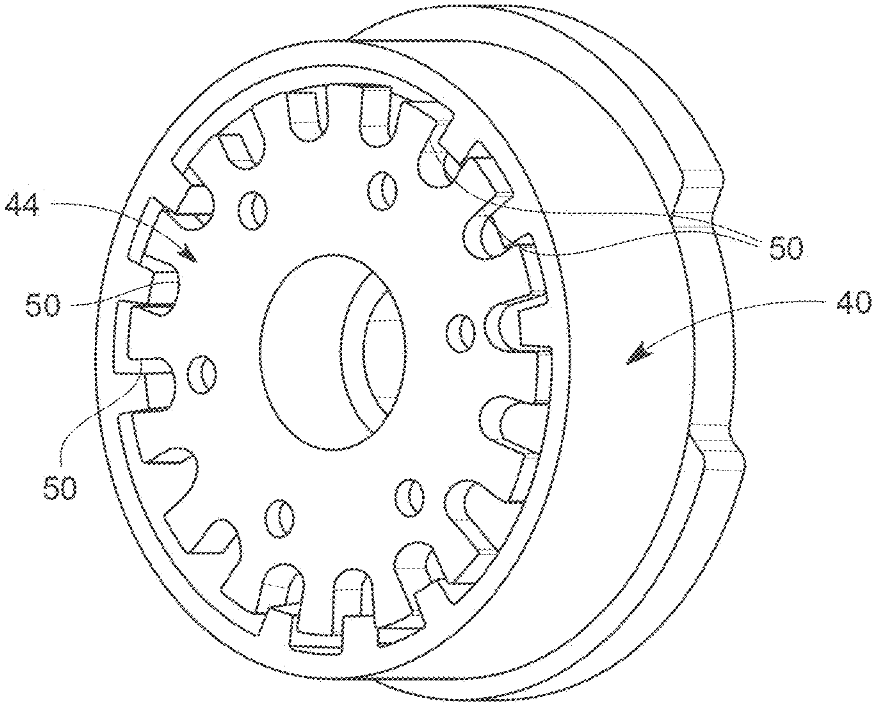
FIG. 23 shows a back end view of the head interface assembled in the collar in accordance with an embodiment.

FIGS. 11-12 show a first (back) view and a second (front) view of the collar 40 in accordance with embodiments herein. Collar 40 has a wall 72 that is generally circular or round and has a thickness extending in the axial direction. An outer surface of the wall 72 is designed for a user to grasp and move as needed for application, removal, or adjustment of the tool head element 32. According to embodiments, the collar 40 includes a number of teeth 78 (or castellations) such as shown in FIG. 11, configured to engage the corresponding receiving grooves 50 on periphery of the head interface 44 (or 50A on 44A). In embodiments, the teeth 78 are provided at a first end 74 (or back) of the collar 40. As previously mentioned, when the tool head element 30 is attached to the head interface 44, the teeth 78 may be inserted into receiving grooves 50 thereof, such as shown in FIG. 23. Such connection assists in axially and rotationally locking the housing 32 of the tool head element 30 to the main body portion 11. In embodiments, the collar 40 may be configured for axial and/or rotational movement about the axis A-A, without removing the tool head element 30 off of the head interface 44, to rotate a position of the tool head element 30 via withdrawing the teeth 78 from the receiving grooves 50 and rotationally repositioning (i.e., rotating) the teeth 78 into the receiving grooves 50. Such movement of the collar allows a user to change to different rotational positions when needed in order to adjust an angle of the drill, tool, etc. while working, for example.

Figure 15:
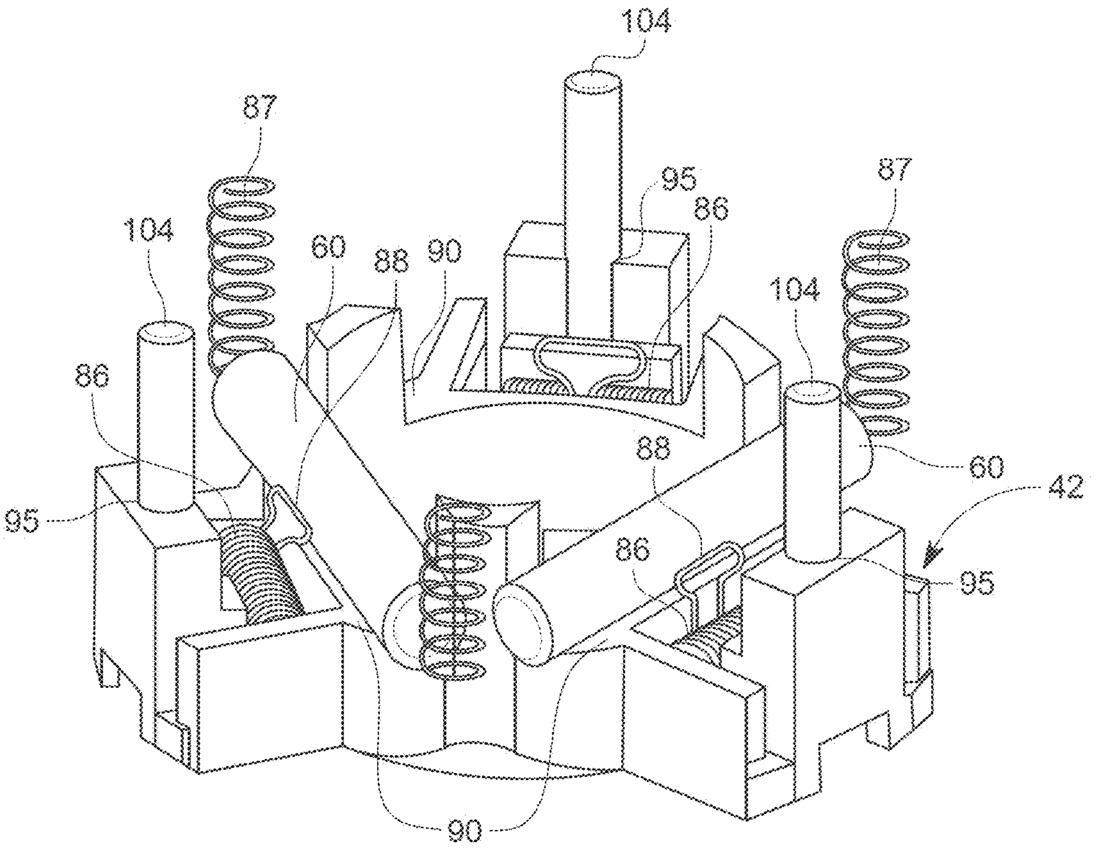
FIG. 15 shows an isometric view of the locking elements and biasing elements used on a spring holder frame within the collar in accordance with an embodiment.
Figure 21:
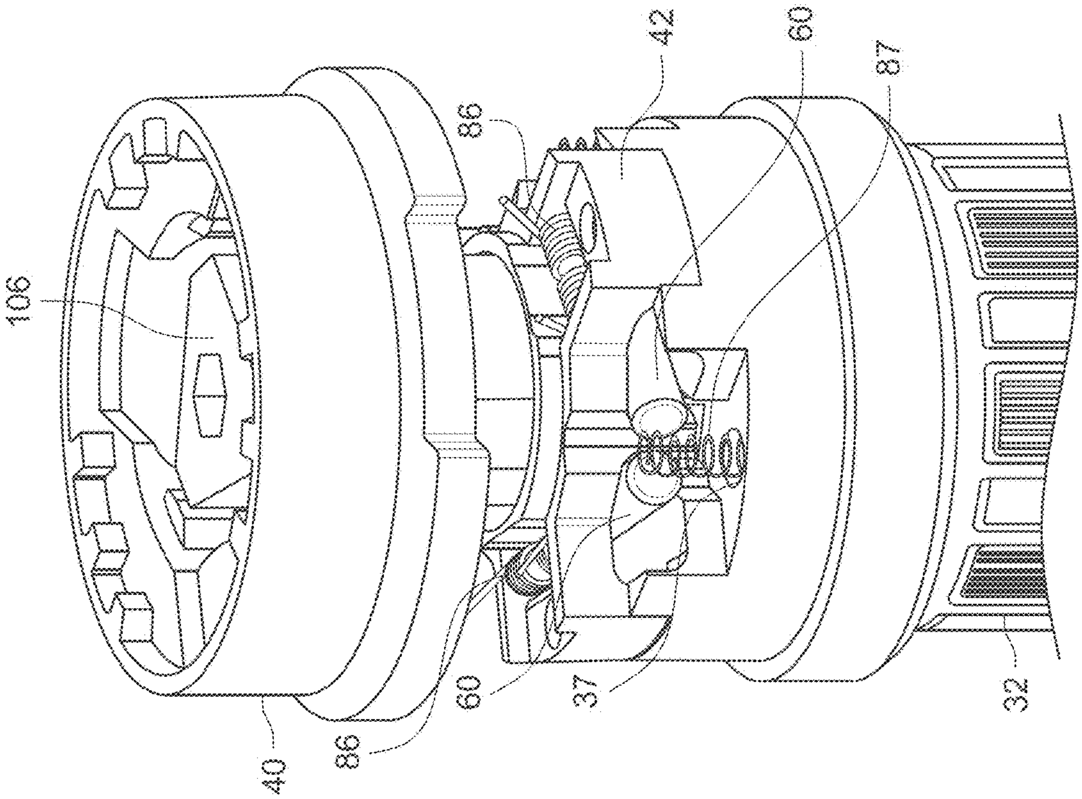

Also provided in the collar 40 are a number of collar springs 87, as seen in FIGS. 3 and 15, for example. Collar springs 87 are configured to bias the collar 40 in an outmost axial position, or a first collar position, relative to the tool part housing 32. As shown in FIG. 21, for example, holes 37 may be provided in a backing surface 36 of the tool part housing 32, for receipt of one end of each collar spring 87. A second end of the collar spring 87 may be aligned with pin 85 (see FIG. 12) provided on a front side of each alignment mechanism 79. In a non-limiting embodiment, collar springs 87 may be coil springs. However, collar springs 87 may also include other types of elements such as beam springs and/or compression springs in embodiments herein.

Figure 13:
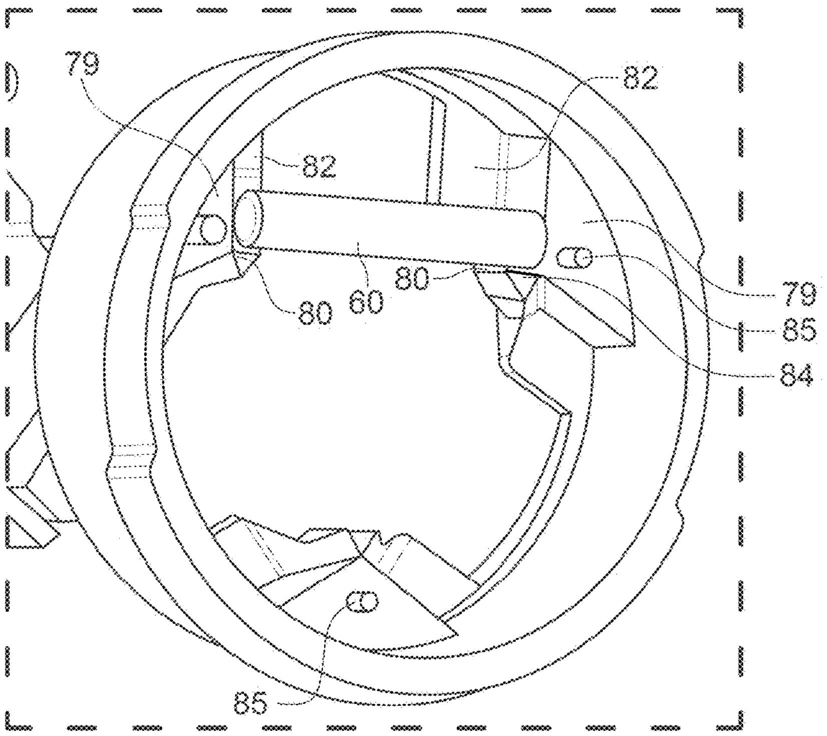
FIGS. 13-14 show movements of a locking element within the collar of FIGS. 11-12 in accordance with an embodiment.
Figure 14:
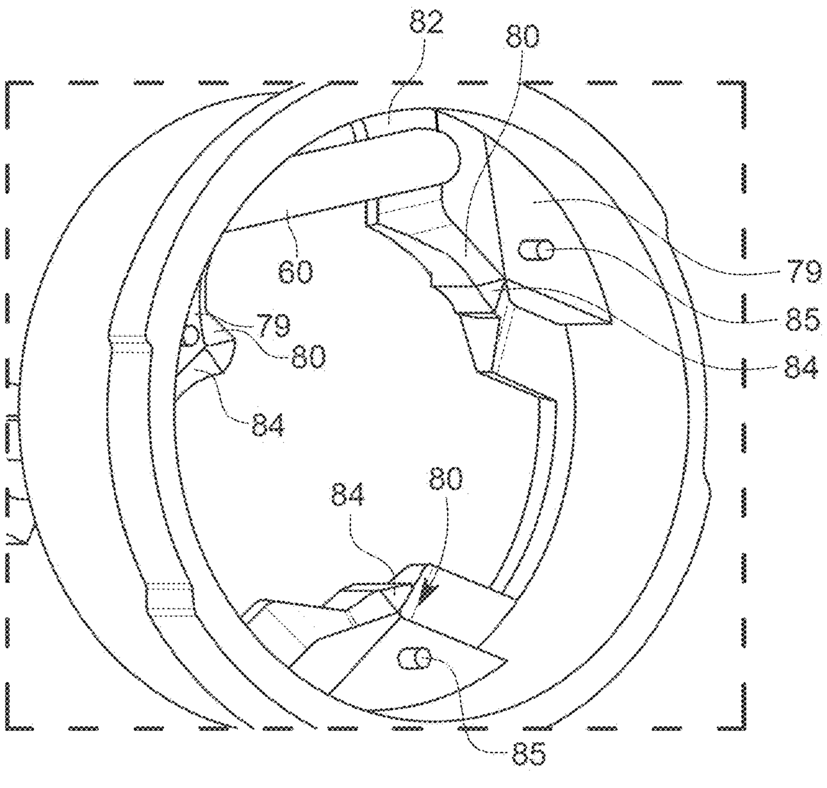

In embodiments, between its first end 74 and a second end 76 (or front), the collar 40 may include at least one alignment mechanism 79 therein (see, e.g., FIG. 12), having at least one ramped surface 80, extending radially towards a center thereof. Such alignment mechanism(s) 79 are designed for cooperation with and for guiding the locking elements 60 during axial movement of the tool head element 30 relative to the main body portion 11; that is, during attachment or removal the tool head element 30 to/from the main body portion. In an embodiment, the number of ramped surfaces 80 is two or more per alignment mechanism 79. Any multiples of ramped surfaces may be utilized; however, for illustrative purposes only, the drawings (e.g., see FIGS. 11-12) show the use of six (6) ramped surfaces 80 on three (3) alignment mechanisms 79 of the collar 40. Each ramped surface 80 is connected to a bottom wall 82 that extends radially towards the center of the collar 40. From the bottom wall 82, each of the ramped surfaces 80 extend at an angle towards an adjacent ramped surface 80. As shown in FIGS. 13-14, each locking element 60 may be configured to extend between two alignment mechanisms 79. Ends of locking elements 60 generally sit on bottom walls 82, such that the locking elements 60 extend therebetween. The ramped surfaces 80 of the alignment mechanisms are utilized during removal or unlocking of the tool head element 30 from the power tool 10. More specifically, an end of each locking element 60 is received on the ramped surface 80 and configured to move along the ramped surface 80 and from the bottom wall 82 based on the removal action of the tool head element 30. Such movement is described later with reference to FIGS. 28, 30, and 32, for example.

In an embodiment, each ramped surface 80 flanks a wedge element 84. Wedge elements 84 are provided as part of the alignment mechanisms 79 to assist in removal of the tool head element 30 from the main body portion 11. Generally, the wedge elements 84 are configured to drive locking elements 60 outwardly relative to the axis A-A and to move the locking elements 60 out of the circumferential groove 54 of the head interface 44, i.e., outside of the outer diameter of the interfacing edge 59 so that each locking element 60 is free to move out and along the edge 59, to remove the tool head element 30 from the main body portion 11. More specifically, as evident via the description with regards to FIG. 30, the wedge elements 84 are designed for pushing the locking elements 60 relatively outwardly from the circumferential groove 54 and against forces of biasing elements 86 according to embodiments.

Each locking element 60 is biased inwardly towards the input shaft 70 by biasing elements 86 provided on a spring holder frame 42, according to embodiments herein. Biasing elements 86 may be torsion springs, shown in the exemplary illustrative embodiment of FIGS. 15 and 20, for example, that are designed with a leg portion 88 that is configured to bias or hold each locking element 60 at a biased position within spring holder 42. Biasing elements 86 are also configured to push locking elements 86 into the circumferential groove 54 of the head interface 44 and assist in locking the tool head element 30 onto the main body portion 11.

While the biasing elements 86 may be illustrated in the figures and described as torsion springs, the type of spring or biasing element used in the tool head element 30 is not meant or intended to be limiting. In embodiments, biasing elements 86 may include other types of elements such as beam springs and/or compression springs. In some embodiments, a combination of different types of springs or biasing elements may be utilized.

Figure 16:
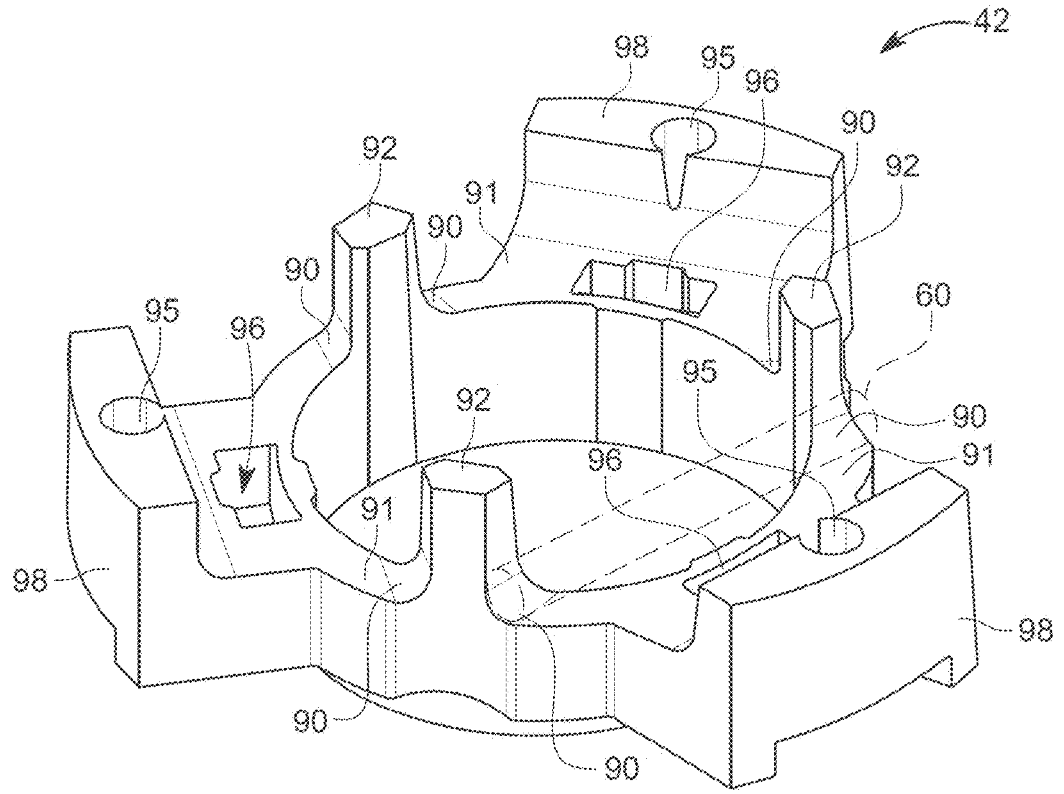
FIGS. 16-17 show a first isometric view and a second isometric view, respectively, of the spring holder frame used in the power tool of FIG. 1 in accordance with an embodiment.
Figure 17:
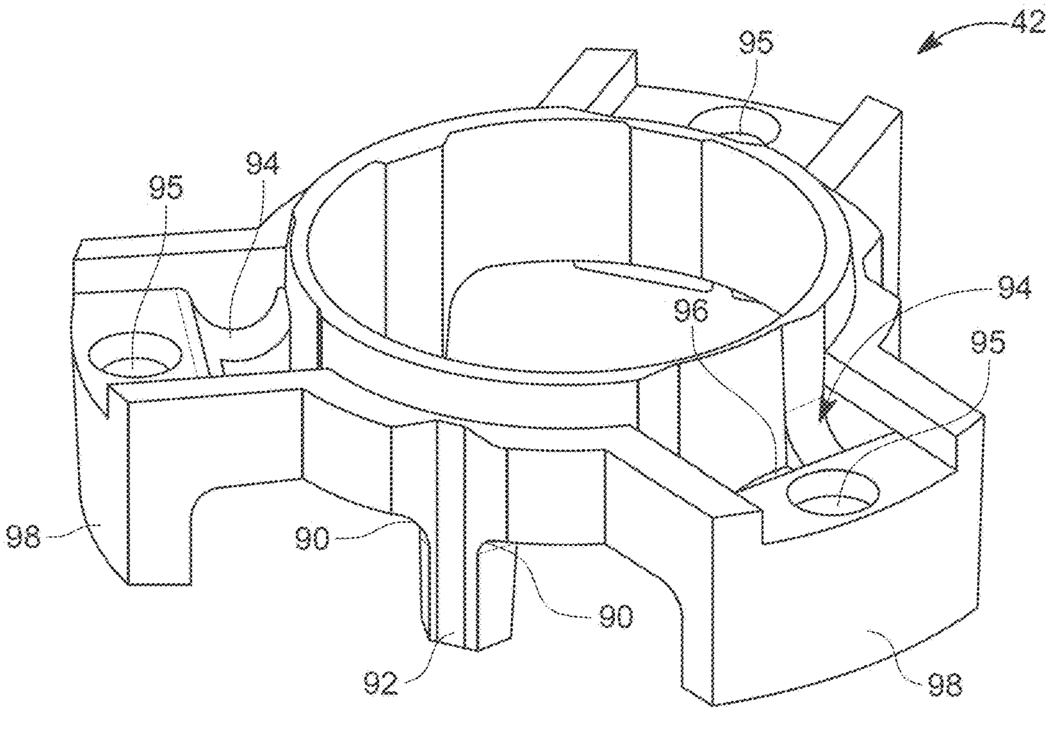

FIGS. 15-16 show a first (back) view whereas FIG. 17 shows a second (front) view of the spring holder frame 42 in accordance with embodiments herein. As illustrated, spring holder frame 42 may have a central opening therein to accommodate the shafts 16 (108) and 70 for connecting. A diameter of this central opening may be used to pilot the tool head interface 30 onto the head interface 44. A back of the spring holder frame 42 includes divots 90 therein. The divots contact travel groove 91 and extension 92; groove 91 allows movement or travel of the locking elements 60 during locking of the tool head element 30 onto the head interface 44. Each travel groove 91 has a bottom out surface that allows movement between that surface and a mating surface on the tool part housing for each locking element. Between each of the divots 90 is an extension leg 92 that extends axially and assists in containing the locking elements 60 within an area of the collar 40. Further, alignment walls 98 are provided on an opposite side of the divots 90. Alignment walls 98 are provided for alignment and connection onto the backing surface 36 of the tool head element 30, described later below.

A front of the spring holder frame 42, as shown in FIG. 17, includes pockets 94 therein for receipt of each of the biasing elements 86 therein. In particular, FIG. 17 shows a first side of each pocket 94 used to hold each biasing element 86. As visible in FIG. 16, a hole 96 for receipt of the leg portion 88 of biasing element 86 is provided in each pocket 94; hole 96 may be provided between each divot 90 and alignment wall 98. Each hole 96 may be provided in a center of the pocket 94. Each pocket 94 and hole 96 may be sized or dimensioned based on a size and/or dimensions of the received biasing element 86 and leg portion 88, respectively, according to embodiments. Accordingly, when assembled, the leg portion 88 of biasing element 86 extends through the hole 96, as a body of the biasing element 86 is contained within the pocket 94. The leg portions 88 of the biasing elements 86 hold the locking elements 60 in position within the divots 90 of the spring holder frame 42. Such features are shown in FIG. 15, for example.

Figure 42:
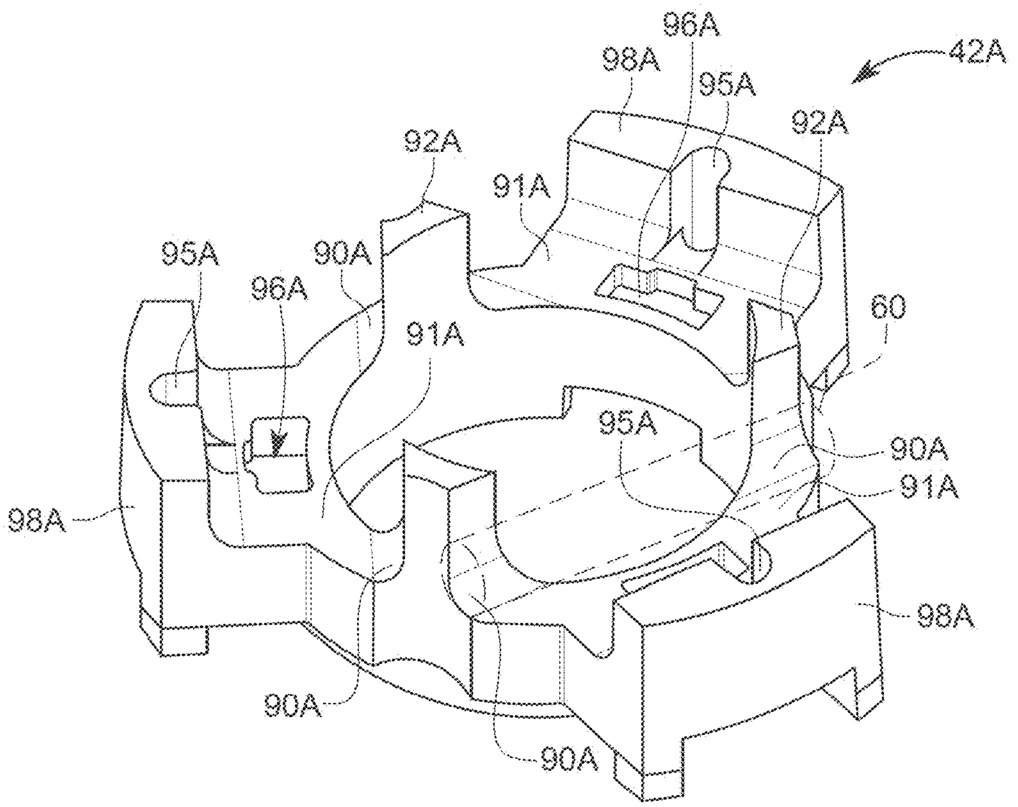
FIGS. 42-43 show a first isometric view and a second isometric view, respectively, of the spring holder frame used in the power tool of FIG. 1 in accordance with another embodiment.
Figure 43:
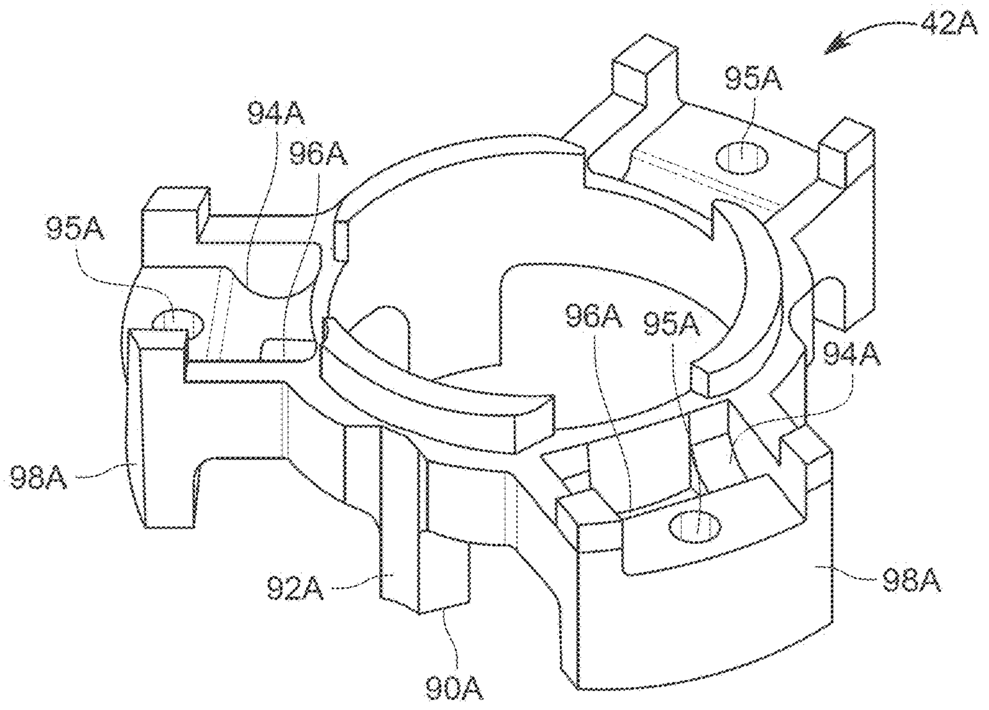

In another embodiment where universal head interface 44A may be utilized, spring holder frame 42A, shown in FIGS. 42-43, may be implemented in accordance with embodiments. Again, for purposes of clarity and brevity, like elements and components throughout FIGS. 42-43 are labeled with similar designations and numbering (plus "A") as discussed with reference to FIGS. 16-17 and may not be discussed entirely in detail herein, but are understood to one of ordinary skill in the art that various features are similar to those features previously discussed without being limited solely to the illustrated embodiments. FIG. 42 shows a first (back) view whereas FIG. 43 shows a second (front) view of the spring holder frame 42A in accordance with embodiments herein. As previously described with reference to frame 42, each locking element 60 may be biased inwardly towards the input shaft 70 by biasing elements 86 provided on spring holder frame 42A, according to embodiments herein. As illustrated, spring holder frame 42A may have a central opening therein to accommodate the shafts 16 (108) and 70 for connecting. A diameter of this central opening may be used to pilot the tool head interface 30 onto the head interface 44A. A back of the spring holder frame 42A includes divots 90A therein. The divots contact travel groove 91A and extension 92A; groove 91A allows movement or travel of the locking elements 60A during locking of the tool head element 30 onto the head interface 44A. Each travel groove 91A has a bottom out surface that allows movement between that surface and a mating surface on the tool part housing for each locking element. Between each of the divots 90A is an extension leg 92A that extends axially and assists in containing the locking elements 60 within an area of the collar 40. Further, alignment walls 98A are provided on an opposite side of the divots 90A. Alignment walls 98A are provided for alignment and connection onto the backing surface 36 of the tool head element 30, described later below.

The front of the spring holder frame 42A, as shown in FIG. 43, includes pockets 94A therein for receipt of each of the biasing elements 86 therein. In particular, FIG. 43 shows a first side of each pocket 94A used to hold each biasing element 86. A hole 96A for receipt of the leg portion 88 of biasing element 86 is provided in each pocket 94A; hole 96A may be provided between each divot 90A and alignment wall 98A. Each hole 96A may be provided in a center of the pocket 94A. Each pocket 94A and hole 96A may be sized or dimensioned based on a size and/or dimensions of the received biasing element 86 and leg portion 88, respectively, according to embodiments. Accordingly, when assembled, the leg portion 88 of biasing element 86 extends through the hole 96A, as a body of the biasing element 86 is contained within the pocket 94A. The leg portions 88 of the biasing elements 86 hold the locking elements 60 in position within the divots 90A of the spring holder frame 42A, much like the features are shown in FIG. 15, for example.

Figure 18:
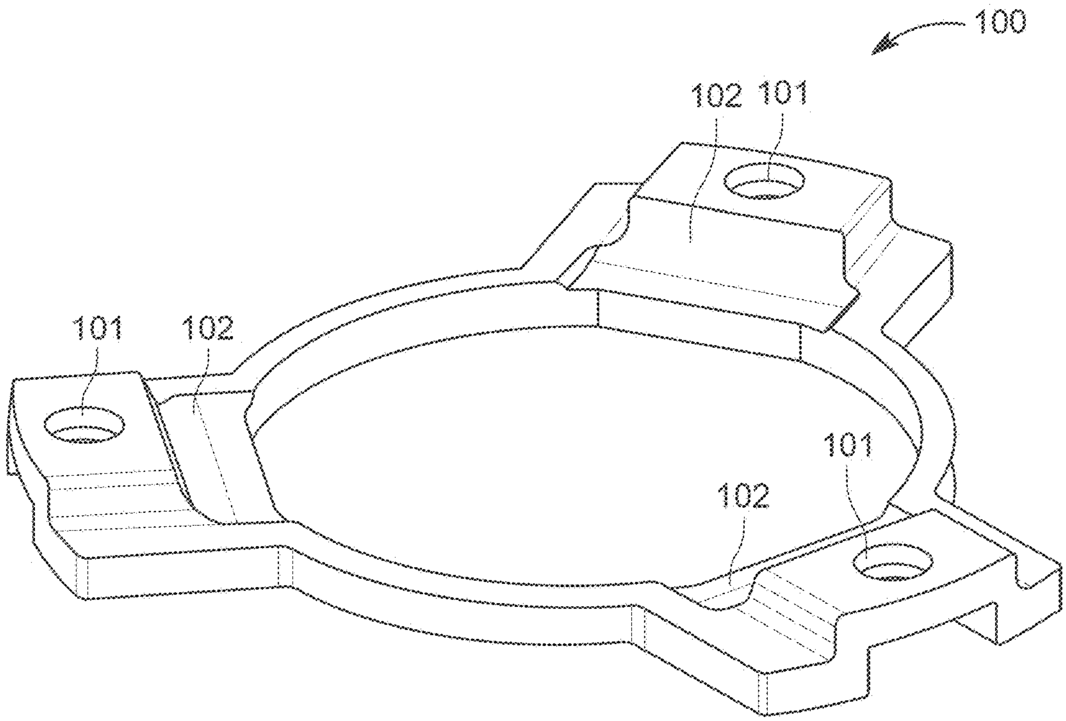
FIG. 18 shows a first isometric view of a spring cover in accordance with an embodiment.

To assist in containing the biasing elements 86 within the pockets 94 (or 94A) as well as within the collar 40, a spring cover 100 is provided. FIG. 18 shows a first (back) view of spring cover 100 in accordance with an embodiment (as second (front) view of spring cover 100 may be seen in FIG. 22, for example). Spring cover 100 may include a retaining ring or frame that is generally round or generally circular, with a central opening therethrough, according to embodiments. The ring or frame of spring cover 100 is sized and designed to align with, and secure, spring holder frame 42 (see FIGS. 9, 10A, and 22), among other parts, within the tool part housing 32. Central opening of the spring cover 100 may be sized and designed based on central opening of spring holder frame 42, according to embodiments herein, thereby providing access to the input shaft 70 for connecting to shaft 16 (108). The frame may include multiple connecting flanges therearound for attachment of the spring cover 100, according to an embodiment. In an embodiment, spring cover 100 includes on its back side a corresponding number of depressions 102 that contain and form a second side of the pockets 94 or 94A. In an embodiment, the depressions 102 may be provided within or adjacent to the connecting flanges. Accordingly, when the spring cover 100 is secured, the biasing elements 86 are contained between the spring holder frame 42 or 42A and spring cover 100.

The spring holder frame 42 and 42A each includes a number of fastener holes 95 therein for receipt of fasteners 104 (e.g., screws) that are used to connect the parts of the collar 40. Similarly, in an embodiment, the spring cover 100 includes a number of fastener holes 101 (see FIG. 18) therein for receipt of fasteners 104 (shown in FIG. 15 and FIG. 22, for example). According to embodiments, the fastener holes 101 may be provided through the connecting flanges of the spring cover 100. The fastener holes 101 may be adjacent to the depressions 102, for example. In the exemplary illustrated embodiment, spring cover 100 includes a retaining ring or frame connecting three flanges with fastener holes 101 (shown in FIG. 18).

However, it should be noted that the illustrated spring cover 100 is not intended to be limited to the illustrated embodiment. That is, a single retaining ring with flanges need not be provided as the spring cover 100. Instead, according to an embodiment, individual pieces (e.g., three) may be utilized for holding and maintaining bias/compression of the biasing elements 86. Accordingly, when each part of the spring cover 100 is secured, the biasing elements 86 are contained.

Figure 20:
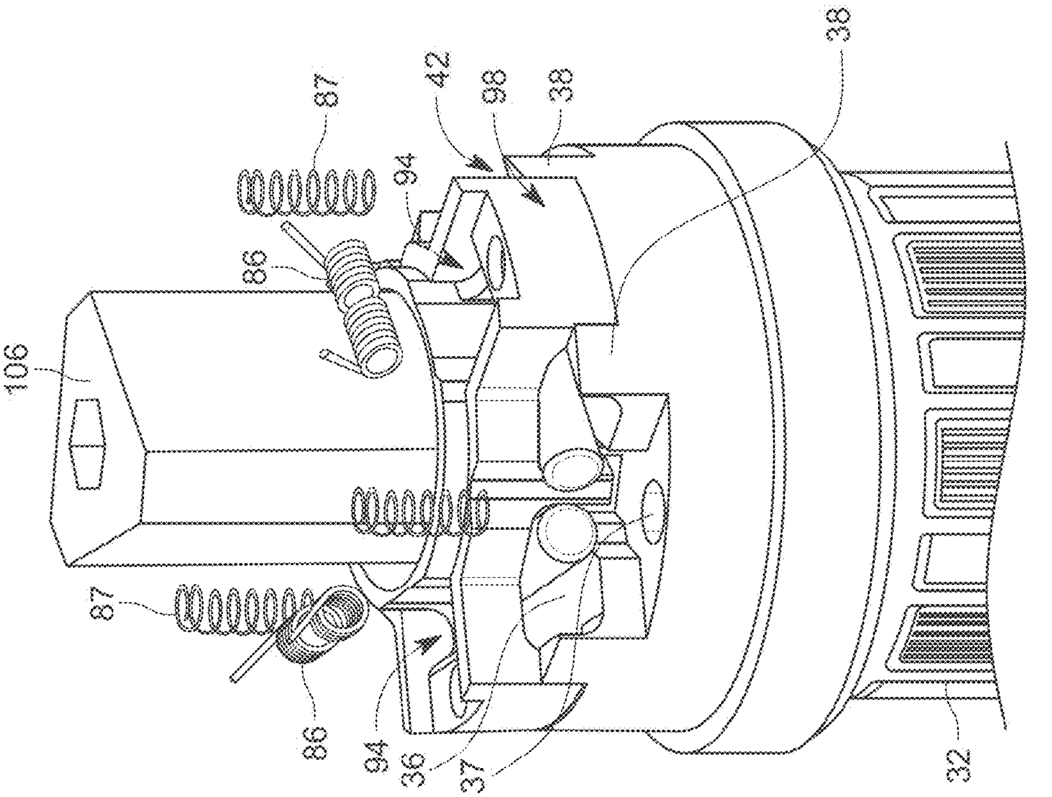
FIGS. 19-22 show a process of assembling and mounting the collar and its contained parts of a tool head element in accordance with an embodiment.
Figure 19:
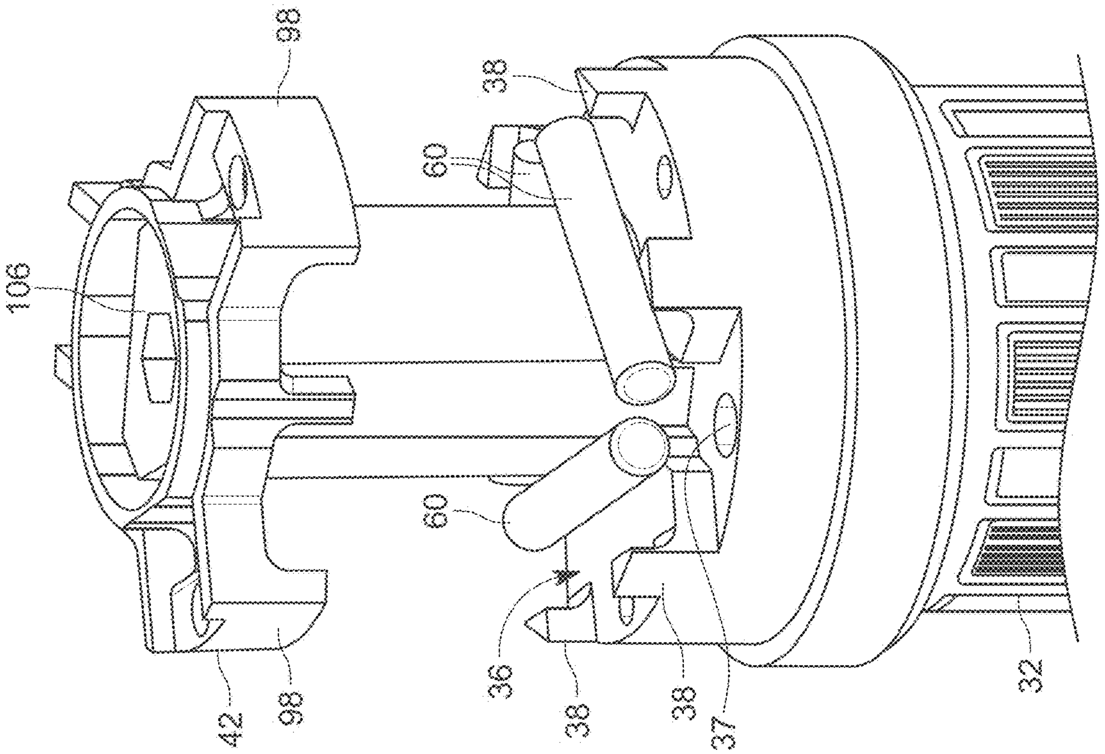
Figure 22:
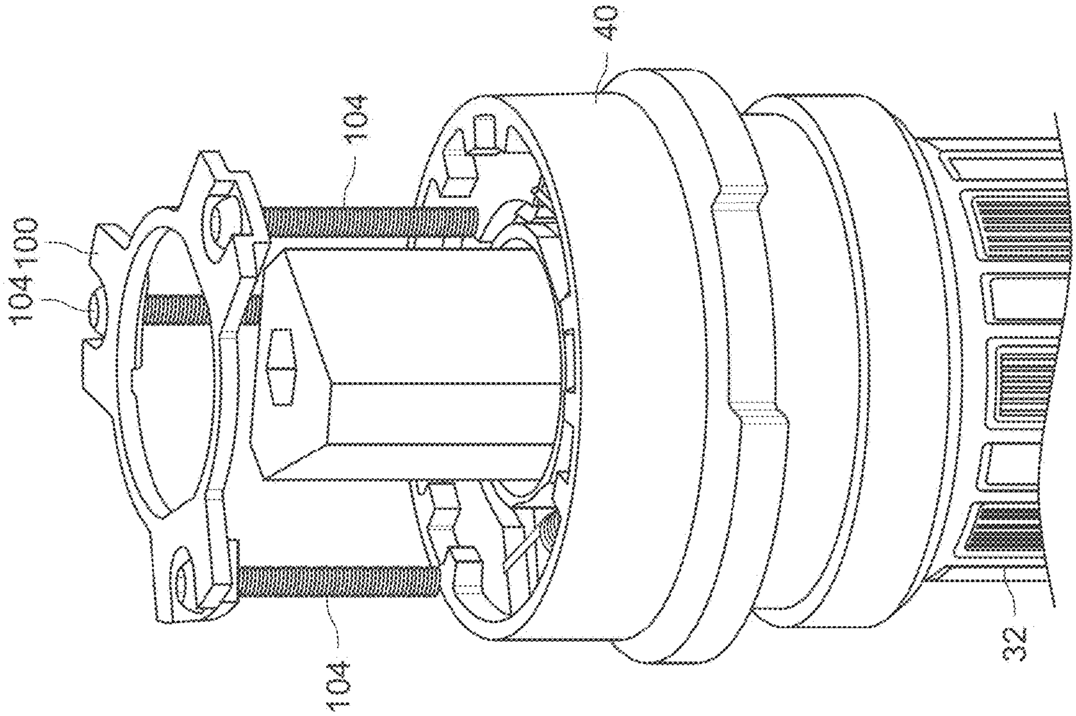

An example of the assembly of the collar 40 onto the tool part housing 32 is shown in FIGS. 19-22. Such is described with reference to features of spring holder frame 42, but this description similarly applies to spring holder frame 42A even if not entirely noted herein. Assembly of the collar 40 may be assisted via using a temporary alignment gauge 106, for example, that is inserted into the tool part housing 32, e.g., through a center thereof (through backing surface 36), as shown in FIG. 19. Each of the locking elements 60 (in this illustrated case, there are three locking elements 60) are placed on the backing surface 36 towards and around a center opening therein. The spring holder frame 42 (or 42A) is then assembled onto the alignment gauge 106 and moved therealong towards backing surface 36, as represented in FIG. 19. Alignment walls 98 of the spring holder frame 42 are aligned or placed and assembled between alignment protrusions 38 of the backing surface 36, as shown in FIG. 20. Thereafter, biasing elements 86 are placed in pockets 94 with their leg portions 88 extending through the holes 96 in spring holder frame 42. This allows the leg portions 88 to assist in holding or biasing the locking elements 60 upon assembly of the collar 40. Collar springs 87 are also inserted into the holes 37 of the backing surface 36. Collar 40 is then placed onto the alignment gauge 106 and moved towards the assembly on the tool part housing 32 to encase or enclose the spring holder frame 42 and at least part of the backing surface 36, as shown in FIGS. 21-22. Then spring cover 100 is placed onto the collar 40. Specifically, the back of spring cover 100 is faced towards the collar 40 such that depressions 102 align with the biasing elements 86 to form the aforementioned pockets 94, shown in FIG. 22. Also, the fastener holes 101 of spring cover 100 are aligned with the fastener holes 95 of the spring holder frame 42 such that fasteners 104 may be inserted and fastened therethrough. The fasteners 104 are tightened to secure the spring cover 100 and collar 40 and assembly of parts therein to the tool part element 30. The spring cover 100 may be received within the collar 40 as shown in FIG. 9. The alignment gauge 106 is then removed from the assembly.

However, the order of assembly as shown in FIGS. 19-22 is not intended to be limiting. According to another embodiment, the collar 40, spring holder frame 42, and spring cover 100 may be assembled, with the biasing elements 86 (springs) being secured thereafter. The entire assembly may be then secured together.

As shown in FIG. 9, then, once the collar 40 is assembled onto the tool part element 30, the teeth 78 of the collar 40 are accessible. As a result, when the tool head element 30 is attached to the head interface 40, the teeth 78 may be inserted into receiving grooves 50 thereof, such as shown in FIG. 23.

Figure 26:
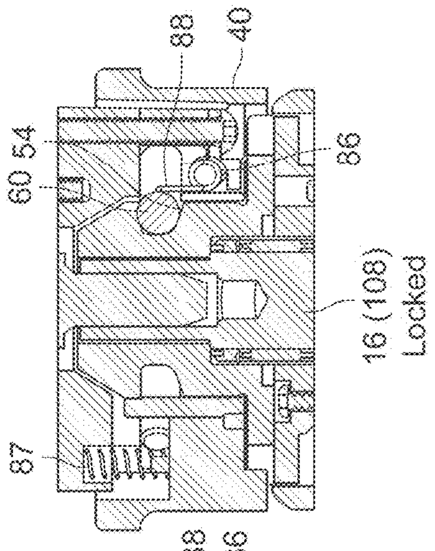
FIGS. 24-26 show cross-sectional views of a process for assembling or locking a tool head element onto a main body portion of the power tool of FIG. 1 in accordance with an embodiment.
Figure 25:
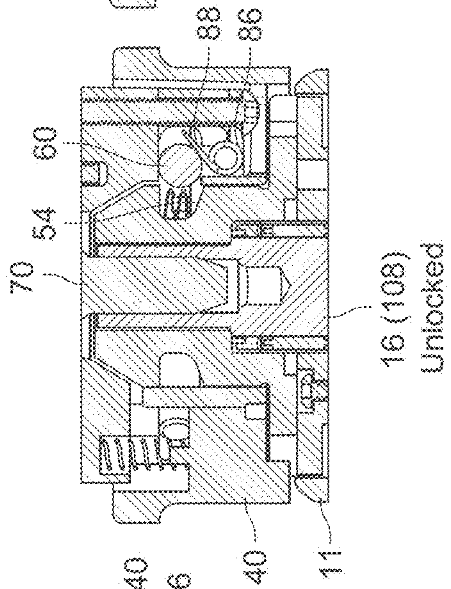
Figure 24:
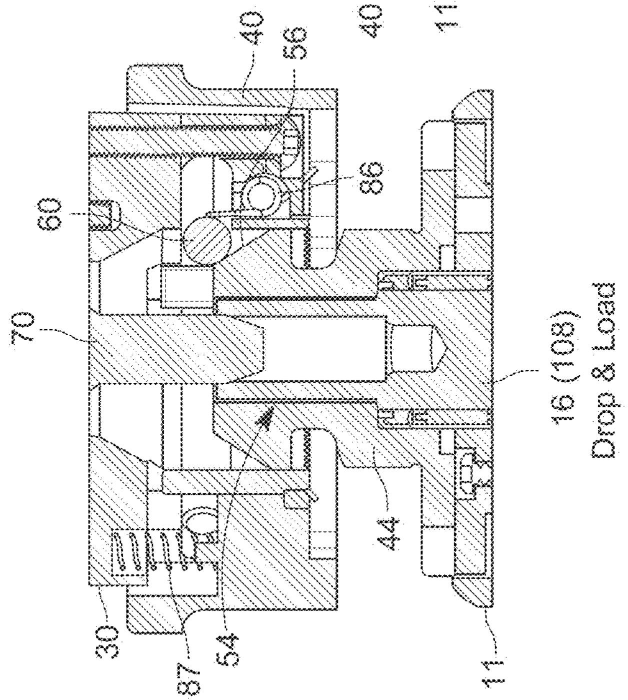
Figure 27:
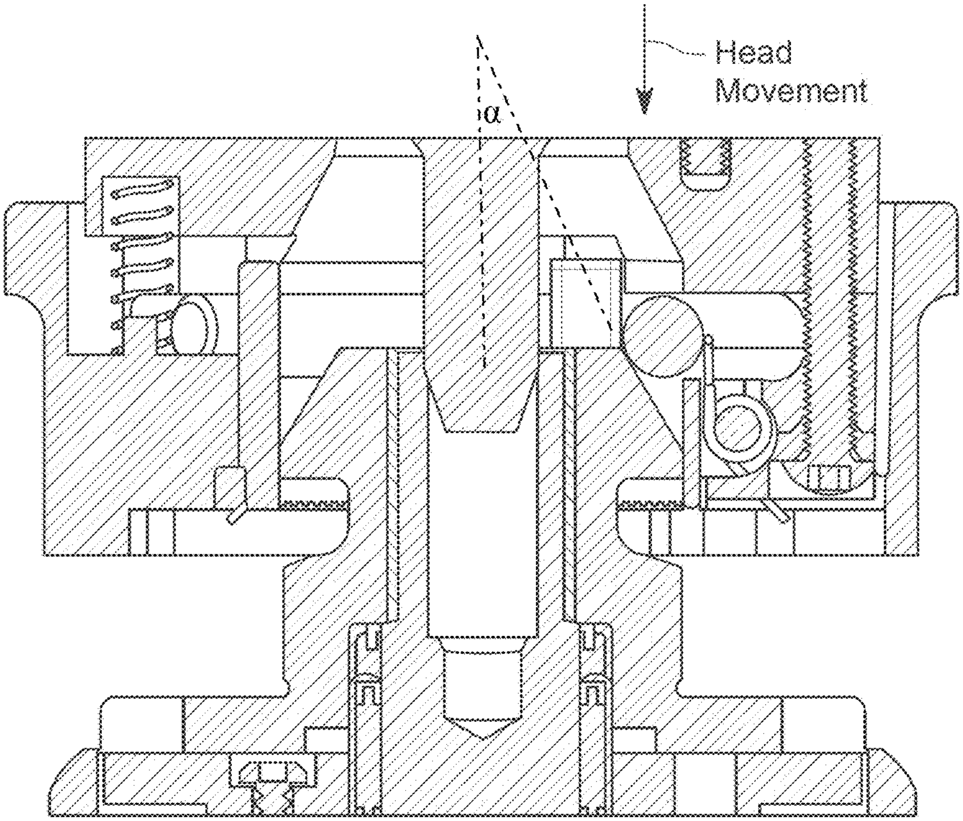
FIG. 27 shows a cross sectional view of movement of parts during the locking process of FIGS. 24-26 in accordance with an embodiment.

FIGS. 24-26 show, in cross-section, the drop and load feature, unlocked assembly, and locked assembly of the tool head element 30 onto the head interface 44 attached to main body portion 11. The collar 40 and input shaft 70 of the tool head element 30 are aligned with the central bore 58 of the head interface 44 for connection (directly or indirectly, e.g., via spindle and bearings arrangement 45 in an embodiment) to the output shaft 16 therein. As shown in FIG. 26, the attachment of the tool head element 30 onto the head interface 44 is configured to occur in a first axial direction (along axis A-A). A user aligns and applies a pushing force to the tool head element 30, i.e., pushing the tool head element 30 towards and onto the head interface 44 and thus the main body portion 11. During this action, which is illustrated in FIGS. 24, 25, and 27, for example, the locking elements 60 are configured for contact and guidance along the mating surface 56 of the head interface 44 so that the locking elements 60 are configured to slide outwardly relative to the input shaft 70, along the mating surface 56 or ramp, and against force from the biasing elements 86 (see FIG. 25). Specifically, as shown in FIG. 25, during installation and pushing of the tool head element 30 onto the main body portion, the locking elements 60 push or force the leg portions 88 of the biasing elements 86 relatively outward and away from the circumferential groove 54 (thus compressing the biasing elements 86), until the locking elements 60 are aligned with and forced into the circumferential groove 54 via the biasing elements 86. That is, once the locking elements 60 are in line with the circumferential groove 54, the tension/spring force from the leg portions 88 pushes the locking elements into the circumferential groove 54 in the radial direction.

The biasing elements (e.g., springs) 86—via at least the leg portions 88—preload the locking elements (e.g., pins) 60 against tool (i.e., head interface 44, 44A), when tool head element 30 is fully seated, and thus locked. As shown in FIG. 26, the locking elements 60 are secured within the circumferential groove 54 of the head interface 44 via leg portions 88 of the biasing elements 86. The collar springs 87 bias the collar 40 in an outmost axial position or a first collar position, relative to the tool part housing 32.

Figure 29:
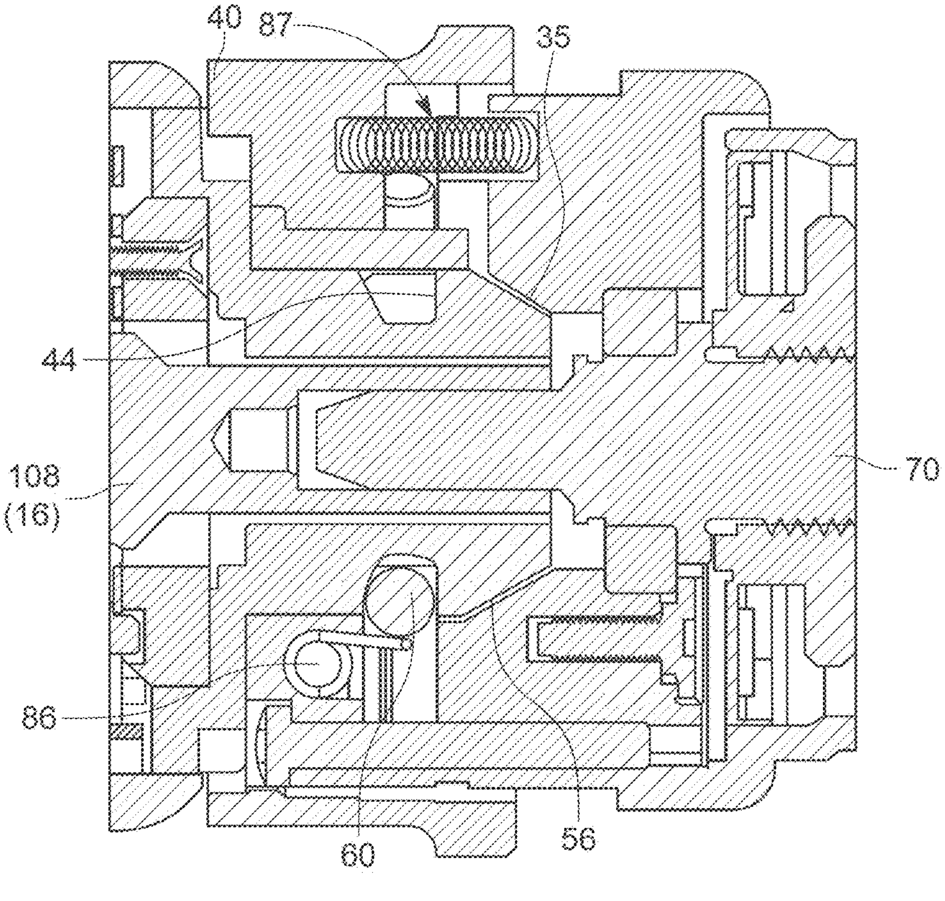
FIG. 29 shows a cross-sectional view of the locked parts in accordance with an embodiment.

FIG. 29 shows in greater detail the alignment of the parts of the power tool 10 when the tool head element 30 is attached thereto. The input shaft 70 is secured within the output shaft 16 which thus establishes a drive connection between the output shaft 16 and input shaft 70, according to embodiments. In other embodiments, the input shaft 70 is secured within the opening 122 on the second end 118 of the spindle and bearings arrangement 45, which in turn is connected to output shaft 16 (108) through its first end 116 and thus establishes a drive connection between the output shaft 16 (108) and input shaft 70. Accordingly, in either embodiment, when the motor and transmission assembly 14 of the power tool 10 is operated, the input shaft 70 is configured to rotate with the output shaft 16 (108) about the axis A-A (via bearing(s) associated therewith) and thus drive the tool head element 30 (and any associated attachments, e.g., drill bits or tools, thereon, e.g., in tool bit holder portion 23). The collar 40 is aligned with the head interface 44 and secured via the locking elements 60 and biasing elements 86. This design provides a minimal clearance between the locking elements 60 and circumferential groove 54 when the locking elements 60 are dropped in, allowing for a secured and improved fit. As shown in FIG. 29, when the tool head element 30 is engaged onto the head interface 44, the locking elements 60 fit within the circumferential groove 54 such that the locking elements 60 contact an interface surface and locking surface 53. The locking elements 60 have a small clearance relative to locking surface 55, which is able to limit axial movement. This arrangement, therefore, limits movement or wiggle room of the locking elements 60 within the groove 54.

Further, as previously noted, the interface portions 52 and 57 of the head interface 44 may be aligned to interface with the spring holder frame 42, as shown in FIG. 29. Specifically, the first interface portion 52 and the interface edge 59 of the second interface portion 57 are configured to interface with the central opening of the spring holder frame 42 when the tool head element 30 is attached to the head interface 44. Similarly, the mating surface 56 of the head interface 44 is accommodated and aligned with opening and angled wall 35 of the backing surface 36 of the tool head element 30.

Figure 31:
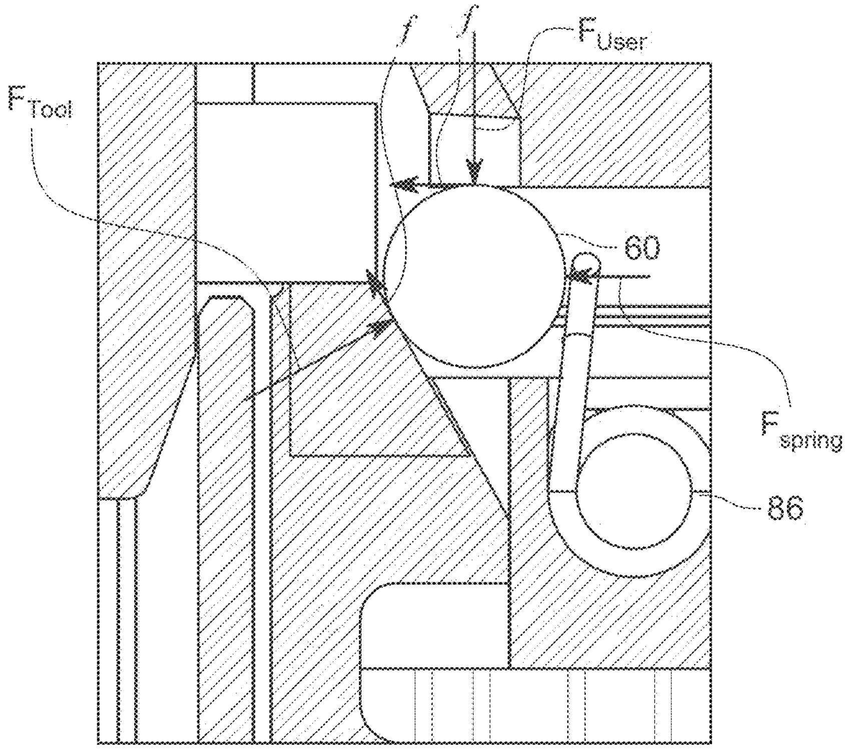
FIGS. 31-32 show, in cross sectional views, force diagrams of the forces and vectors on the locking elements during insertion or assembly and during removal or unlocking/disassembly of the tool head element in accordance with an embodiment.

FIG. 31 illustrates a force diagram of the forces applied during insertion or the drop and load action for attaching the tool head element 30 to the main body portion 11. More specifically, a detailed, cross-sectional view of elements of FIG. 24 are shown in FIG. 31, whereby the locking elements 60, biasing springs 86, et al. are contained within the collar 40 of the tool head element 30. As shown, after aligning and during pushing action of the tool head element 30 in the first axial direction, the locking elements 60 receive a force Fuser thereon in the axial direction. A biasing force Fspring from the leg portions 88 of the biasing elements 86 is also applied to the locking elements 60 in the radial direction. Force Ftool from the head interface 44 is applied at an angled direction (or diagonal direction) relative to the axis A-A from the mating surface 56 to the locking elements 60 as well. The biasing force Fspring from the leg portions 88 of biasing springs 86 is designed to be temporarily overcome (see, e.g., FIG. 25) by the Ftool and Fuser forces as the tool head element 30 is further pushed onto the head interface 44, whereby the locking elements 60 are effectively moved along the mating surface 56 to interfacing edge 59. The leg portions 88 are moved (e.g., in the illustration, rotated outwardly or counter-clockwise to tension the biasing spring 86) when forces Ftool and Fuser are applied. After passing the interfacing edge 59, the locking elements 60 are moved towards and dropped or forced into the circumferential groove 54 of the head interface 44 (as shown in FIG. 26, for example). The biasing force Fspring moves the locking elements into the groove 54 and holds the locking elements 60 in position, such that the tool head element 30 is locked onto the head interface 44 and connected to the main body portion 11 for operation.

In embodiments, the collar 40 is configured for linear movement in the axial direction at least for disengagement of the locking elements 60 and/or removal of the tool head element 30 from the head interface 44. That is, the collar 40 may be moved linearly and relatively away from the main body portion 11 for rotational or angular adjustment without removing the tool head element 30 off of the head interface 44. As mentioned previously, this movement of the collar 40 allows a user to rotate a position of the tool head element 30 via withdrawing the teeth 78 from the receiving grooves 50 and rotationally repositioning the teeth 78 into alternate receiving grooves 50, thus providing the user the ability to change to different rotational position(s) (and thus any elements associated with tool bit holder portion 23), as needed.

Figure 28:
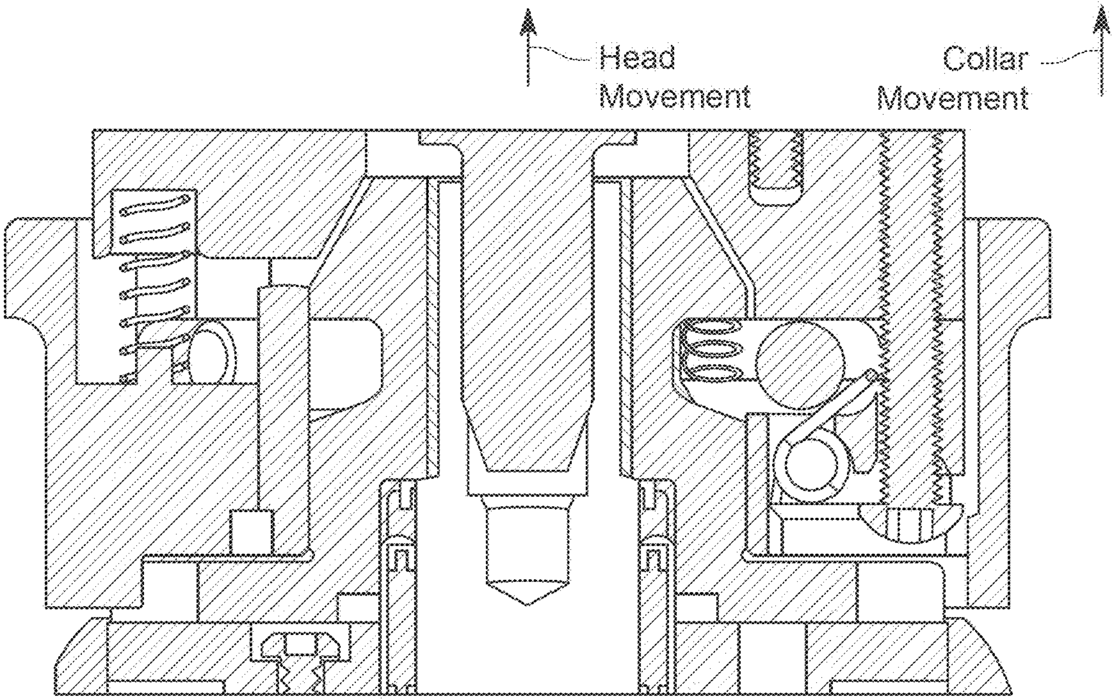
FIG. 28 shows a cross sectional view of movement of parts during a process for unlocking the tool head element from the main body portion of the power tool in accordance with an embodiment.
Figure 30:
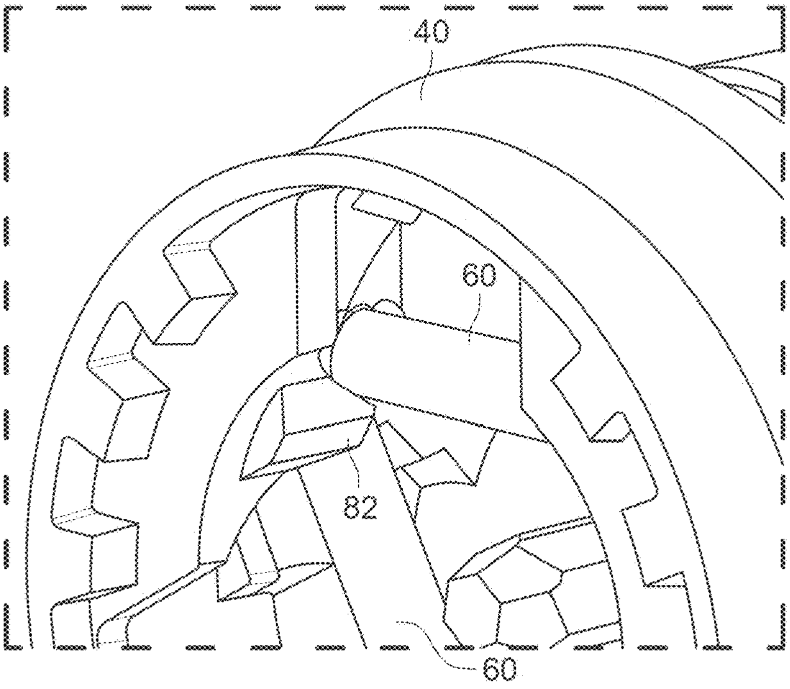
FIG. 30 shows movement of locking elements during the unlocking process of FIG. 28, from a back end, in accordance with an embodiment.

According to embodiments, removal of the tool head element 30 from the head interface 44 is configured to occur in a second axial direction that is opposite to the first axial direction. That is, a user moves the collar axially and also applies a pulling force on the collar 40 of the tool head element 30, i.e., pulling both the collar 40 and tool head element 30 away from the main body portion 11. This movement works against the biasing force of the collar springs 87 and allows axial movement of the collar 40 away from its first or outmost axial position, to a second collar position. Such axial movement of the collar 40 results in a force that pushes the locking elements 60 relatively outwardly from the circumferential groove 54 and against forces of the biasing elements 86. As shown in FIGS. 28 and 30, pulling the collar 40 away from the tool results in compression of the biasing element(s) 86 by way of the locking elements 60 being moved outwardly relative to the central axis A-A.

As noted with regards to FIGS. 13-14, the locking elements 60 are configured to move from the bottom wall 82 and up along the ramped surface 80 when the collar 40 and tool head element 30 are pulled and moved axially (linearly) in the second direction. Specifically, locking elements 60 are moved along the ramped surface 80 and towards the wedge elements 84. FIG. 30 shows how wedge elements 84 are configured to drive or push locking elements 60 outwardly relative to the axis A-A and to move the locking elements 60 out of the circumferential groove 54 of the head interface 44. By moving the locking elements 60 outside of the outer diameter of the interfacing edge 59 and moving leg portions 88 of the biasing elements 86, then, as shown in FIG. 28, the locking elements 60 are free to move out of the groove 54 and along the edge 59. As such, this thereby enables movement of the tool head element 30 axially away from the head interface 44 and thus removal of the tool head element 30 from the main body portion 11.

Figure 32:
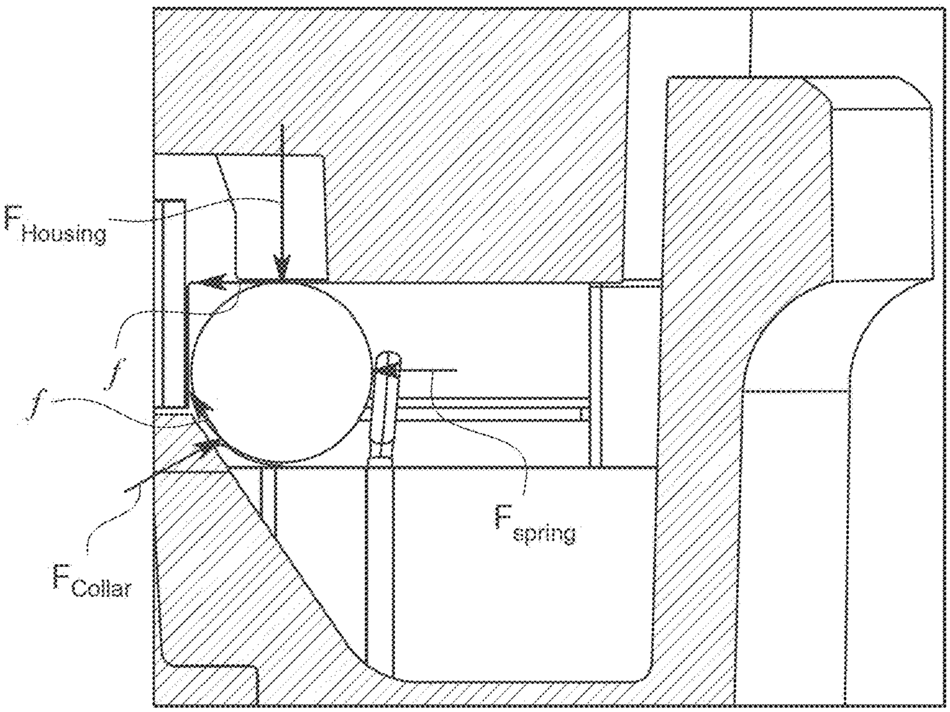

FIG. 32 illustrates a force diagram of the forces applied during removal and unlocking of the tool head element 30 from the main body portion 11. Such forces are similar to those described with respect to FIG. 31, working in an opposite manner. As shown, during pulling action of the tool head element 30 in the second axial direction, while biasing force Fspring from the leg portions 88 of the biasing elements 86 is applied in the radial direction, the locking elements 60 receive a force Fhousing thereon in the axial direction, as well as a force Fcollar from the collar applied at an angled direction (or diagonal direction) relative to the axis A-A. As the collar 40 and tool head element 30 are moved (see FIG. 28) in the second axial direction, the biasing force Fspring from the leg portions 88 of the biasing elements 86 is temporarily overcome and the locking elements 60 are able to move out of the circumferential groove 54. Accordingly, the Fhousing and Fcollar forces overcome the biasing force Fspring so that the tool head element 30 is moved away from the head interface 44. During removal, force Ftool from the head interface 44 is applied at an angled direction along with force from the mating surface 56 to the locking elements 60 until the tool head element 30 fully removed.

Figure 33:
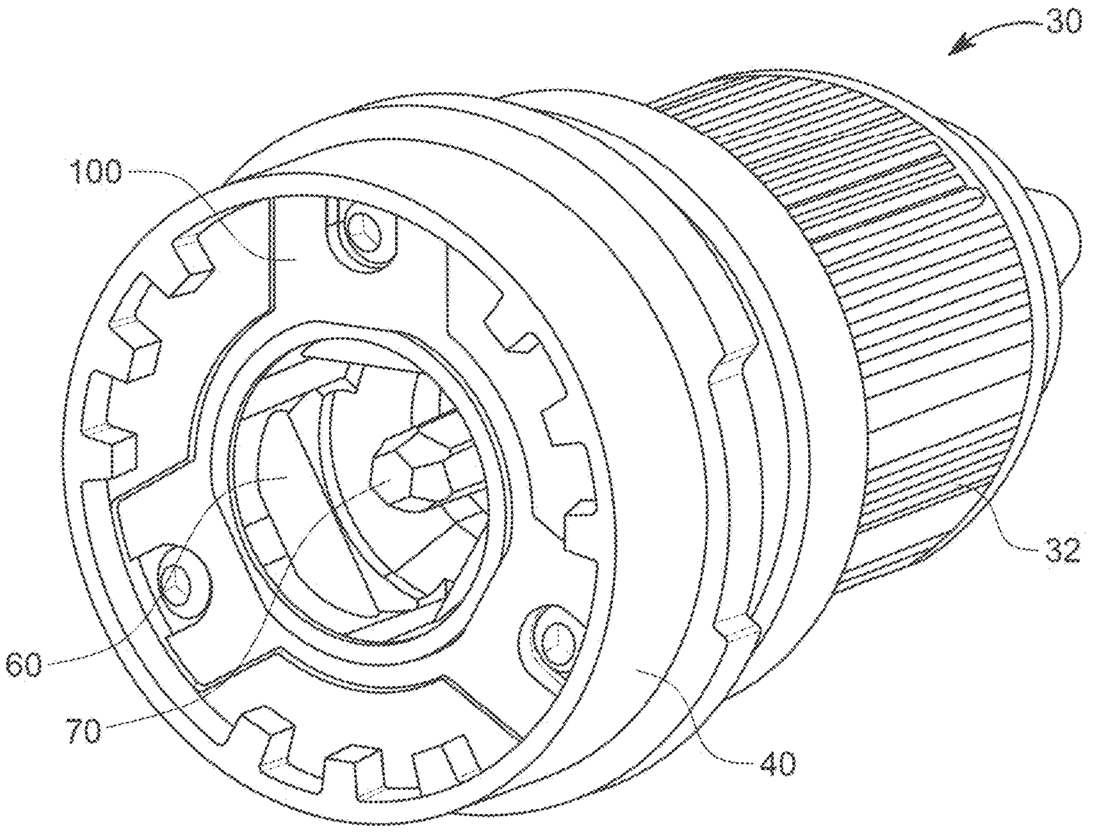
FIG. 33 shows a first angled view of a hex shaped shaft of the tool head element used with the power tool of FIG. 1 in accordance with an embodiment.
Figure 34:
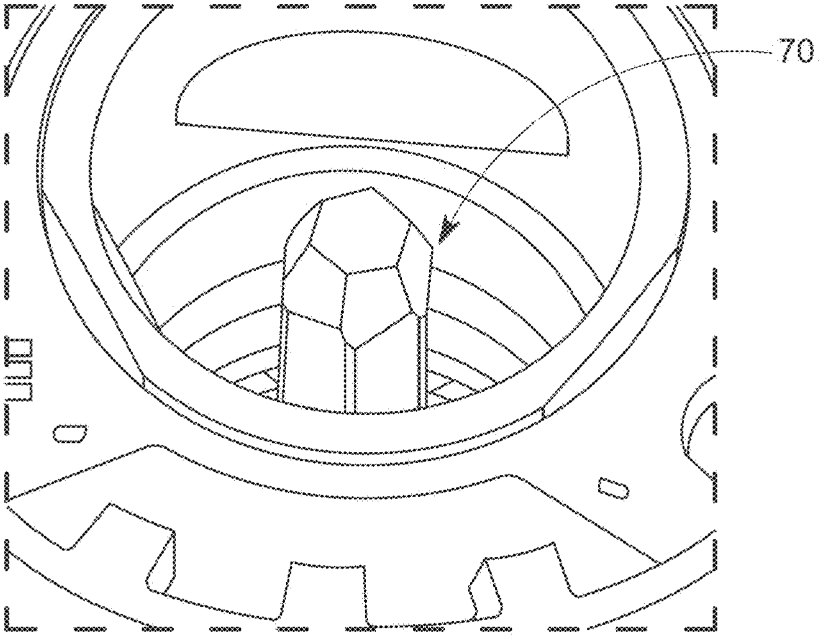
FIG. 34 shows a detailed view of the hex shaped shaft within the collar and tool head element of FIG. 33.
Figure 35:
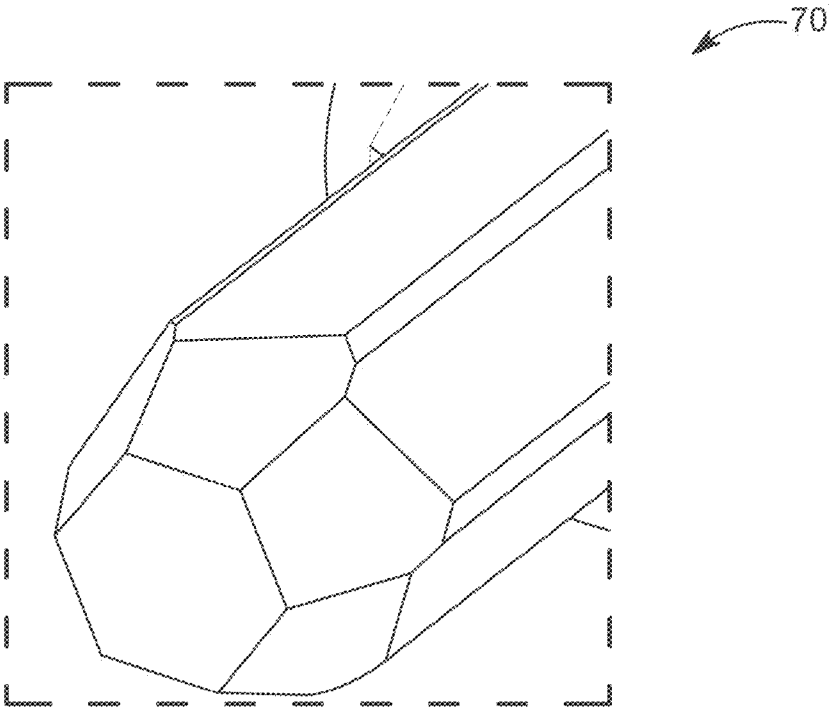
FIG. 35 shows an isometric view of the hex shaped shaft in accordance with an embodiment.
Figure 36:
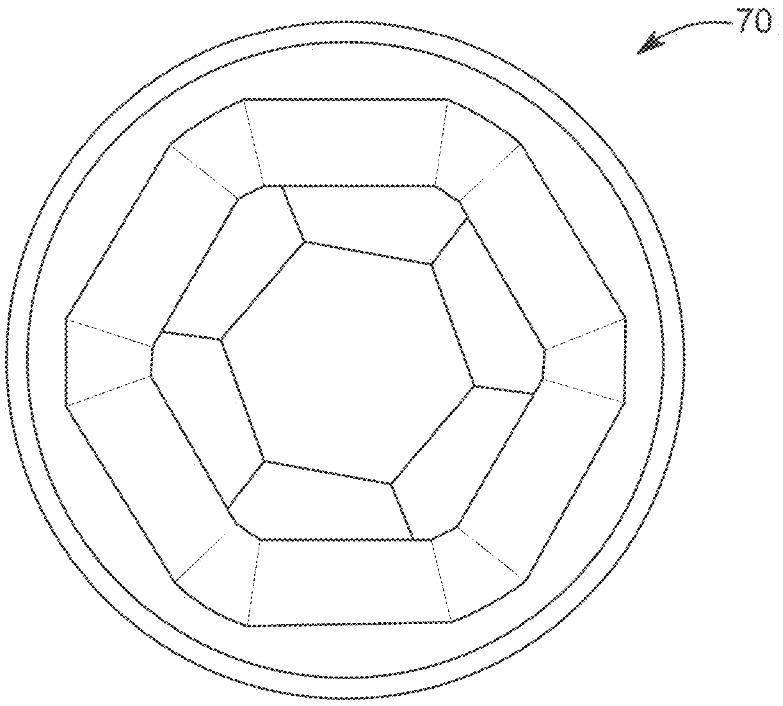
FIG. 36 shows an end view of the hex shaped shaft in accordance with an embodiment.

Turning now to FIGS. 33-37B, an exemplary input shaft 70 of the tool head element 30 is illustrated. As previously noted (and shown in FIG. 10, for example), the input shaft 70 has at least one bearing associated therewith and provided within the housing of the tool head element 30 for guiding rotation thereof when assembled for operation. FIG. 33 shows a first angled view of the input shaft 70, with a lead-in end of angled hex edges, provided in the form of a hex shaped shaft in accordance with an embodiment. FIG. 34 shows a detailed view of the hex shaped shaft. In such an embodiment, the shape of the connecting hex on the input shaft 70 of the tool head element 30 is altered to make it easier for lining up with the main body portion 11 and its output shaft 16/108. In particular, the hex shapes at the lead-in end allows for self-alignment of the input shaft 70 within the opening of output shaft 16 or receiving opening 122 of spindle body 108, when being attached to the main body portion 11. As seen in FIGS. 35-36, the input shaft 70 has a general hex shape along its body (extending along a shank portion) providing six edges or surfaces, whereas an end portion or lead-in end (at the front point) of the shaft 70 has smaller hex edges rotated relative to each other and to the hex edges of the body. More specifically, the shank of the input shaft 70 is generally hexagonal in shape as it extends from the tool head element 30, wherein the hex edges of the lead-in end are rotated relative to a central axis of the shank. The hex edges are provided at a depth at a front/lead end portion of the input shaft 70. In an embodiment, the smaller hex edges are rotated between 5 degrees to 45 degrees relative to the six edges of the body and central axis of the input shaft. In one embodiment, the smaller hex edges are rotated by about 10 degrees to 15 degrees relative to the edges of the body. In another embodiment, the smaller hex edges are rotated 30 degrees or less relative to the edges of the body. The depth or length of the cut hex edges extending from the front point of the lead-in end is not intended to be limiting, and are designed to be provided at a depth or length along the shaft without limiting length.

Figure 37B:
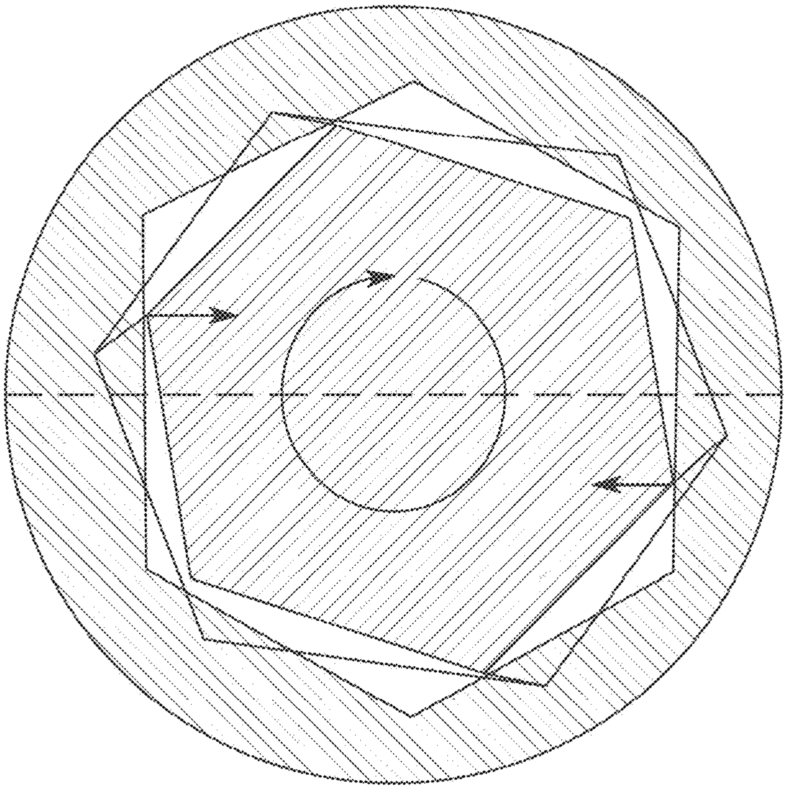
FIGS. 37A-37B show an interaction of the hex shaped shaft and output shaft in accordance with an embodiment.
Figure 37A:
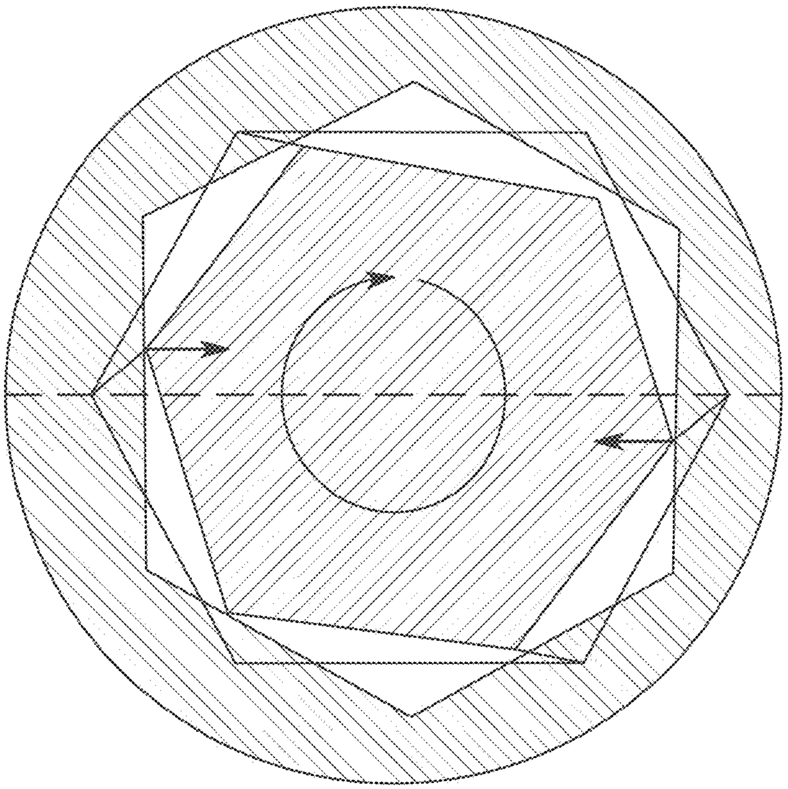

When aligning the input shaft 70 (male hex) into the head interface 44 and thus output shaft 16/108 (female hex), then, there is a less likelihood of misalignment and locking up of the tool head element 30, since the hex shaped input shaft 70 provides an allowance for force and rotation. The lead-in edge with smaller hex edges are designed for insertion into the output shaft/spindle 16, 108. As illustrated in FIGS. 37A-37B, an interaction between hexes of the input shaft 70 and the inside of output shaft 16, 108 creates a moment due to imbalance of forces. As consistent push force is applied, the hex input shaft 70 rotates and creates a positive feedback loop as the moment arm grows. That is, since the hex input shaft 70 is provided on a bearing (within tool head element 30), the push force from a user while attaching tool head element 30 will allow slight rotation (or spinning) of the hex input shaft 70, as shown, for alignment of the input shaft 70 within the output shaft 16, 108. In embodiments, a user may apply power to power chuck (via trigger) and spin the output shaft 16, 108 to rotate the shaft(s) for alignment.

Accordingly, alignment is easier. Further, as consistent force is applied, the hex of input shaft 70 rotates and creates a positive feedback loop as the moment arm grows.

The attachment of head interface 44 to the tool head element 30 generates a relative torque between an input shaft 70 and output shaft 16 when a rotational force is applied thereto (e.g., via activation of the motor of the power tool 10). Although the input shaft 70 is shown in the Figures as a having a particular number of surfaces on the lead-in end, such surfaces are not limited to hexagonal features. In another embodiment, the lead-in end of the input shaft 70 may include alternative compound 3D surface features that enable self-locking and/or self-alignment features, which may include other angles or shapes, for the connection.

Figure 49:
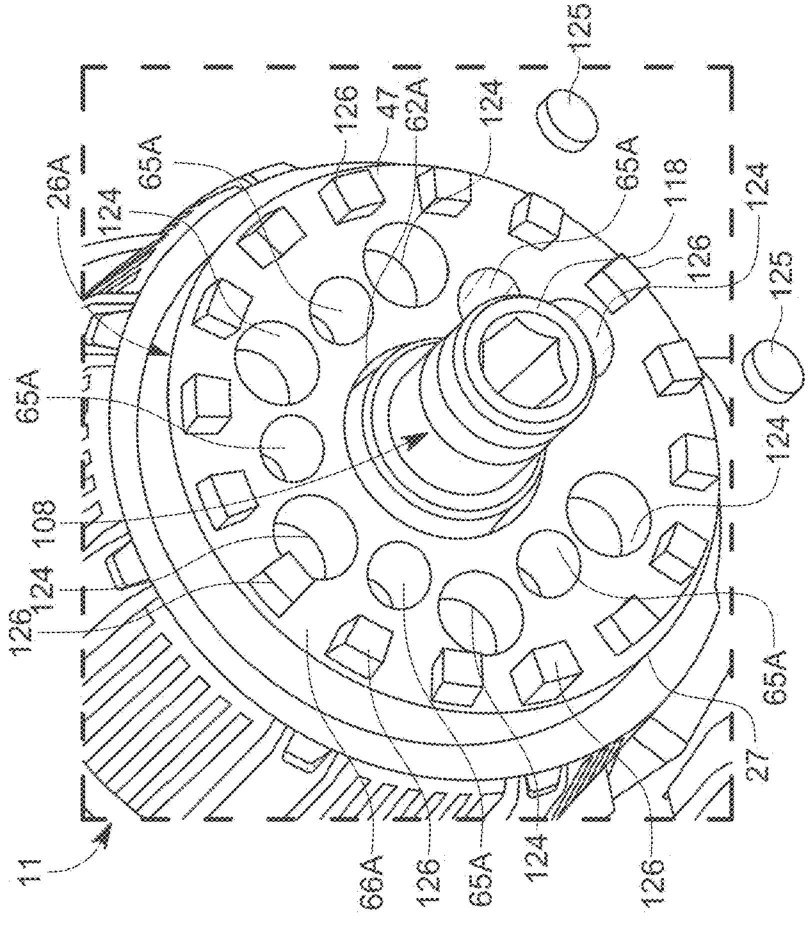
FIG. 49 shows a first isometric view of a plate and main body portion of the power tool in accordance with yet another embodiment.

FIGS. 49-55 show power tool 10 utilizing a magnetic head attachment configuration according to another embodiment. In particular, FIG. 49 illustrates an example of a universal head interface in the form of a magnetic universal plate 26A according to another embodiment, and FIGS. 50-55 illustrate tool head element 30A and/or parts thereof according to another embodiment. Tool head element 30A may be configured to attach to main body portion 11 of power tool 10 via magnetic connection as realized by magnetic universal plate 26A on the power tool 10 and complementary part (e.g., disc) of magnetic material on the tool head element 30A. Further, as described below, the tool head element 30A and magnetic universal plate 26A include corresponding castellations to provide a keyed-type connection elements for aligning and connecting these parts.

The universal plate 26A includes a connection plate 66A or flange with a central opening 62A therein that accommodates, in accordance with one embodiment, spindle and bearings arrangement 45 as previously described (see, e.g., FIGS. 38 and 44) and thus not repeated here. That is, output shaft 16 may be connected to a first end of the spindle and bearings arrangement 45, while a second end of the arrangement 45 is used for attachment through central opening 62A of the universal plate 26A, thereby accommodating at least second end 118 of the spindle and bearings arrangement 45 therethrough, as shown in FIG. 49. In another embodiment, the second end of the output shaft 16 is configured for insertion through the central opening 62A. An outer diameter of the connection plate 66A or flange may be based on a diameter or dimensions of an interface on the main body portion 11 to which the universal plate 26A is connected (see, e.g., FIG. 49), in accordance with some embodiments herein. An inner diameter of the central opening 62A may be dimensioned or sized based on dimensions (e.g., diameter) of the spindle body 108 and/or output shaft 16; that is, the central opening 62A may be sized to allow rotation and clearance of the spindle body 108/output shaft 16 therein. The universal plate 26A is connected to a front face or interface of the main body portion 11 (adjacent to clutch collar 27) via fasteners or screws being placed through holes 65A (see FIG. 49) in the flange/connection plate 66A for securement to main body portion 11. Holes 65A are provided in a flange/connection plate 66A placed against the main body portion 11. The holes 65A are aligned with corresponding holes (not shown) provided on the main body portion 11. Flange/connection plate 66A may be placed against the main body portion 11 and fasteners placed through the aligned holes. Any number of fasteners or holes may be utilized for attachment of the universal plate 26A and the number shown in the Figures is not intended to be limiting. As represented in FIG. 49, in embodiments, a front surface 47 of the universal plate 26A, i.e., a surface that is front or forward facing from the main body portion 11, is shown in FIG. 49. According to embodiments, a back surface of the universal plate 26A, i.e., the surface that is placed against interface of the main body portion 11 for attachment thereto, is similar to any one of the herein disclosed embodiments. The central opening 62A of the universal plate 26A is aligned with the second end 118 of the spindle and bearings arrangement 45, so that at least this end 118 of the spindle body 108 is pushed therethrough. Fasteners or screws are used through holes 65A to secure the universal plate 26A, so that the front surface of the universal plate 26A is then accessible for tool head element 30A attachments.

Also on the front surface 47 of the universal plate 26A are a number of magnet receiving pockets 124 spaced circumferentially around the opening 62A, and thus spindle and bearings arrangement 45. Magnets 125 (schematically represented in FIG. 49) are inserted and embedded into empty pockets 124 in the front surface 47 of the universal plate 26A front for axial retention when interacting with parts of the tool head element 30A. Magnets 125 may be secured via press-fit connection and/or via use of an adhesive or glue, for example. As described below, magnets 125 on the body portion 11 interact with a component of the tool head elements 30A to secure/retain and constrain the tool head element 30A onto the tool 10 axially via a strong magnetic force. FIG. 49 illustrates a non-limiting embodiment wherein six pockets 124 (and thus six magnets 125 inserted therein) are spaced around the axis A-A and spindle and bearings arrangement 45; however, this number is not intended to be limiting. That is, more or less magnets and pockets may be provided in accordance with embodiments. Around an outer edge of the universal plate 26A there may be provided a number of castellations 126 extending from the front surface 47 forwardly for connection and/or interaction with corresponding castellations 130 on tool head element 30A. The castellations 126 may be spaced circumferentially around the edge with spaces therebetween, for example.

Figure 50:
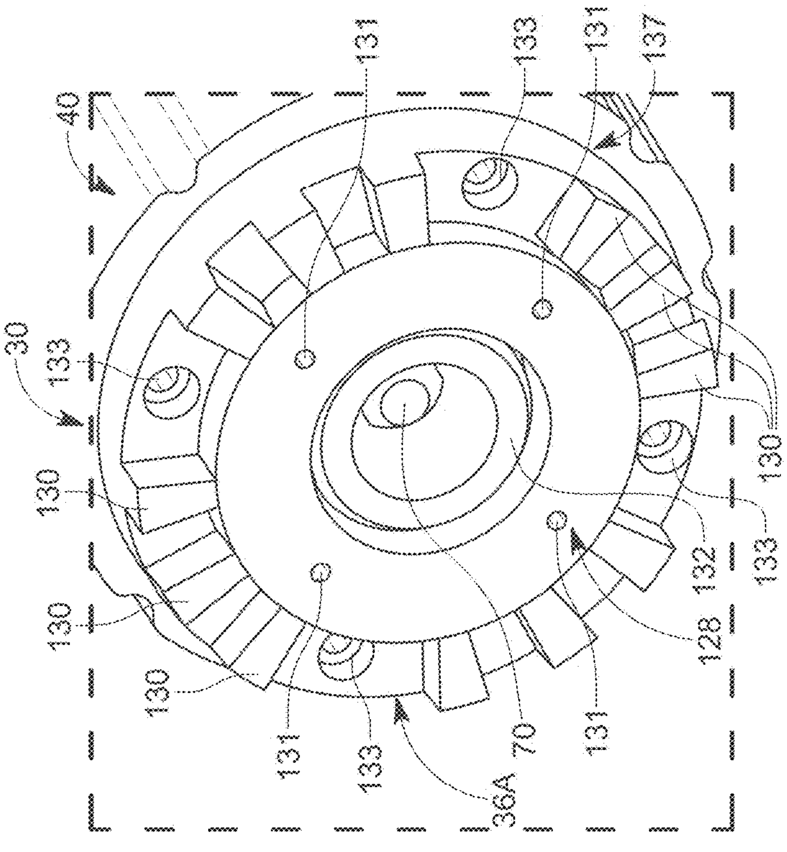
FIG. 50 shows a back isometric view of a collar provided on a tool head element used in the power tool in accordance with an embodiment.

Turning now to features of the tool head element(s) 30A for the magnetic connection, FIG. 50 shows backing surface 36A of an exemplary tool head element 30A, which is designed for connecting to the front surface 47 of the universal plate 26A when attaching tool head element(s) 30A to the main body portion 11 of the power tool 10. Castellations 130 are provided on an outer rim 137 of tool head element 30A, to interact with castellations 126 on the universal plate 26A, thereby allowing a user to align and lock the tool head element 30A onto the main body portion 11, as well as set an angular position of the tool head element 30A. That is, a user may rotate the position of the tool head element 30A about the axis A-A and thus the tool associated therewith (e.g., in the tool bit holder portion 23). As shown in FIG. 50, the castellations 130 extend from the backing surface 36A, and, more particularly, a back surface of the outer rim 137. The outer rim 137 and backing surface 36A may be part of a frame element 136, shown in FIG. 52 that surrounds internal components and mechanisms. In one embodiment, a corresponding number of castellations 130 to number of spaces between castellations 126 on universal plate 26A may be provided. In another embodiment, a lower number of castellations 130 to number of spaces between castellations 126 on universal plate 26A may be provided.

Figure 51:
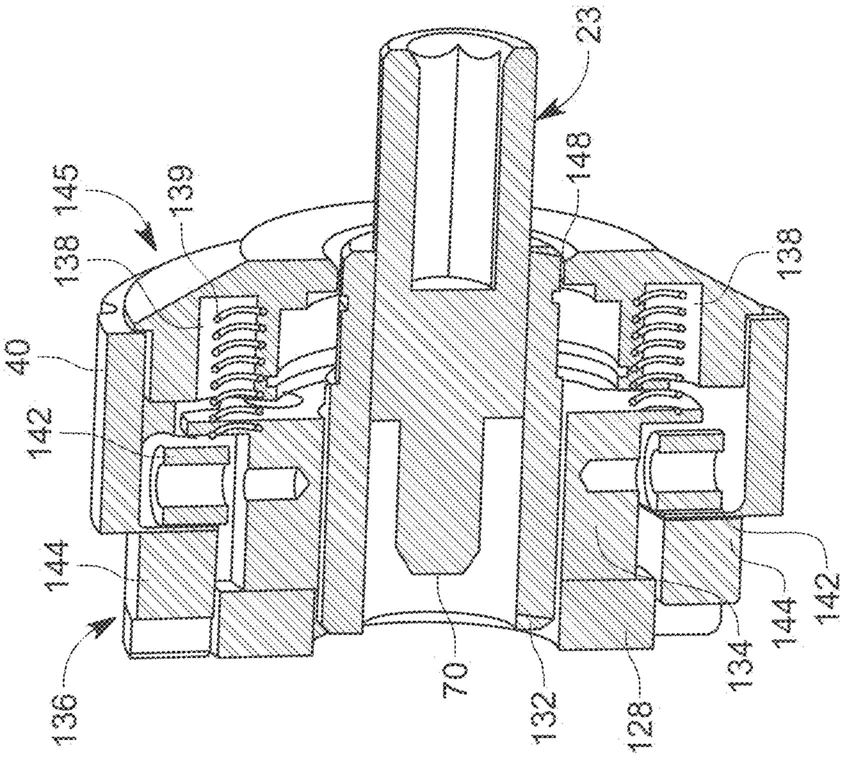
FIG. 51 shows a cross sectional view, in an axial direction, of the tool head element of FIG. 50 in accordance with an embodiment.

The outer rim 137 may be attached to cam guides 140 of the frame element 136 via fasteners being inserted through openings 133 therein. The cam guides 140 are fixedly attached to a front facing frame portion 145 via fasteners or screws, according to an embodiment. The front facing frame portion 145 has an opening 148 therein (see, e.g., FIG. 51) to accommodate a rotating coupler 132 and input shaft 70 therethrough. In addition, a back surface of the front facing frame portion 145 includes a number of spring-receiving holes 138 spaced therearound (see, e.g., FIG. 52) wherein springs 139, such as coil springs according to an embodiment, are inserted therein. A first end of each of the springs 139 is placed again a surface within hole 138 of the front facing frame portion 145 and a second end is placed against a disc carrier 134, such as shown in FIG. 51. The springs 139 are designed to bias the disc carrier 134, and thus a disc 128, outwardly away from the front facing frame portion 145.

Figure 52:
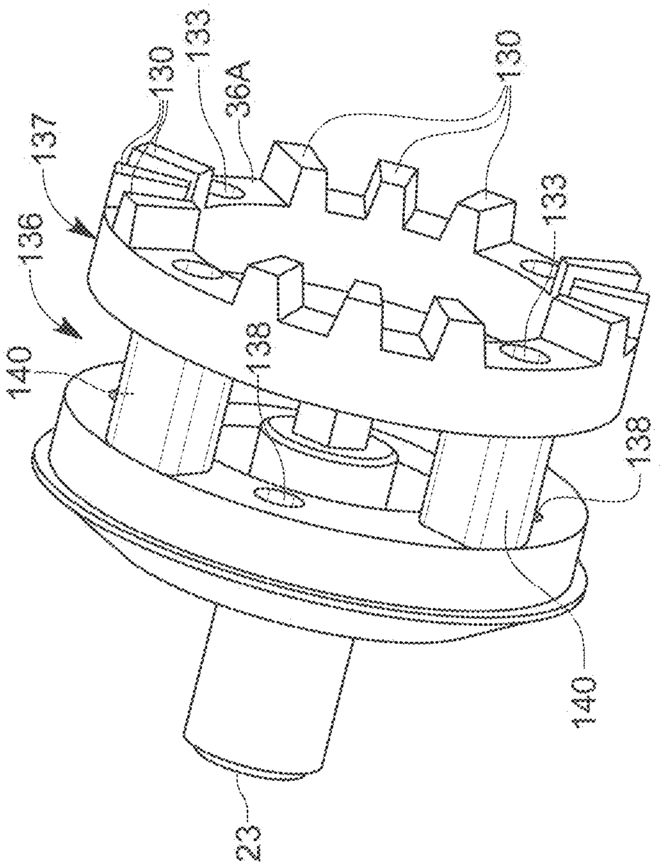
FIG. 52 shows an isometric view of parts of the tool head element of FIGS. 50-51 in accordance with an embodiment.

As previously noted, tool head element 30A is configured to include mechanisms for quick attachment and quick release of the tool head element from the main body portion, including at least one part or component for connecting magnetically to the universal plate 26A. More specifically, in accordance with an embodiment, the component of the tool head element 30A may include metal disc 128 (see FIG. 50), such as a steel disc, for magnetic connection with the magnets 125 of the universal plate 26A. Generally, the metal disc 128 is positioned within a body of the tool head element 30A, and, in particular, within the frame element 136, such as depicted in the cross sectional view of FIG. 51 and FIG. 53. The disc 128 is fixed to disc carrier 134 via fasteners through openings 131. Disc 128 is configured to be axially displaced by collar 40A allowing for attachment and removal of the tool head element 30A, as described below. The disc carrier 134 and disc 128 are inserted within the frame element 136. FIG. 52 shows frame element 136 of the tool head element 30A with the collar 40A, disc carrier 134, and disc 128 (among other features) removed. The disc carrier 134 may be inserted within the frame element 136 for axial movement relative thereto, for the attachment and removal of the tool head element 30A.

Figure 54:
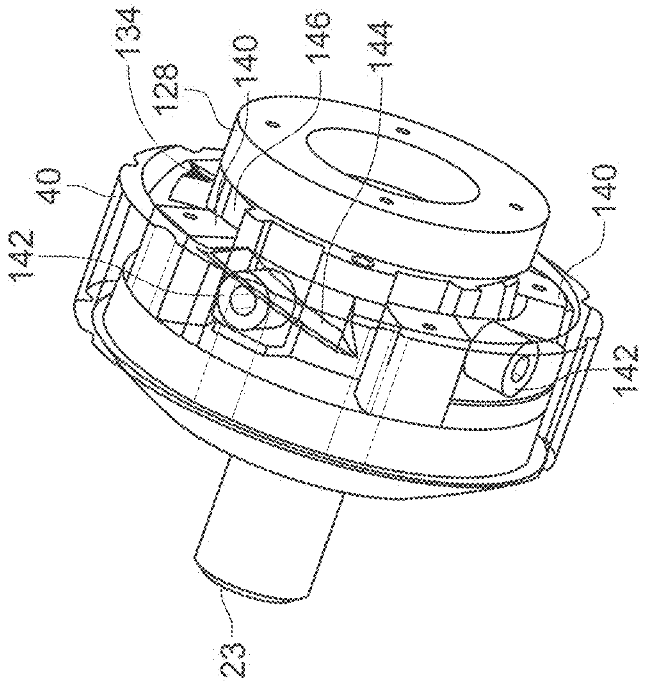
FIGS. 53-54 show operation of the collar of the tool head element of FIGS. 50-52, in accordance with an embodiment.
Figure 53:
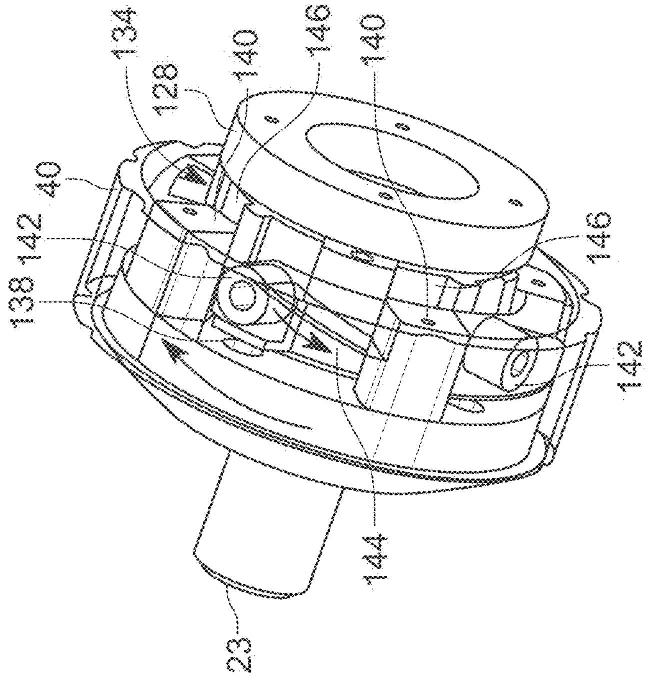

Collar 40A surrounds at least part of the frame element 136, as shown in FIG. 51 as well as FIG. 53. Collar 40A includes a number of wedges or ramps 144 therein for accommodating bearings 142, each bearing 142 being configured to move along a corresponding ramp 144 for use when unlocking the tool head element 30A relative to the main body portion 11. As the collar 40A is rotated from one position to another, the cam guides 140 interacts with the disc carrier 134 to thereby move linearly and thus move bearings 142 along the ramps 144. As better shown in FIGS. 53-54, the disc carrier 134 includes a series of indentations 146 spaced around its circumference for accommodating the number of cam guides 140 associated with frame element 136. When the tool head element 30A is attached to main body portion 11, as the collar 40A is rotated about the axis, e.g., axis A-A and in the clockwise direction as depicted in FIG. 53, the bearings 142 are moved upwardly along the ramps 144 as shown in FIG. 54, thereby guiding the cam guides 140 linearly along indentations 146 of the disc carrier 134, in a direction parallel to the axial direction. As such, the disc carrier 134 is moved linearly relative to the axis A-A. In turn, because disc 128 is attached to and thus moved with the disc carrier 134, disc 128 is also moved linearly away from the magnetic universal plate 26A on the main body portion 11. That is, as the bearings 142 move along the ramps 144 when collar 40A is rotated, the disc 128 is subsequently moved relative to the magnets 125 of the universal plate 26A, thereby reducing the magnetic force. Thus, a user may use a pulling force to remove the tool head element 30A from the main body portion 11.

Figure 55:
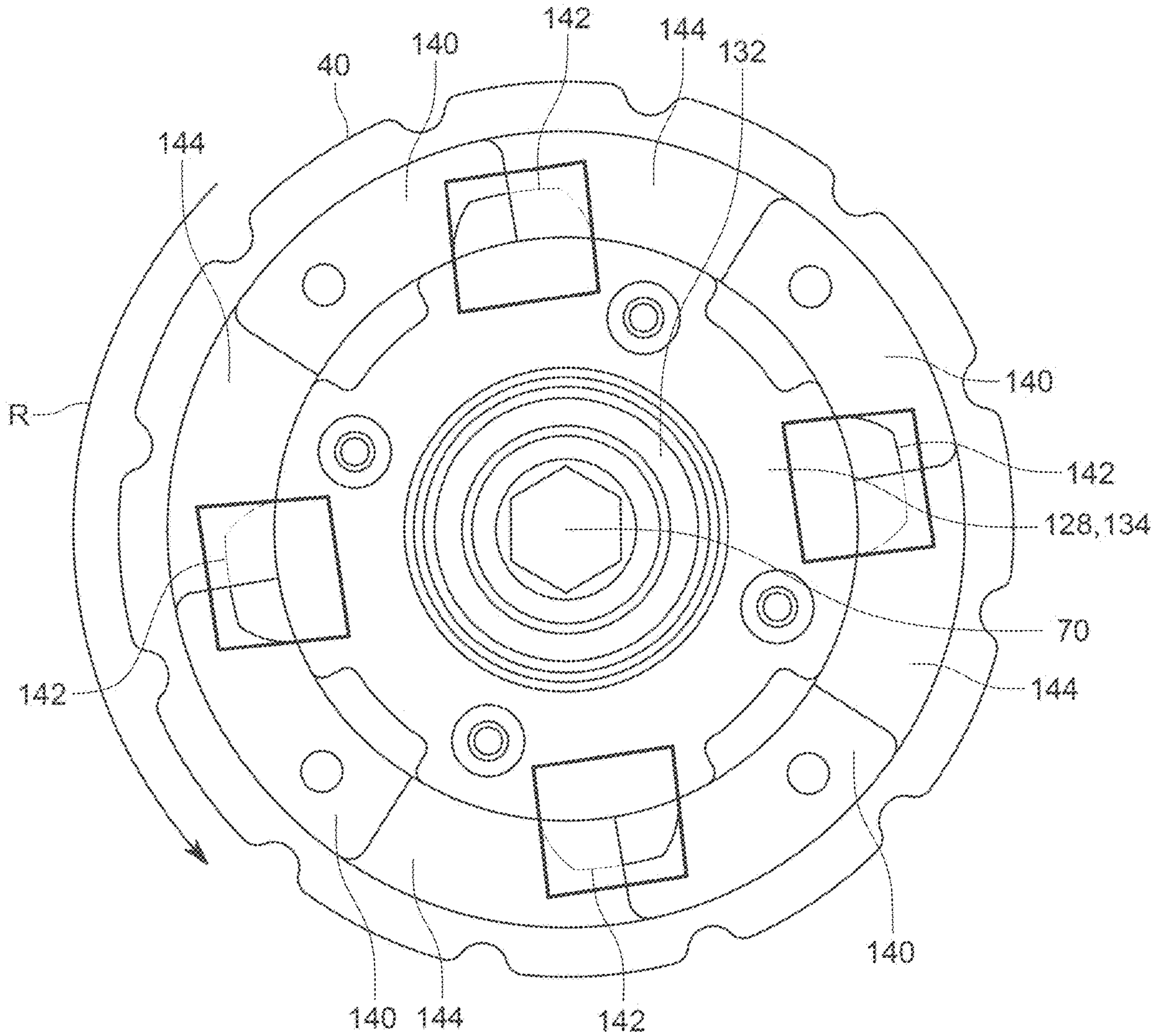
FIG. 55 shows a schematic view of exemplary movement of components when unlocking the tool head element of FIGS. 50-52 from the main body portion of FIG. 49, in accordance with an embodiment.

FIG. 55 schematically illustrates an example of the movement of components when unlocking the tool head element 30A from the body portion 11. As the outer collar 40 rotates as indicated by arrow R, the ramps 144 force the bearings 142 axially upwards (i.e., in FIG. 55, upwards is out of the page), which forces the disc carrier 134 upwards as well, since it is rotationally constrained by frame element 136. Accordingly, the disc 128 is withdrawn and pulled relatively away from magnets 125 of the universal plate 26A. Pulling the disc 128 away from the universal plate 26A enables a user to release the tool head element 30A from the main body portion 11. Because magnetic force is inversely proportional to the distance squared, the displacement of the component can be relatively small.

When the tool head element 30A is attached to the main body portion 11, input shaft 70 is configured to removably couple and effectively rotate with the spindle and bearings arrangement 45/output shaft 16 of the main body portion 11 when the trigger of the power tool 10 is activated. As previously described (and thus not repeated in detail here), one end of the input shaft 70 (seen in FIG. 50) is aligned and inserted into the receiving opening 122 of the spindle body 108, while at the other or opposite end of the input shaft 70 is tool bit holder portion 23 which is accessible for use and/or further attachments. As shown in FIG. 51, tool bit holder portion 23 and input shaft 70 may be surrounded by rotating coupler 132 assembled in the tool head element 30A. Rotating coupler 132 is configured to rotate along with spindle and bearings arrangement 45 and input shaft 70 when the power tool 10 is activated.

Accordingly, in this exemplary alternate embodiment, it has been shown that magnets 125 incorporated into the universal plate 26A on the tool main body portion 11 provide a strong attractive magnetic force to a steel retention component/disc 128 on the tool head element 30A to constrain the head element 30 onto the power tool 10 axially, while castellations 126 and on both the tool head element 30A and body portion 11 hold the tool in one angular position. The disc 128 and disc carrier 134 may be axially displaced while the tool head element 30A is attached to the tool main body portion 11, and provides a mechanical advantage that allows high strength magnets 125 to be used.

A mechanical advantage may be realized in that the user is allowed to substantially decrease magnetic force between the tool head element and the tool body while providing minimal user force. This mechanical advantage allows a strong magnetic force to be used which provides a reliable axial constraint of the head onto the tool body.

In accordance with embodiments herein, at least the disc 128 is formed of steel or a similar magnetic metal. In an embodiment, the magnetic universal plate 26A is also formed of steel in addition to the disc 128. This magnetic head attachment configuration of FIGS. 49-55 provides a static connection between the tool head element 30A and main body portion 11 and minimizes internal forces necessary to operate the attachment and power tool. Generally, the magnetic attachment allows for a drop-in-load design, with a user simply including a push/pull motion to attach/remove the tool head element 30A with radial locking elements and thus change position, radial locks on collar. Further, different tool head elements 30A may utilize such magnetic features and mechanisms which are independent from the elements (like plate 26A) provided on the main body portion of the tool.

Figure 56:
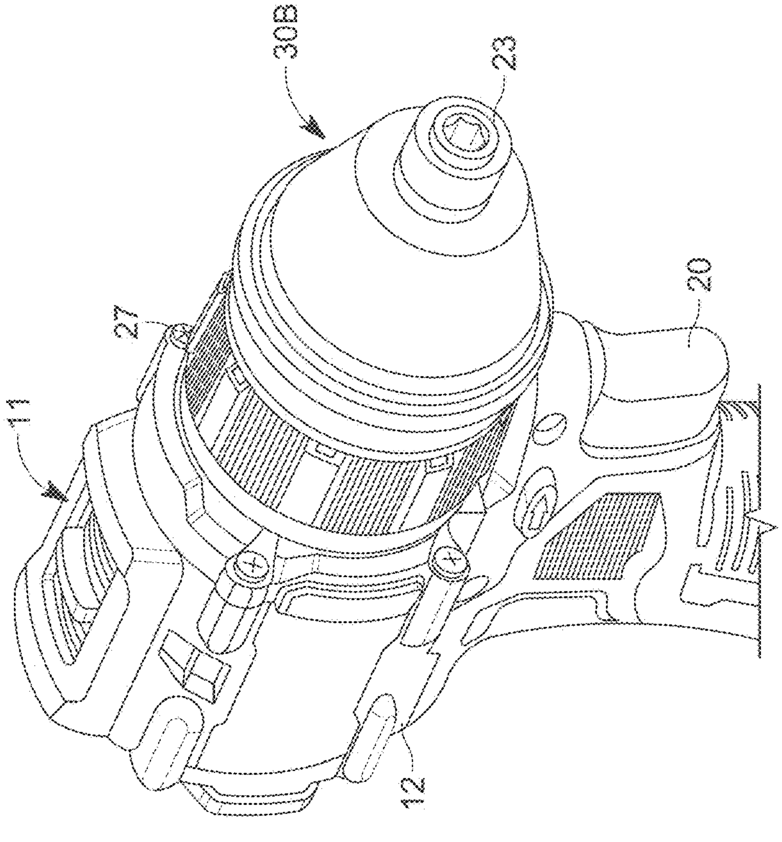
FIG. 56 shows a front angle of a power tool with a tool head assembly in accordance with yet another embodiment of the disclosure.

FIGS. 56-65B show power tool 10 utilizing a ball locking head attachment configuration according to yet another embodiment. FIG. 56 illustrates one example of tool head element 30B attached to the main body portion 11, with tool bit holder portion 23 facing forward for use. Tool head element(s) 30B may be configured to attach to main body portion 11 of power tool 10 via a ball locking attachment mechanism provided therein. The ball locking attachment mechanism is designed for connection with universal head interface 44B provided on the main body portion 11 of the power tool 10.

Figure 57:
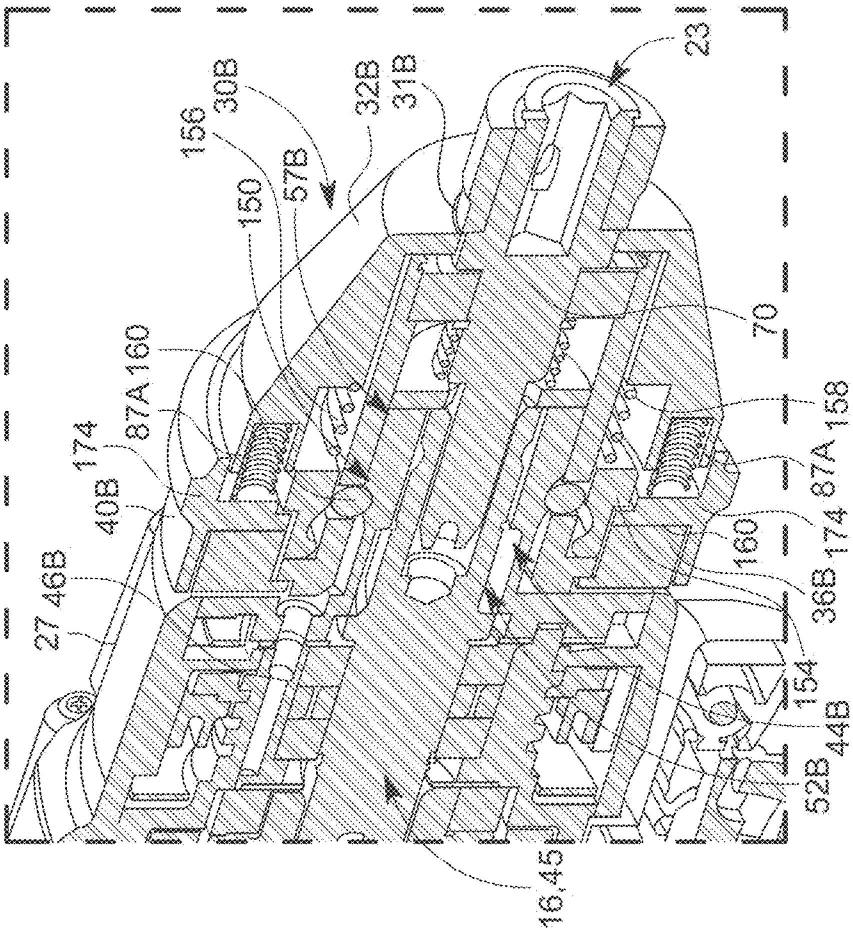
FIG. 57 shows a cross-sectional view in the axial direction of the power tool of FIG. 56, in accordance with an embodiment.
Figure 58:
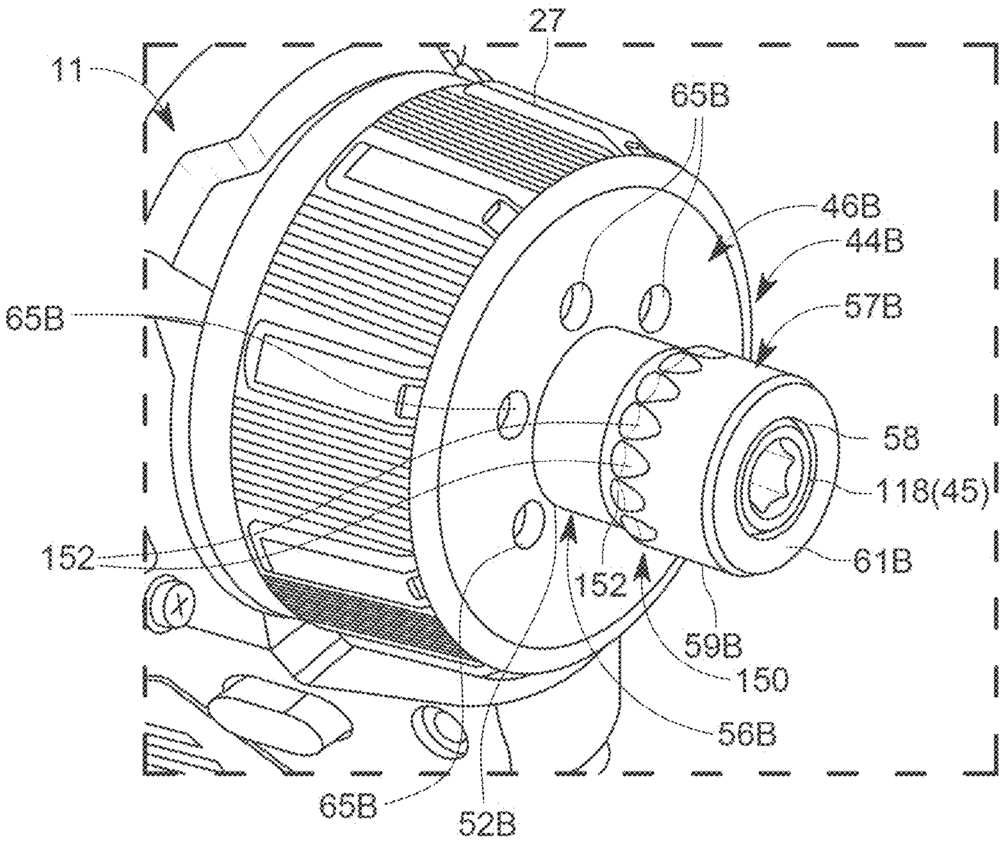
FIG. 58 shows an isometric view of a head interface used in the power tool of FIGS. 56-57, in accordance with an embodiment.

As shown in FIG. 58, the universal head interface 44B accommodates, in accordance with one embodiment, spindle and bearings arrangement 45 as previously described (see, e.g., FIGS. 38 and 44) and thus not repeated here. That is, output shaft 16 may be connected to a first end of the spindle and bearings arrangement 45, while a second end of the arrangement 45 is used for attachment through central bore 58B of the universal head interface 44B, thereby accommodating at least second end 118 of the spindle and bearings arrangement 45 therethrough, as shown in FIG. 58. In another embodiment, the second end of the output shaft 16 is configured for insertion through the central bore 58B. The isometric view of FIG. 58 shows a front facing portion of the head interface 44B, i.e., the portion that is used to connect and interact with the tool head element 30B. The back surface (not shown) of the head interface 44B is a surface that is placed against the main body portion 11. The cross-sectional views of FIGS. 57 and 62, for example, shows additional features of the head interface 44B in accordance with an embodiment. The universal head interface 44B has a first end and a second end, with the central bore 58B extending therebetween. The first end of universal head interface 44B has a flange 46B extending radially relative to the central bore 58B that is used for attachment to the main body portion 11. The second end of universal head interface 44B has a leading flat edge 61B (see FIG. 58) that is part of a stationary shaft 56B extending axially from the flange 46B. An outer diameter of the flange 46B may be based on a diameter or dimensions of an interface on the main body portion 11 to which the flange 46B is connected (e.g., the inner diameter or dimensions of the clutch collar 27 (or the clutch housing arrangement 19/main body portion 11), in accordance with some embodiments herein. An inner diameter of the central bore 58B may be dimensioned or sized based on dimensions (e.g., diameter) of the spindle body 108 and/or output shaft 16; that is, the central bore 58B may be sized to allow rotation and clearance of the spindle body 108/output shaft 16 therein. To attach the universal head interface 44B to the main body portion 11, the central bore 58B or opening thereof is aligned with the spindle body 108/output shaft 16 and inserted through an opening of the central bore 58B in the back surface (back side of the flange 46B) of the head interface 44B such that at least a portion of the end 118 of the spindle body 108 is accessible through leading edge 61B of shaft 56B and the bore 58B. The flange 46B is placed against the main body portion 11 and connected to a front face or interface of the main body portion 11 (adjacent to clutch collar 27) via fasteners or screws being placed through holes 65B in the flange 46B for securement to main body portion 11. The holes 65B are aligned with corresponding holes (not shown) provided on the main body portion 11. Any number of fasteners or holes may be utilized for attachment of the flange 46B of the universal head interface 44B and the number shown in the Figures is not intended to be limiting.

Again, between the flange 46B and leading edge 61B and surrounding central bore 58B of the head interface 44B is stationary shaft 56B that includes at least one interface surface portion 150 for connection with tool head element 30B, according to an exemplary embodiment. In embodiments, as shown FIG. 58, there may be a first interface portion 52B and a second interface portion 57B, with interface surface portion 150 therebetween, surrounding the bore 58.

First interface portion 52B may extend axially from the flange 46B and towards the leading edge 61B. First interface portion 52B may include an outer surface having a first outer diameter, in accordance with embodiments herein. Second interface portion 57B acts as a piloting surface, in accordance with embodiments herein, and includes an interfacing edge 59B that has a second outer diameter. In embodiments, the first outer diameter of first interface portion 52B and the second outer diameter of edge 59B of second interface portion 57B are different. In other embodiments, the first outer diameter of first interface portion 52B and the second outer diameter of edge 59B of second interface portion 57B are substantially similar, substantially equal, or the same. According to embodiments herein, the outer surface of first interface portion 52B and/or the interface edge 59B of the second interface portion 57B of the universal head interface 44B may be configured to interface with a spring holder frame 42B (described with reference to FIGS. 59-61, for example) and locking elements 170 when the tool head element 30B is attached to the main body portion 11.

In embodiments, as shown FIG. 58, interface surface portion 150 surrounds the bore 58B and includes a groove pattern formed from multiple mating grooves 152 that are spaced circumferentially around the stationary shaft 56B. The interface surface portion 150 may be provided in between the first interface portion 52B and the second interface portion 57B, for example. Each of the mating grooves 152 of interface surface portion 150 may be provided in the form of a ball receiving divot having a rounded surface extending into a surface of the stationary shaft 56B.

As will be understood by the description below, spacing of mating grooves 152 allows balls within the tool head element 30B to click into place when the tool head element 30B is secured to the main body portion 11 and the collar 40B is released to allow for locking.

Figure 60:
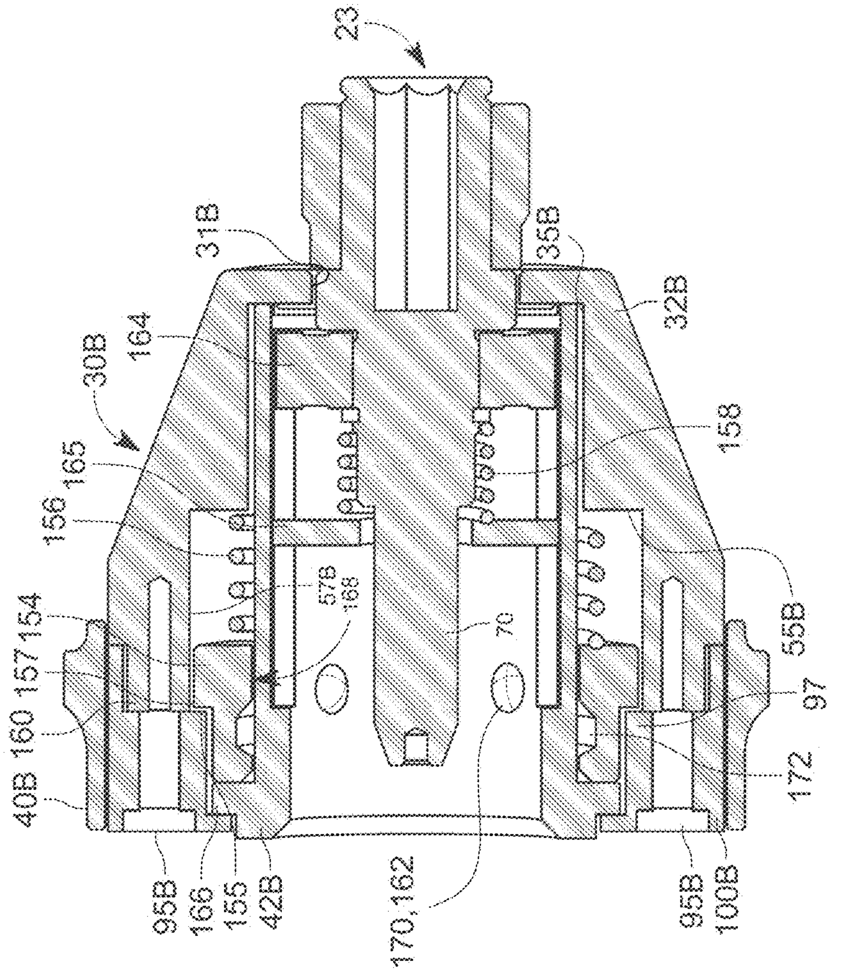
FIG. 60 shows a cross sectional view, in an axial direction, of tool head element of FIGS. 56-57 used in the power tool in accordance with an embodiment.
Figure 59:
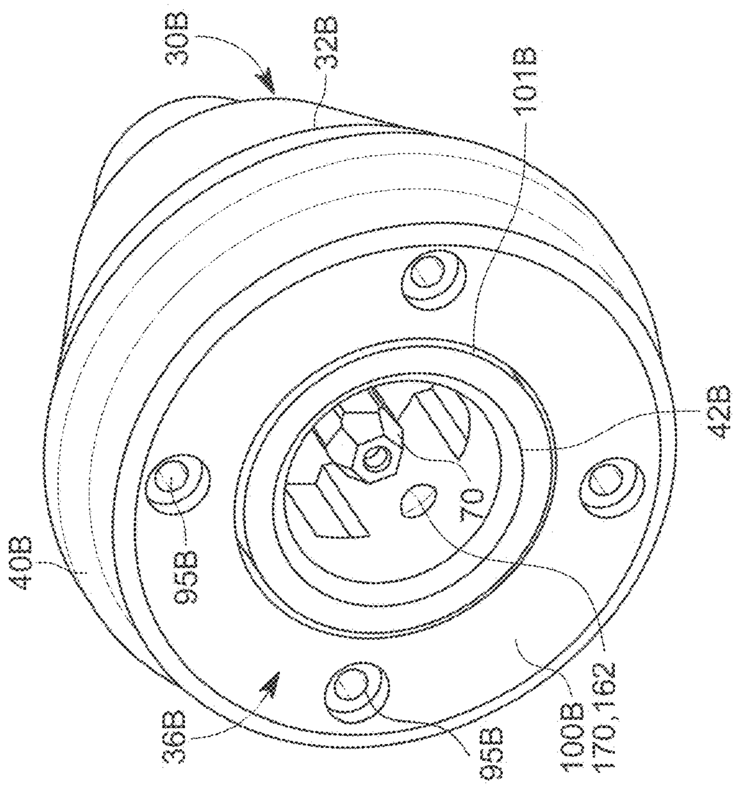
FIG. 59 shows a back angled view of the assembly of the head interface and collar on tool head element in accordance with an embodiment.
Figure 61:
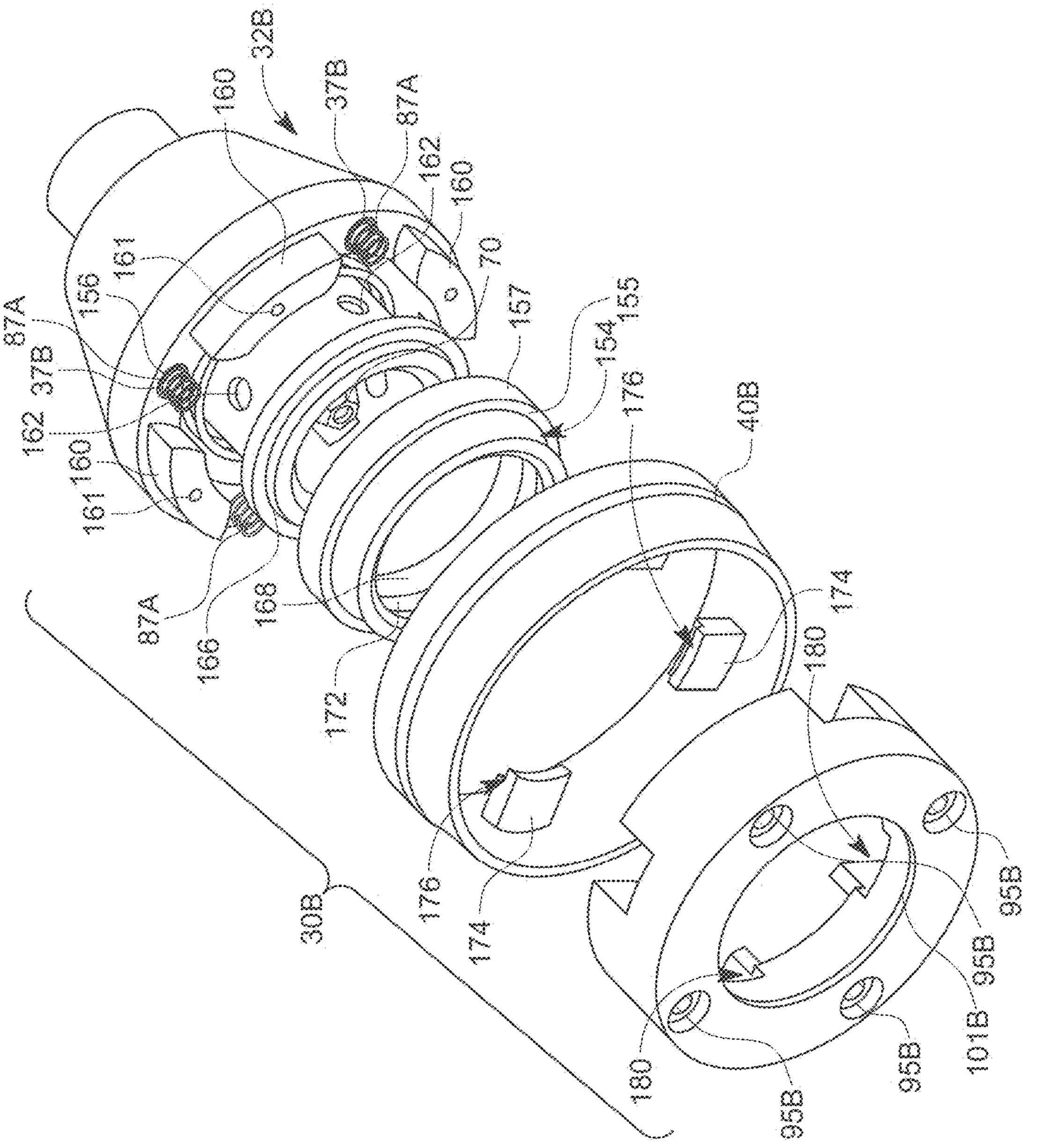
FIG. 61 shows an exploded view from a back angle of parts of the tool head element and collar of FIGS. 56-57 and 60 in accordance with another embodiment.

Turning now to features of the tool head element(s) 30B for the ball locking head connection, FIGS. 59-61 shows parts of the ball locking attachment mechanism that are provided within the tool head element 30B for its removable attachment to the main body portion 11. A backing surface 36B of tool head element 30B is provided by a cover or end cap 100B connected to containment housing 32B of the tool part housing 32. Backing surface 36B of end cap 100B is designed for placement against a front surface of the flange 46B when attaching tool head element(s) 30B to the main body portion 11 of the power tool 10, which can be seen in FIG. 57, for example. The end cap 100B is designed to assist in encapsulating parts (e.g., spring holder frame 42B, ball retainer 154, spring 156, etc.) along with containment housing 32B within the tool head element 30B, for example.

As seen in FIG. 61, according to embodiments, end cap 100B includes a number of fastener holes 95B therein for receipt of fasteners (e.g., screws; not shown) that are used to connect to containment housing 32B. More specifically, fastener holes 95B are aligned with corresponding holes 161 in connection elements 160 extending from containment housing 32B, and fasteners are inserted through the aligned holes 95B, 161. Connection elements 160 may be placed against a corresponding internal surface or wall 97 (see in the cross-section view of FIG. 60) of end cap 100B. Any number of fasteners or holes may be utilized for attachment of the end cap 100B to the containment housing 32B and the number shown in the Figures is not intended to be limiting. Backing surface 36B of end cap 100B also has a center opening 101B therethrough for providing access to the input shaft 70. Again as noted throughout this disclosure, input shaft 70 is configured to removably couple and effectively rotate with the spindle and bearings arrangement 54/output shaft 16 of the main body portion 11 when the trigger of the power tool 10 is activated. As previously described and thus not repeated in detail here, one end of the input shaft 70 (seen in FIG. 59) is aligned and inserted into the opening of the spindle body 108/output shaft 16, while the other end tool bit holder portion 23 is provided at the opposite or other end of the input shaft and is accessible for use and/or further attachments through an opening 31B (see FIGS. 57 and 60) centrally located in containment housing 32B. Upon coupling and providing power to the tool 10, speed and torque from output shaft 16 are applied/transferred to input shaft 70, e.g., for rotation thereof (and thus, rotation/movement of any tool, e.g., a drill bit attached to the tool head element 30).

Figure 63:
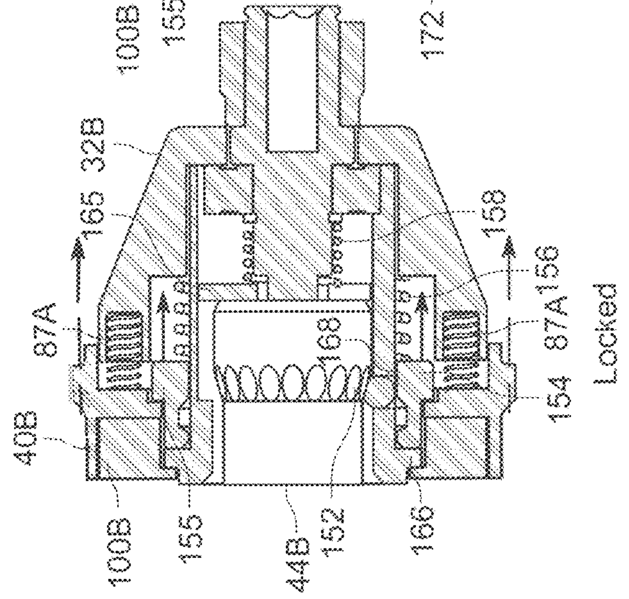
Figure 62:
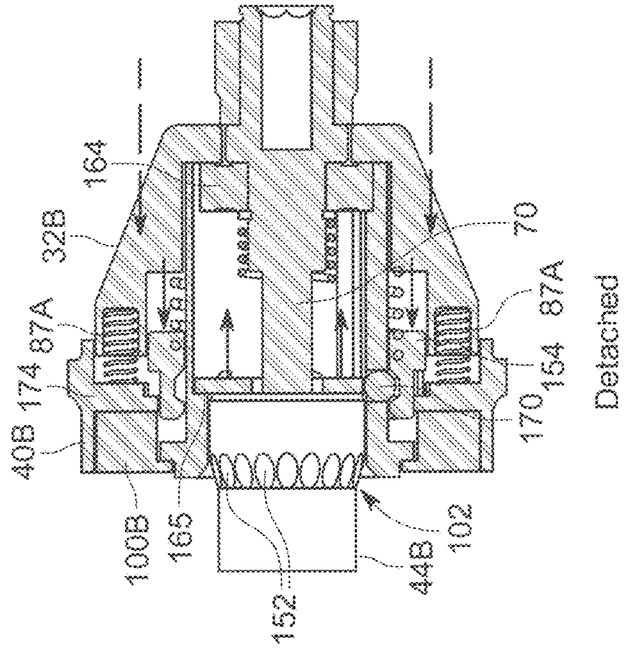

The center opening 101B of end cap 100B also surrounds and secures spring holder frame 42B within the tool head element 30B, in accordance with embodiments. Spring holder frame 42B is shown in FIGS. 60 and 61. Spring holder frame 42B may include a tubular wall with a first or front end and a second or back end. Spring holder frame 42B is inserted into the containment housing 32B with first or front end placed against a wall forming the opening 31B. In an embodiment, the containment housing 32B has a receiving opening 35B (see FIG. 60) defined by a horizontally extending wall and shaped to receive at least a portion of the first end of the tubular wall of spring holder frame 42B therein. In particular, the outer diameter of the tubular wall is sized such that it may be received within an inner diameter of the receiving opening 35B. Spring holder frame 42B receives the input shaft 70 therethrough, as well as the universal head interface 44B (not shown in FIG. 60, for clarity purposes with regards to other features), as later described. Further, according to embodiments herein, an inner diameter(s) of the tubular wall of spring holder frame 42B may be dimensioned or sized based on dimensions (e.g., first and/or second outer diameters) of universal head interface 44B such that the inside or inner channel of the tubular wall is configured to allow rotation and clearance of input shaft 70 therein. In some embodiments, at least the second interface portion 57B of the universal head interface 44B is fit within an inner diameter of the inner channel of the tubular wall. The universal head interface 44B may be placed against a wall 165 when received within the tool head element 30B, in accordance with embodiments. Wall 165 is configured to abut leading flat edge 61B (see FIG. 58) of universal head interface 44B when the tool head element 30B is attached, to limit axial movement while still allowing for axial rotation of the spindle body 108/output shaft 16 and thus the input shaft 70 upon activation of the power tool 10 when pulling the trigger. In the illustration of FIG. 60, the wall 165 is placed in forward position showing placement when a universal head interface 44B is inserted therein. However, in a resting or default state, wall 165 may be positioned closer to second end of the spring holder frame 42B. Wall 165 may be configured to move within the inner channel from a back end and towards a front end of the containment housing 32B, such as shown in FIGS. 62-63, for example, in accordance with embodiments herein. In embodiments, the input shaft 70 includes one or more bearings 164 configured for rotation and stabilization of the input shaft 70 relative to the spring holder frame 42B, when attached to the tool. In embodiments, spring 158 (e.g., a coil spring) is provided around input shaft 70 and is contained by or between bearing 164 and wall 165. Spring 158 assists in limiting forward movement of the universal head interface 44B.

A length of spring holder frame 42B extends to opening 101B in backing surface 36B of end cover 100B. A second or back end of the tubular wall of spring holder frame 42B may include a flanged edge portion 166, which may be placed against end cap 100B, for example. Flanged edge portion 166 may be configured to hold and limit movement of a ball retainer 154 contained with the containment housing 32B. As shown in the cross-sectional view of FIG. 60, the ball retainer 154 is provided around the tubular wall of spring holder frame 42B. More specifically, the containment housing 32B has a radial edge 55B (see FIG. 60) extending around receiving opening 35B. A spring 156 (e.g., coil spring) is placed between the ball retainer 154 and the radial edge 55B, around the tubular wall of spring holder frame 42B. That is, one end of the spring 156 is placed against the radial edge 55B while the other end of the spring 156 is adjacent to and against a front end of ball retainer 154. As will become evident by the Figures and corresponding description below, the spring 156 is utilized with ball retainer 154 and a collar 40B to lock and unlock the tool head element 30B relative to the main body portion 11. In addition, in embodiments, the ball retainer 154 may include an uncoupling edge 155. In the illustration shown in FIG. 60, the uncoupling edge 155 is shown near inside wall 97 of the end cap 100B; however, this is not the default state. That is, FIG. 60 illustrates placement of the elements when the tool head element 30A is locked onto a main body portion 11 of a tool. The uncoupling edge 155 is configured to be positioned against edges 176 of the collar 40B in a locked state, and utilized for moving ball retainer 154 within the containment housing 32B, to unlock the tool head element 30B, as described later with reference to FIGS. 63-64.

A number of radial slots 162 may be provided within the tubular wall of the spring holder frame 42B, e.g., near or adjacent the second or back end thereof, according to embodiments herein. Radial slots 162 are spaced around the tubular wall and include locking elements 170 at least partially therein. In the exemplary illustrated embodiments, locking elements 170 are provided in the form of balls. Generally, in a resting state (or detached state) wherein the tool head element 30B is not locked onto the main body portion 11 of the power tool 10, portions of each of the locking balls 170 are embedded or contained within radial slots, while remaining portions of each of the locking balls 170 are provided within a channel 172 (see FIG. 62) of the ball retainer 154. The channel 172 is provided on an inside surface of a wall of the ball retainer 154, extending radially away from an outer surface of the spring holder frame 42B. The inside of the ball retainer 154 further includes an inner wall 168 adjacent to, e.g., forward of, the channel 172. This inner wall 168 may be guided relative to the outer surface of the spring holder frame 42B and used to assist in temporarily locking and securing locking balls 170 to the universal head interface 44B when tool head element 30B is secured to the main body portion 11 (see FIG. 63). As shown in FIG. 60, in accordance with embodiments, the wall of the ball retainer 154 is generally positioned around the tubular wall of the spring holder frame 42B, such that the ball retainer 154 is contained by flange edge portion 166 and spring 156 placed against radial edge 55B. An outer edge 157 of the ball retainer 154 is radially constrained and configured to move axially relative to and within receiving opening 57B of the containment housing 32B when collar 40B (described below) is moved. In embodiments, in the resting or detached state, the locking balls 170 are provided between and within the channel 172 and radial slots 162 (see, e.g., FIG. 62). In embodiments, in the attached or locked state, the locking balls 170 are provided between and within the mating grooves 152 and radial slots 162 (see, e.g., FIG. 63). In embodiments, locking balls 170 are configured to be angularly constrained within radial slots 162 of spring holder frame 42B when aligned with mating grooves 152 or channel 172. For example, the mating grooves 152 and/or channel 172 may be tapered in accordance with embodiments, such that the balls 170 are limited and stopped from falling into adjacent spaces. In addition, the radial slots 162 may be tapered in accordance with embodiments, such that the balls 170 are limited and stopped from falling into the inner channel of the spring holder frame 42B. However, the locking balls 170 are designed to move radially within the slots 162 such that they may be moved into mating grooves 152 and channels 172 during locking and unlocking.

The number of locking balls 170 and radial slots 172 may be equal in accordance with an embodiment, as each locking ball 170 may be placed within a corresponding radial slot 172. In embodiments, the number of locking balls 170 and radial slots 172 used as part of the ball locking mechanism is not intended to be limiting. For example, in the illustrated embodiment (see, e.g., FIG. 65), four locking balls 170 may be provided; accordingly, four slots 162 may be provided. In an embodiment, the slots 162 are spaced approximately every ninety degrees around the tubular wall of spring holder frame 42B. However, this number of balls/slots is not intended to be limiting and merely for illustrative purposes. Similarly, the number of mating grooves 152 is not intended to be limiting. In an exemplary embodiment, mating grooves 152 are spaced around the universal head interface 44B to allow balls to click into place in a pattern that allows for 22.5 degree resolution of the tool head element 30B position.

Collar 40B is also provided as part of tool head element 30B, for the user to utilize as a sleeve for unlocking tool head element 30B from main body portion 11. Collar 40B surrounds at least part of the end cap 100B, as shown in FIG. 60. Collar 40B includes a number of radially extending surfaces 174 extending from an inner surface thereof, as shown in FIG. 61. An inside surface of the end cap 100B may include corresponding slots 180 thereon for accommodating the radially extending surfaces 174 and movement of the collar 40B. Collar springs 87A are configured to bias the collar 40B in an outmost axial position, or a first collar position, relative to the containment housing 32B. As shown in FIG. 61, for example, holes 37B may be provided in a back facing end of the containment housing 32B, for receipt of one end of each collar spring 87A. A second end of each collar spring 87A may be provided against radially extending surfaces 174, on a front facing side, of collar 40B. Movement of the collar 40B and thus its radially extending surfaces 174 in a second axial direction compresses springs 87A.

Each radially extending surface 174 of collar 40B includes a stepped edge 176 thereon for use in unlocking ball retainer 154 when in a locked state. As shown in FIGS. 57 and 63, for example, the stepped edges 176 are contact with uncoupling edge 155 of the ball retainer 154 in a locked state. In an unlocked state, the uncoupling edge 155 of the ball retainer 154 is spaced from the radially extending surface 174 and stepped edges 176, as shown in FIG. 62.

Figure 64:
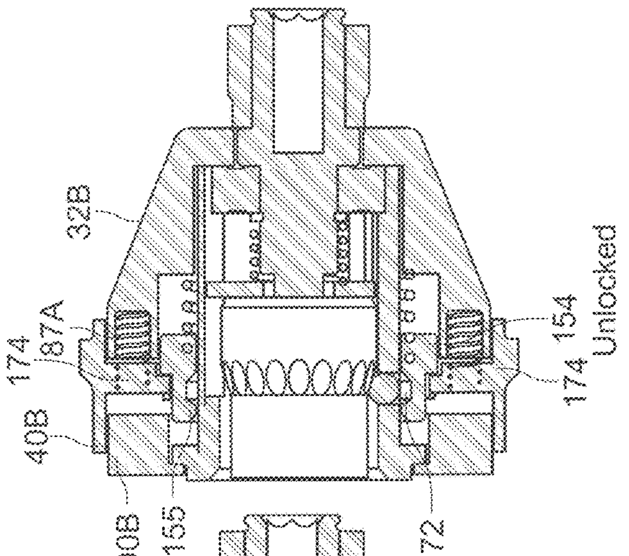
FIGS. 62-64 show a process of assembling and mounting the collar and its contained parts of a tool head element onto a head interface of FIG. 58 in accordance with an embodiment.

FIGS. 62-64 show cross-sectional views of a process for assembling or locking a tool head element onto a main body portion of the power tool in accordance with an embodiment. FIG. 62 shows a detached tool head element 30B aligned with the universal head interface 44B for dropping and loading onto the universal head interface 44B secured to main body portion 11 (not shown here). As shown, in the detached state, the collar 40B is displaced towards the end cap 100B in the first collar position, away from containment housing 32B via springs 87A, into a first, unlocked position. Spring 156 is also at rest. Further, at least a portion of the locking balls 170 are positioned withing the channel 172 of the ball retainer 154 (and also within radial slots 162).

The attachment of the tool head element 30B onto the head interface 44B is configured to occur in a first axial direction (along axis A-A). A user aligns and applies a pushing force to the tool head element 30B, i.e., pushing the tool head element 30B towards and onto the head interface 44B and thus the main body portion 11. During this action, as shown by the arrows in FIG. 62, as the tool head element 30B is pushed onto the universal head interface 44B, the universal head interface 44B is moved into the containment housing 32B. The universal head interface 44B is received within the inner channel of the tubular wall of spring holder frame 42B and pushes wall 165 towards a front of the containment housing 32B while the input shaft 70 is aligned with second end 118 such that it may be locked for rotation onto the spindle 108/output shaft 16. Moreover, as the universal head interface 44B is moved forward, at least a portion of the locking balls 170 are moved into mating grooves 152 as the interface surface portion 150 is aligned with the radial slots 162, containing the locking balls 170, of the spring holder frame 42B.

The ball retainer 154 is moved or pushed such that a back end thereof is positioned against flanged edge portion 166 of the spring holder frame 42B, thereby holding and limiting movement of ball retainer 154, in the locked state, shown in FIG. 63. Pushing the ball retainer 154 also axially and linearly moves the channel 172 thereof beyond (e.g., behind or below) the locking balls 170. Upon the channel 172 of ball retainer 154 dropping relatively below the interface surface portion 150, the inner wall 168 of ball retainer 154 further pushes and secures at least a portion of the locking balls 170 into the aligned mating grooves 152 of the universal head interface 44B, which is shown in FIG. 63. Accordingly, in a locked state, the locking balls 170 reside within and between the mating grooves 152 and the radial slots 162. Further, the uncoupling edge 155 of the ball retainer 154 is positioned against stepped edges 176 of the radially extending surfaces 174 of collar 40B (near the end cap 100B) in the locked state. In the locked state, in accordance with embodiments, springs 87A and/or spring 156 may be at rest or minimally/slightly compressed. As the spring force from springs 87A and/or spring 156 is minimal, the collar 40B is maintained in a second, locked position.

When the tool head element 30B is attached to the main body portion 11, input shaft 70 is configured to removably couple and effectively rotate with the spindle and bearings arrangement 45/output shaft 16 of the main body portion 11 when the trigger of the power tool 10 is activated. As previously described (and thus not repeated in detail here), one end of the input shaft 70 (seen in FIG. 50) is aligned and inserted into the receiving opening 122 of the spindle body 108, while at the other or opposite end of the input shaft 70 is tool bit holder portion 23 which is accessible for use and/or further attachments.

Pulling on the collar 40B in a second axial direction (along axis A-A) away from the main body portion 11, as depicted by the arrows in FIG. 63, enables unlocking of the tool head element 30B, accordingly allowing a user to impart rotation and/or removal of the tool head element 30B relative to the main body portion 11 of the tool. As the outer collar 40B is moved towards the second collar position towards the front, i.e., away from the main body portion 11, the spring force is overcome. The radially extending surfaces 174 of collar 40B further compress springs 87A and their stepped edges 176 simultaneously move the ball retainer 154 via pushing against uncoupling edge 155 of the ball retainer 154. Movement of ball retainer 154 in this second axial direction also further compresses spring 156 between the ball retainer 154 and the radial edge 55B of the containment housing 32B. The movement of the collar 40B causes the spring forces to increase as the user is pushing against the rest state thereof. As shown in FIG. 64, as the ball retainer 154 is moved (i.e., forwardly) by the collar 40B, the channel 172 of ball retainer 154 is moved forward into alignment with the locking balls 170 in the radial slots 162 of the spring holder frame 42B. Upon alignment, then, at least a portion of the locking balls 170 fall or drop through radial slots 162 and into the channel 172, away from/out of the mating surfaces 152 of the universal head interface 44B. Accordingly, the tool head element 30B is unlocked for rotation and/or removal from the universal head interface 44B.

Figure 65A:
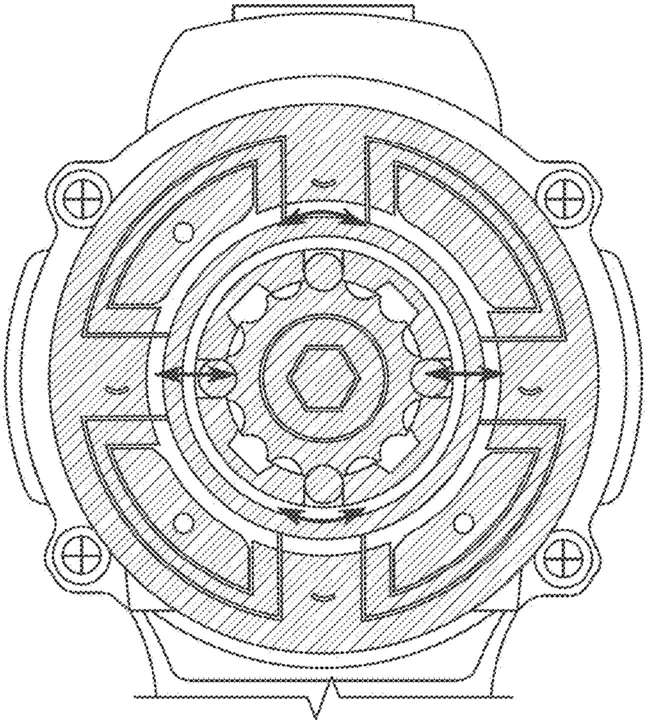
FIGS. 65A-65B show exemplary illustrations of movement of elements of the tool head element and head interface when changing the tool head element position.
Figure 65B:
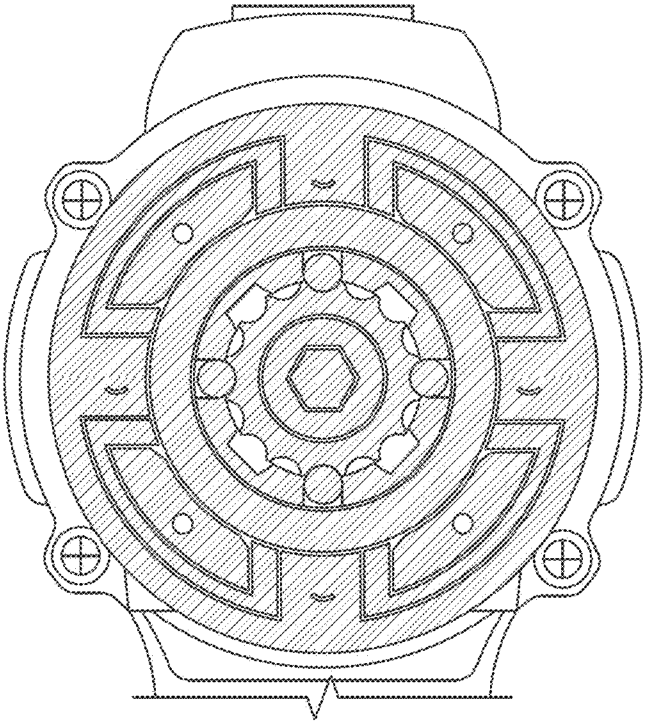

FIGS. 65A and 65B provide exemplary illustrations of movement of elements when changing the tool head element 30B position. As shown in FIG. 65, locking balls 70 roll between mating grooves 152 of universal head interface 44B when collar is unlocked. The spacing of mating grooves 152 allows the balls 170 to move into and click into place as the tool head element 30B is rotated to a different angle, thereby providing the ability to change head position without disengaging head. FIG. 65B shows another view of the balls 70 and mating grooves 152 when the tool head element is locked on.

Accordingly, this is exemplary alternate embodiment, a spring loaded component and ball locking mechanism is shown and incorporated into the tool head element 30B for quick release and attachment to the tool main body portion 11. A user is able feel the movement of the collar when overcoming spring forces. The balls embedded in the tool head element enable locking onto the tool body by interfering with mating grooves on stationary shaft and universal head interface 44B that protrudes from the tool body. The ball and groove interactions provide axial and angular constraints on the tool head element when the relative radial position of the balls is able to be locked in place by a spring loaded component. The user is able to unlock the radial position of the balls by opposing the spring, which in turn unlocks the head both axially and angularly. Further, the ball and spring force pair helps anchor the axial position of the tool head element 30B. Additionally, the parts of the tool head element 30B are designed to provide a constraining axial force that eliminates head wobble while minimizing user complexity and steps for removal and attachment. Users are able to push tool head elements 30B onto the main body portion without pulling collar as well as change head position without fully disengaging the input shaft 70 from the tool.

Figure 67:
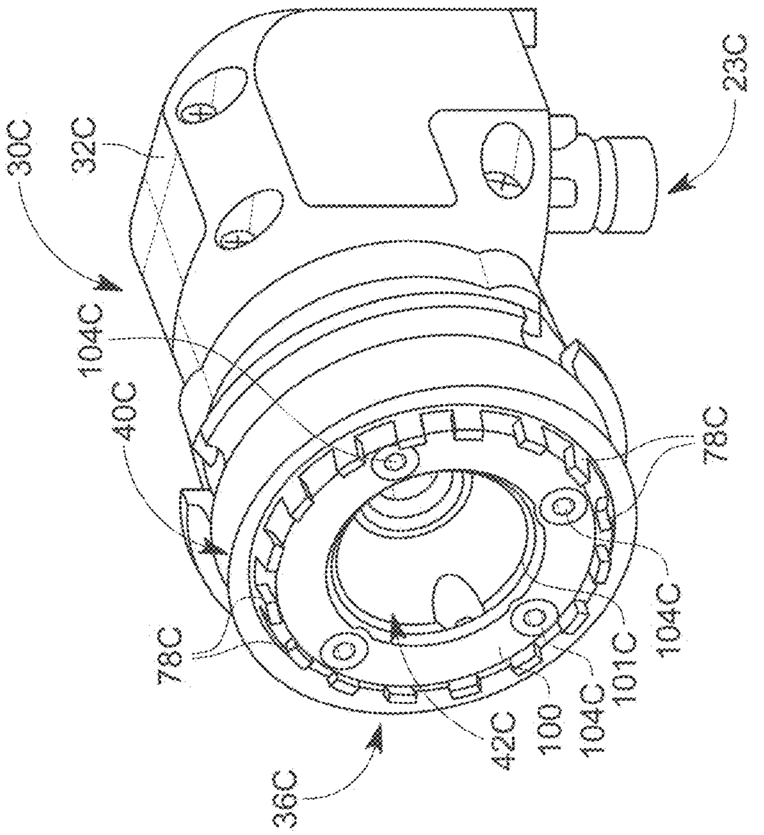
FIG. 67 shows a back isometric view of a collar provided on a tool head element used in the power tool in accordance with another embodiment.
Figure 66:
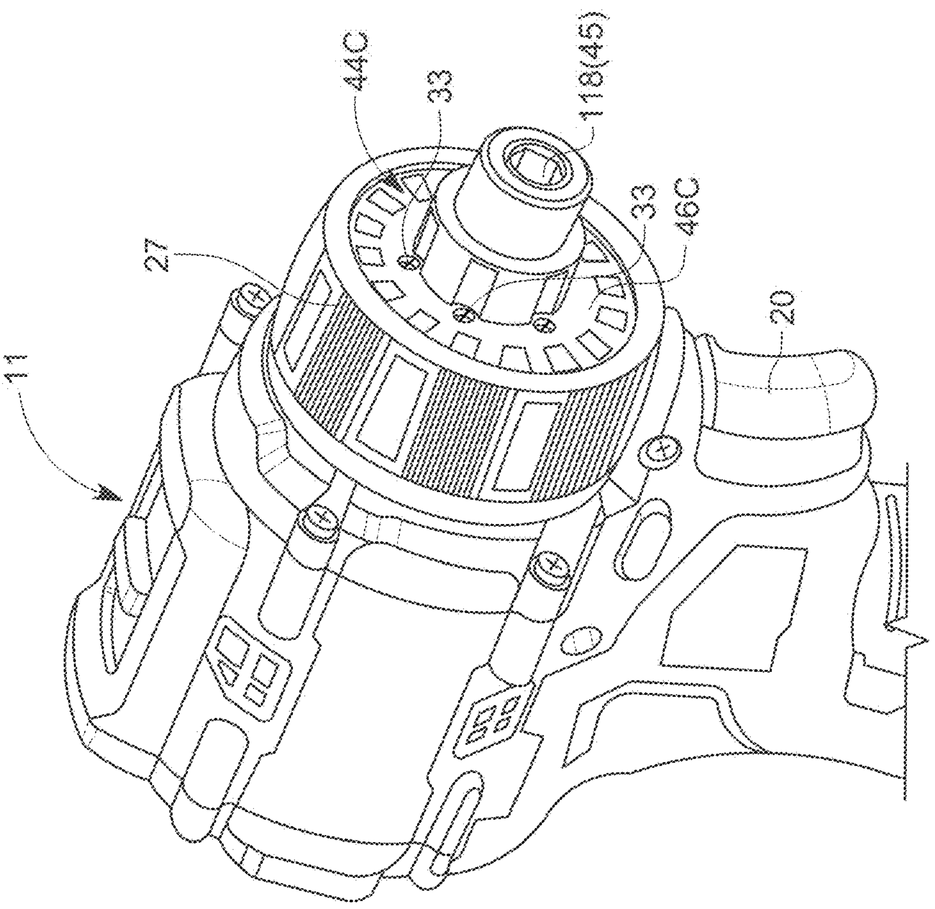
FIG. 66 shows a first isometric view of a main body portion of the power tool in accordance with still yet another embodiment.
Figure 68:
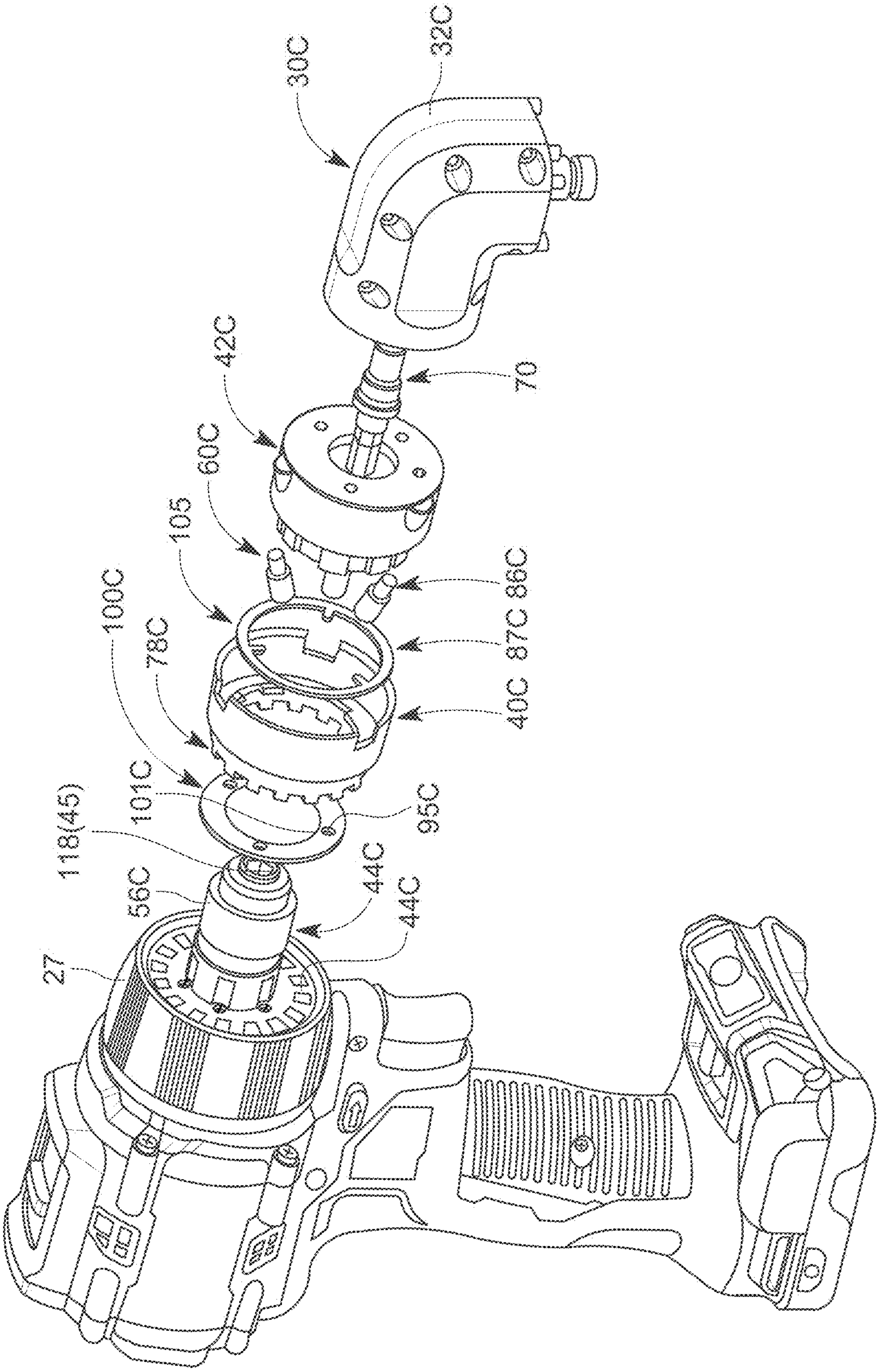
FIG. 68 shows an exploded view from a front angle of parts of the power tool and a tool head assembly of parts in FIGS. 66-67 in accordance with an embodiment.
Figure 69:
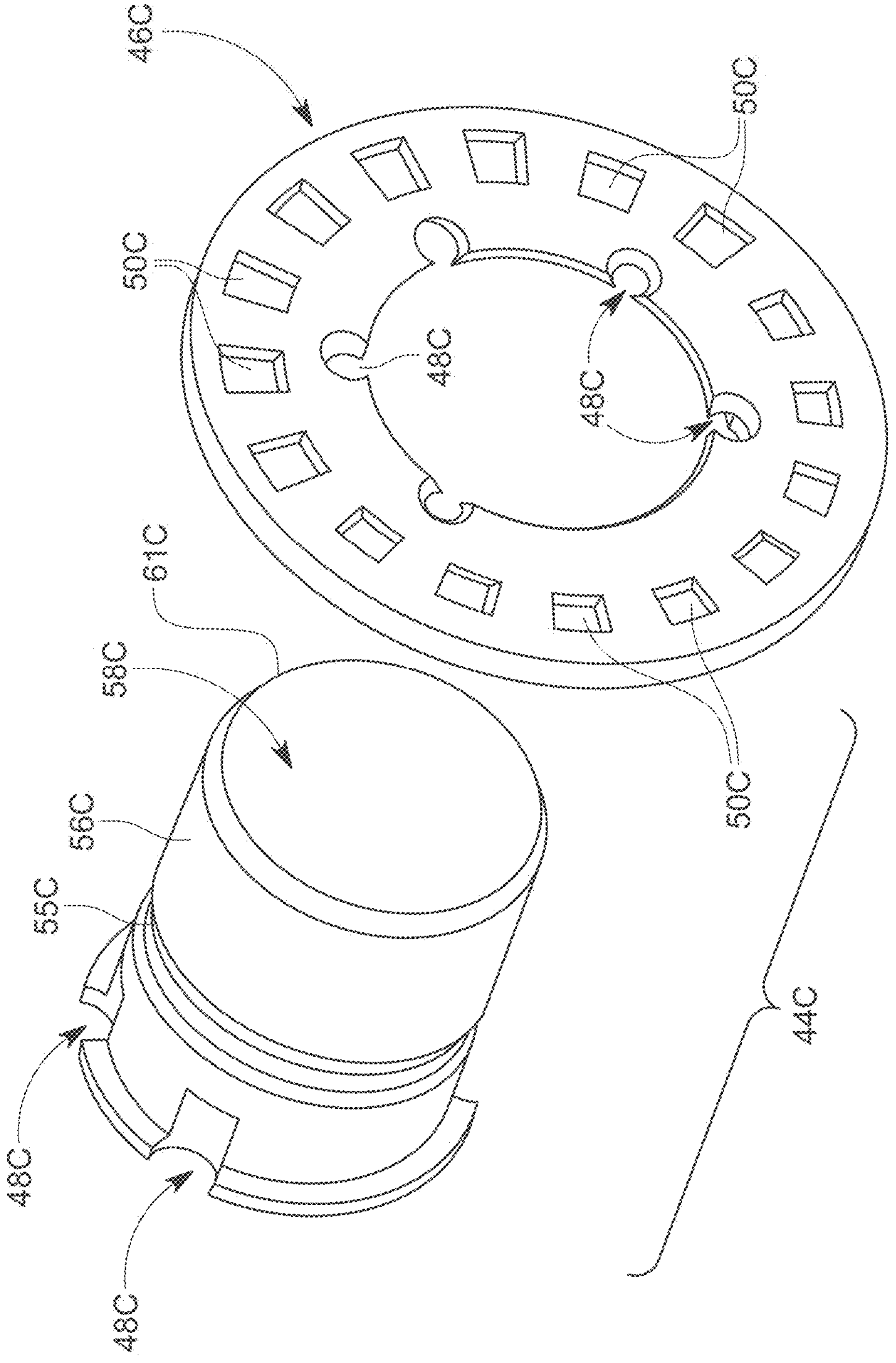
FIG. 69 shows an exploded view of exemplary parts of a head interface of the main body of the power tool of FIG. 66, in accordance with an embodiment.

FIGS. 66-83 show power tool 10 utilizing a pin locking attachment configuration according to still yet another embodiment of this disclosure. FIG. 66 illustrates an example of a universal head interface 44C according to another embodiment, and FIG. 67 illustrates a back end view of tool head element 30C according to another embodiment. Tool head element 30C may be configured to attach to main body portion 11 of power tool 10 via combination spindle and bearings arrangement 45 as shown and described in FIGS. 38 and 44, for example, and thus not repeated here. That is, output shaft 16 may be connected to a first end of the spindle and bearings arrangement 45, while a second end of the arrangement 45 is used for attachment through central bore 58C (see FIG. 69) of the universal head interface 44C, thereby accommodating at least second end 118 of the spindle and bearings arrangement 45 therethrough, as shown in FIG. 66. In another embodiment, the second end of the output shaft 16 is configured for insertion through the central bore 58C. The exploded view of FIG. 69 shows exemplary parts of the head interface 44C, i.e., the portion that is used to connect and interact with the tool head element 30C, including a flange 46C and stationary shaft 56C. The back surface (not shown) of flange 46C of the head interface 44C is a surface that is placed against the main body portion 11. In an embodiment, the flange 46C has a portion (e.g., semi-circle) of holes for fasteners 33 (e.g., screws) while the stationary shaft 56C includes another portion (e.g., semi-circle) of these holes, such that when the universal head interface is assembled, holes 48C are formed therethrough. In another embodiment, the flange 46C includes holes 48C through its body. The holes 48C are configured to be aligned with corresponding holes (e.g., such as holes provided on the adapter plate 26 or provided on/through the detent plate 34) of the main body portion 11 for attachment of flange 46C thereto (see FIG. 66) via said fasteners 33. Any number of fasteners or holes may be utilized for attachment of the universal head interface 44C and the number shown in the Figures is not intended to be limiting. As shown in FIGS. 66 and 69, flange 46C may include a number of receiving grooves 50C along a front facing surface thereof in accordance with embodiments herein. In another embodiment, the receiving grooves 50C may be provided along a circumference or periphery of the flange 46C. Such receiving grooves 50C may be dimensioned and configured to receive corresponding teeth 78C or castellations of collar 40C (described later) to provide a keyed-type connection elements for aligning and connecting these parts. In an embodiment, the grooves 50C are provided in the form of notches or indentations into the body of the flange 46C. In another embodiment, the grooves 50C include an opening extending through the body of the flange 46C.

When assembled, the universal head interface 44C has a first end and a second end, with the central bore 58C extending therebetween, wherein the first end of universal head interface 44C has flange 46C extending radially relative to the central bore 58C and second end of universal head interface 44C has a leading flat edge 61C that is part of stationary shaft 56C extending axially from the flange 46C. The leading edge 61C at the second end of the head interface 44C may be a flat surface extending radially from the bore 58C. In addition, stationary shaft 56C may include a tapered groove 55C or chamfered edge therearound such that the outer diameter of the universal head interface tapers to a smaller diameter in a portion of the shaft 56C. The tapered groove 55C may taper into and towards the center of the shaft 56C, for example. Such tapered groove 55C may be configured to receive bottom parts of a locking elements 60C in tool head element 30C, which is noted later. An outer diameter of the flange 46C may be based on a diameter or dimensions of an interface on the main body portion 11 to which the flange 46C is connected (e.g., the inner diameter or dimensions of the clutch collar 27 (or the clutch housing arrangement 19/main body portion 11), in accordance with some embodiments herein. An inner diameter of the central bore 58C may be dimensioned or sized based on dimensions (e.g., diameter) of the spindle body 108 and/or output shaft 16; that is, the central bore 58C may be sized to allow rotation and clearance of the spindle body 108/output shaft 16 therein. To attach the universal head interface 44C to the main body portion 11, the central bore 58C or opening thereof is aligned with the spindle body 108/output shaft 16 and inserted through an opening of the central bore 58C in the back surface (back side of the flange 46C) of the head interface 44C such that at least a portion of the end 118 of the spindle body 108 is accessible through leading edge 61C of shaft 56C and the bore 58C. The flange 46C is placed against the main body portion 11 and connected to a front face or interface of the main body portion 11 (adjacent to clutch collar 27) via fasteners 33 or screws being placed through holes 48C in the flange 46C for securement to main body portion 11.

Figure 76:
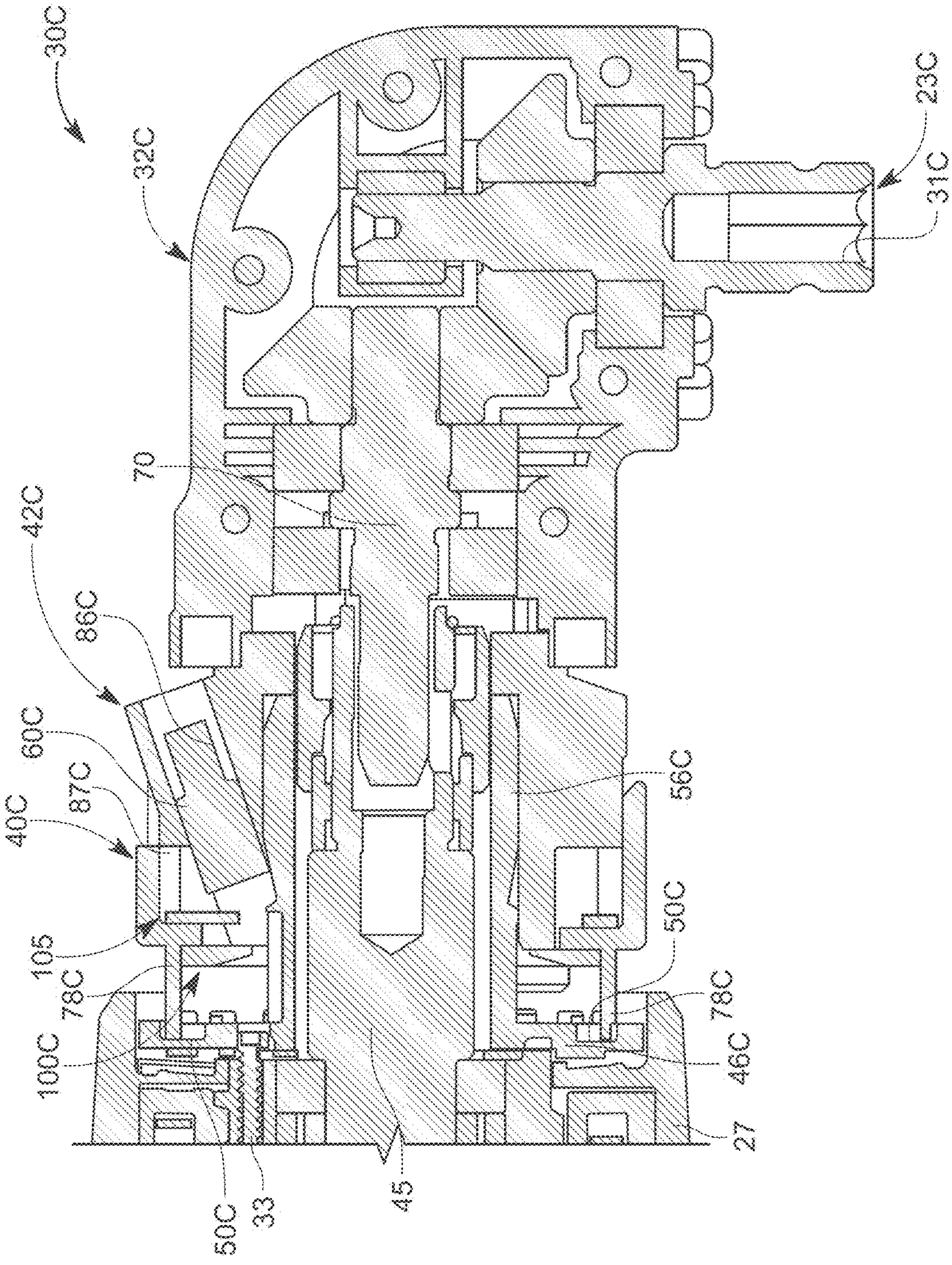
FIG. 76 shows a cross sectional view, in an axial direction, of tool head element of FIGS. 67 and 69 used in the power tool in accordance with an embodiment.
Figure 77:
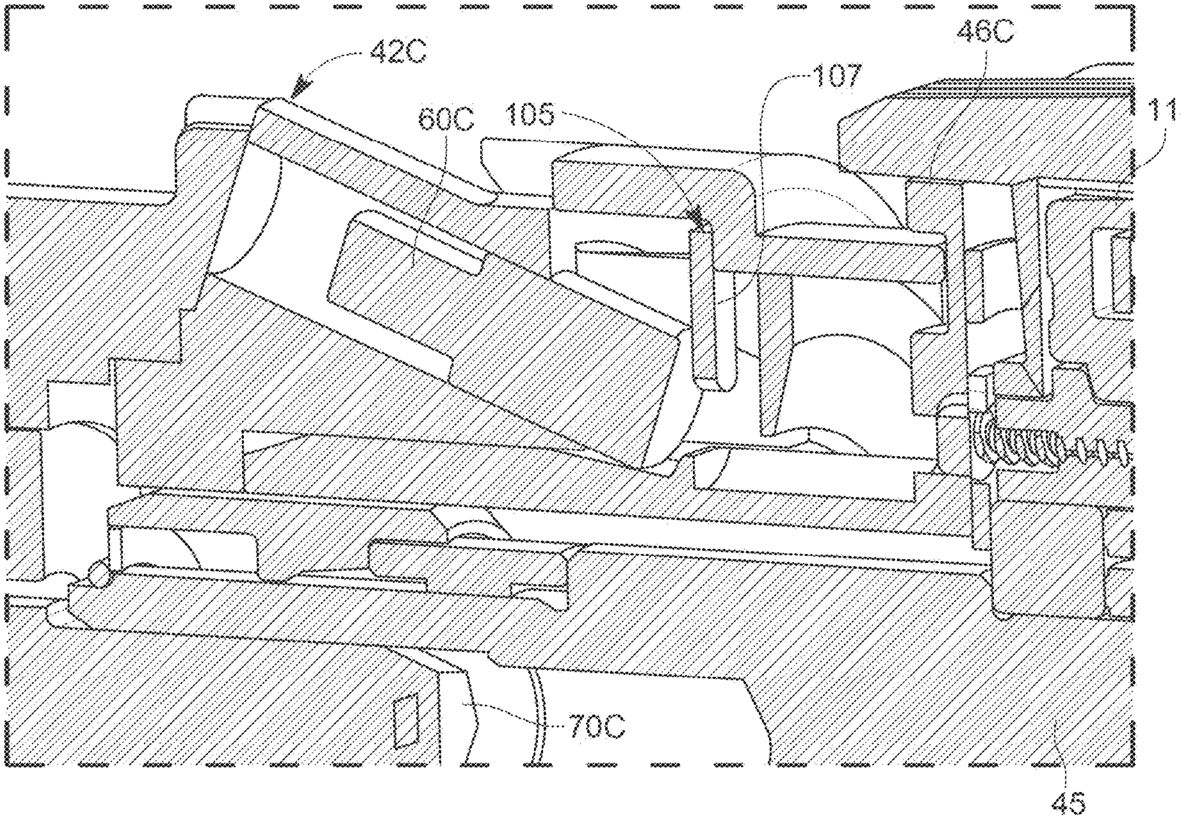
FIGS. 77-78 show detailed views of biasing elements in the pin cage of the tool head element in accordance with an embodiment.

The tool head element 30C may be releasably attached or selectively engaged to the universal head interface 44C. The cross-sectional view of FIG. 76 shows features and connection of the head interface 44C and tool head element 30C, in accordance with an embodiment. In the drawings, an exemplary embodiment of a right angle tool head element 30C is shown. That is, the tool head element 30C includes, within its housing 32C, a number of additional parts like a bearing arrangement to provide a right angle tool head wherein an opening 31C of tool bit holder portion 23 is provided at a right angle relative to the direction of the input shaft 70 and arrangement 45. However, these elements within the tool head element 30C are exemplary only and not intended to be limiting. That is, tool head element 30C may include any number of parts, including those discussed with regards to tool bit holder portion 23 of FIG. 1, such as chuck jaws, according to embodiments herein. Any number of different types of drill heads may be utilized with the tool head element 30C, including a standard chuck, hammer chuck, Right Angle bit holder, Offset bit holder, and Quick Release bit holder, and thus the illustrated embodiment is not limiting.

Turning now to features of the tool head element(s) 30C with pin locking attachment/connection, a backing surface 36C of tool head element 30C is provided by a cover or end cap 100C (also noted as a top plate 100C) connected to the body via pin cage 42C. Backing surface 36C of end cap 100B is designed for placement against a front surface of the flange 46C when attaching tool head element(s) 30C to the main body portion 11 of the power tool 10, which can be seen in FIG. 76, for example. As seen in FIG. 68, according to embodiments, end cap 100C includes a number of fastener holes 95C therein for receipt of fasteners 104C (e.g., screws; shown in FIG. 67) that are used to connect to tool part housing 32C. More specifically, fastener holes 95C are aligned with corresponding holes 161C in pin cage 42C that is within housing 32C, and fasteners are inserted through the aligned holes 95C, 161C. Any number of fasteners or holes may be utilized for attachment of the end cap 100C to the tool part housing 32C and the number shown in the Figures is not intended to be limiting. Backing surface 36C of end cap 100C also has a center opening 101C therethrough for providing access to the input shaft 70. Again as noted throughout this disclosure, input shaft 70 is configured to removably couple and effectively rotate with the spindle and bearings arrangement 54/output shaft 16 of the main body portion 11 when the trigger of the power tool 10 is activated. As previously described and thus not repeated in detail here, one end of the input shaft 70 (seen in FIG. 70, for example) is aligned and inserted into the opening of the spindle body 108/output shaft 16, while the other end tool bit holder portion 23 is provided at the opposite or other end of the tool part housing 32C and is accessible for use and/or further attachments through an opening 31C (see FIG. 76). Upon coupling the tool head element 30C as shown in FIG. 76 and providing power to the tool 10, speed and torque from spindle and bearings arrangement 45/output shaft 16 are applied/transferred to input shaft 70, e.g., for rotation thereof (and thus, rotation/movement of any tool, e.g., a drill bit/tool bit holder portion 23 attached to the tool head element 30C).

Figure 78:
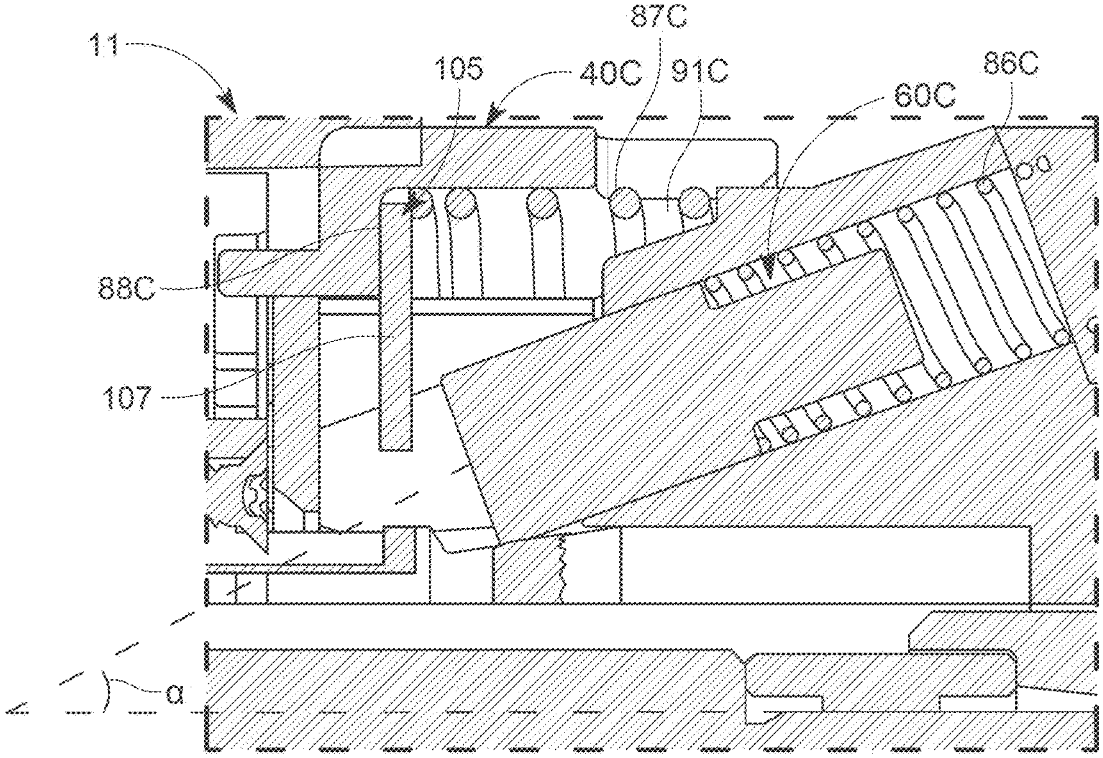

The top plate or end cap 100C is designed to assist in encapsulating parts within the tool head element 30C along with tool part housing 32C, for example, which is represented in FIGS. 68, 70-73, and 76. According to embodiments herein, the tool head element 30C includes the mechanisms for quick attachment and quick release of the tool head element from the main body portion, including, for example, collar 40C, push plate 105, pin cage 42C, and locking elements 60C. In embodiments, the collar 40C is attached or connected to the tool part housing 32 (see, e.g., FIG. 10A) via being trapped between the push plate spring(s) 87C, top plate 100C, and centered on the pin cage 42C. The collar 40 includes a number of locking elements 60C therein for locking the tool head element 32C to the main body portion 11 (via head interface 44C). In embodiments, the locking elements 60C may be pins or projection elements that are spring-loaded (e.g., spring-loaded angled pins). In an embodiment, the number of locking elements 60C is two or more. Any multiples of locking elements may be utilized; however, for illustrative purposes only, the drawings (e.g., see FIG. 68) note the use of three (3) locking elements 60C in the collar 40C. Generally, locking elements 60C are configured to move radially at an angle (relative to the axial direction or axis) inward and outward based on the forces (e.g., spring forces, or forces from the head interface 44C) applied thereto. In accordance with an embodiment, the angle at which the locking elements 60C are configured to move is an acute angle α relative to the axis A-A. More specifically, as shown in FIGS. 76 and 78, for example, the angle α may be less than ninety degrees. In embodiments, the angle α may be between approximately 20 degrees and approximately 75 degrees, inclusive. In embodiments, the angle α may be approximately 45 degrees. Further details regarding the locking elements 60C are discussed later below.

In accordance with embodiments, collar 40C has a wall that is generally circular or round and has a thickness extending in the axial direction. According to embodiments, as previously mentioned, the collar 40C includes teeth 78C (or castellations) on a first (back) end thereof, which are configured to engage corresponding receiving grooves 50C on the head interface 44C. The features described with reference to collar 40C similarly pertain here, and thus are not explicitly repeated. In embodiments, the collar 40C may be configured for axial and/or rotational movement about the axis A-A, without removing the tool head element 30C off of the head interface 44, to rotate a position of the tool head element 30C to allow a user to change to different rotational positions when needed in order to adjust an angle of the drill, tool, etc. while working, for example, as noted previously.

Also provided in the collar 40C are a push plate 105 and push plate springs 87C, as seen in FIG. 78, for example. Push plate 105 is provided in between end cap 100C and pin cage 42C. Push plate springs 87C are provided between a back surface of the pin cage 42C and the push plate 105 and engage surfaces thereof. Accordingly, push plate springs 87C are configured to bias the collar 40C in an outmost axial position, or a first collar position, relative to the tool part housing 32*c* by pushing on push plate 105, which in turn pushes collar 40 (e.g., on a radial inner edge surface 88C) into the first collar position.

Push plate 105 is a generally circular plate with a central opening therein, designed for placement around an inner edge of the collar 40C (e.g., around the opening 101C and behind the end cap 100C). Push plate 105 includes a number of radially extending leg portions 107 (see, e.g., FIGS. 71, 72 and 78) extending towards the axis A-A, i.e., extending radially towards a center axis. The radially extending leg portions 107 are each configured to extend a length into the pin cage 42C of tool part housing 32 such that at least a portion of the ends thereof are configured to create an interference that prevents the pins 60C from sliding past. In embodiments, the leg portions 107 are also configured to selectively engage a bottom end of locking elements/spring-loaded angled pins 60C. For example, such radially extending leg portions 107 are designed for cooperation with and for guiding the locking elements 60C during axial movement of the collar 40C; that is, during attachment or removal the tool head element 30C to/from the main body portion. Any number of radially extending leg portions 107 may be utilized; however, for illustrative purposes only, the drawings (e.g., see FIGS. 71-72) show the use of three (3) radially extending leg portions 107 for three (3) locking elements 60C of the collar 40C. At rest or a default state when the tool head element 30C is not engaged with the main body portion 11, each of the radially extending leg portions 107 are adjacent to or engaged to sit on a bottom part of each locking element 60C (see FIG. 79). When the tool head element 30C is locked into the universal head interface 44C, the radially extending leg portions 107 may be spaced therefrom (see FIG. 80). When disengaging or unlocking the tool head element 30C, the radially extending leg portions 107 are brought into engagement with the bottom parts of the locking elements 60C to compress springs associated with the locking elements 60C, which is described later below.

Figure 74:
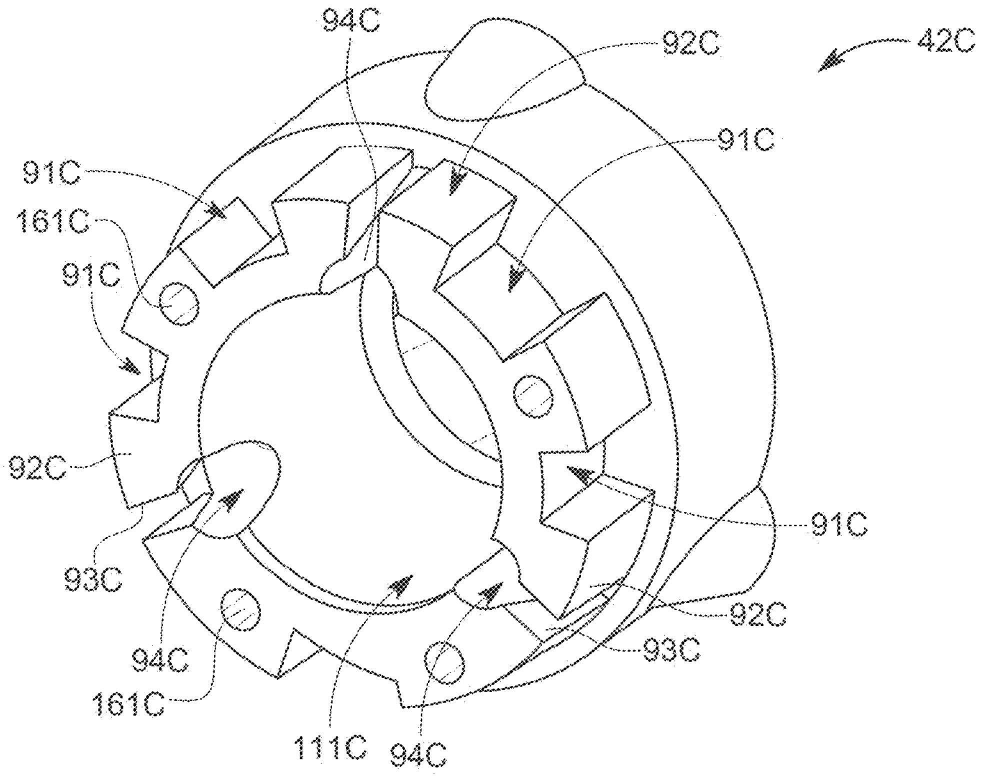
FIGS. 74-75 illustrate first isometric and second isometric views of a pin cage of the tool head element of FIGS. 67 and 70-73 in accordance with an embodiment.
Figure 75:
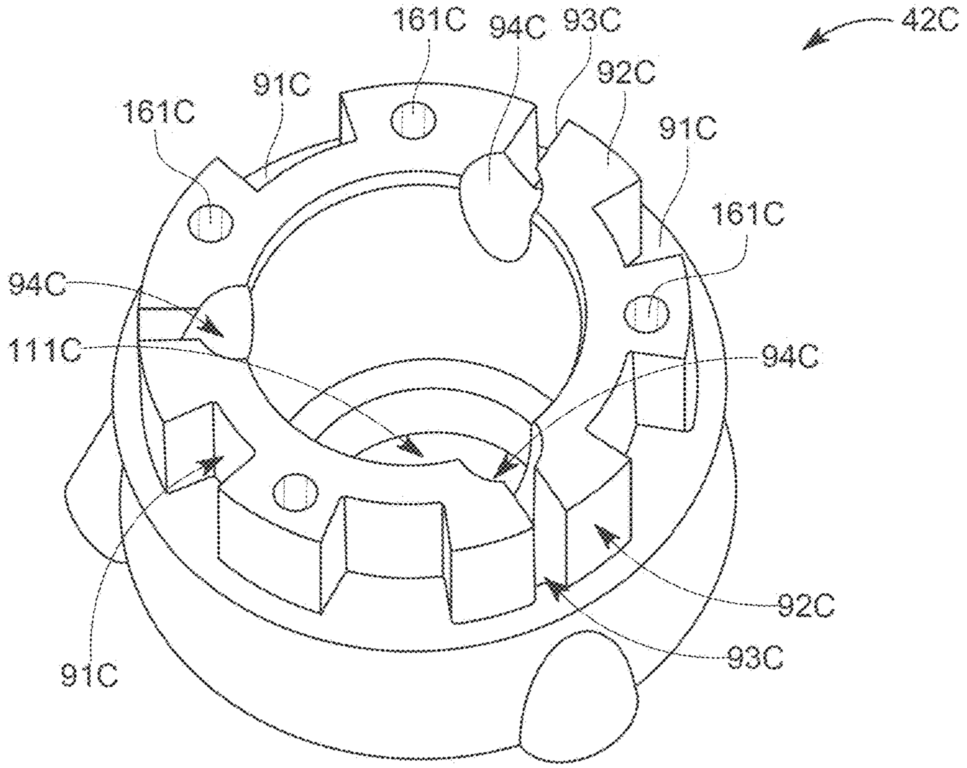

Locking elements 60 are provided in pin cage 42C, which is shown in FIGS. 74 and 75. Pin cage 42C may have a central opening 111C therein to accommodate the shafts 108 (16) for connecting. In embodiments, the central opening 111C also accommodates one or more bearings configured for rotation therein. Such bearings may be connected to an end of the input shaft 70 of the tool head element 30. A diameter of this central opening may be used to pilot the tool head interface 30C onto the universal head interface 44C. In embodiments with bearings such bearings may be connected the shaft 108 (16) as well. A back surface of the pin cage 42C optionally includes a number of fastener holes in a back surface thereof for receipt of fasteners (e.g., screws) that are used to connect the parts of the tool part housing 32, including a housing that contains a bearing arrangement and part of input shaft 70 as shown in FIG. 76, for example. In embodiments, the pin cage 42C is press-fit onto the housing 32C and contained thereon via fasteners 78C, which are inserted through top plate or end cap 100C.

Figure 71:
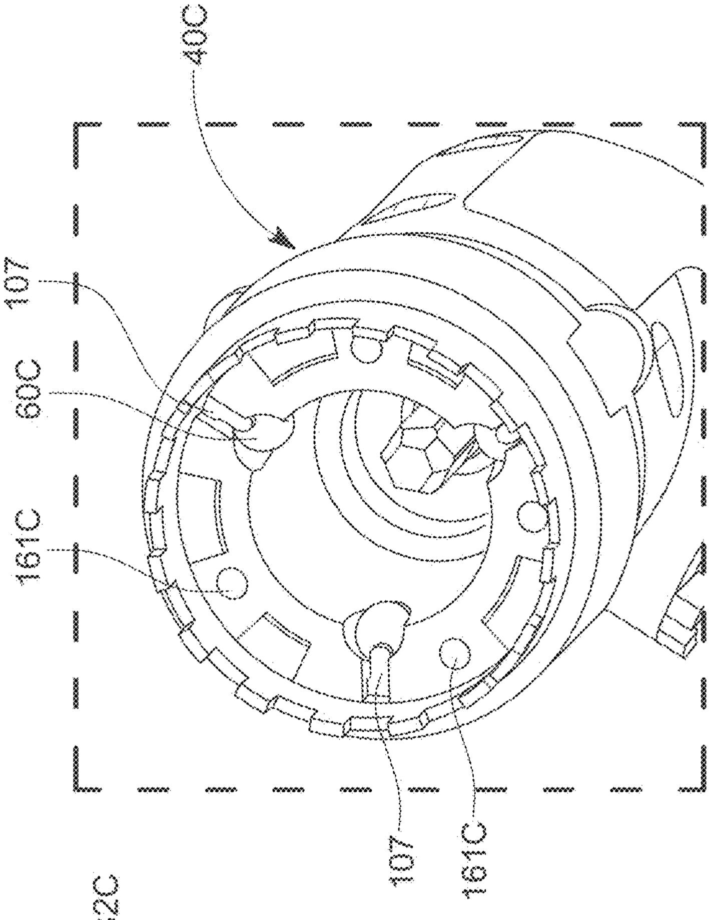
FIGS. 70-73 show assembly steps of parts of the tool head element of FIG. 67 in accordance with an embodiment.
Figure 70:
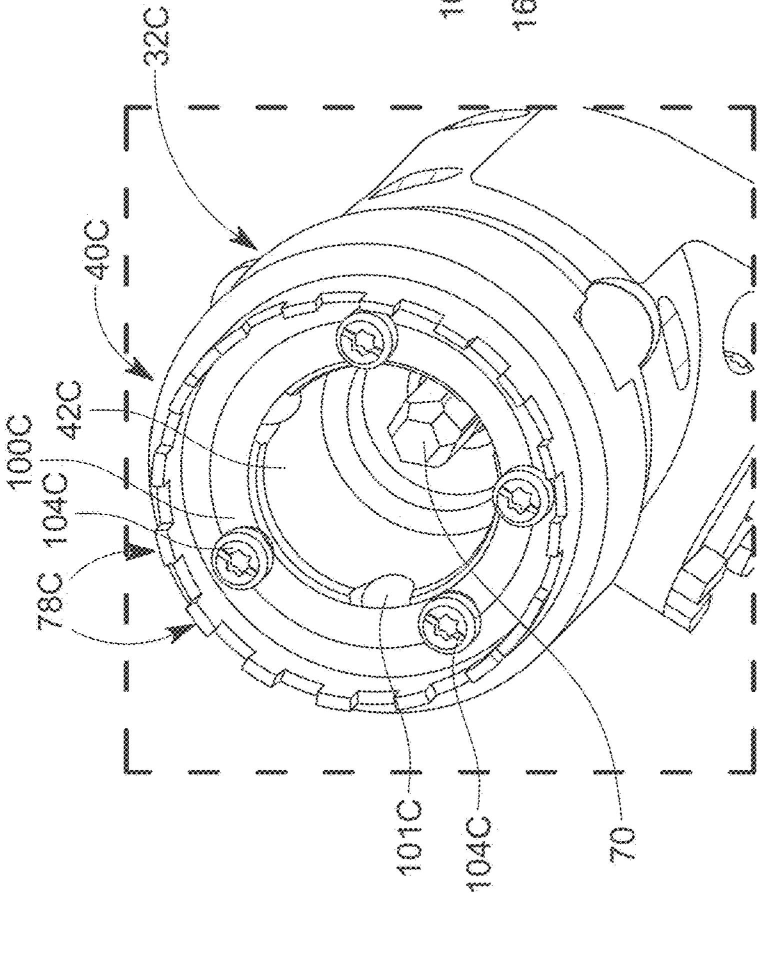
Figure 73:
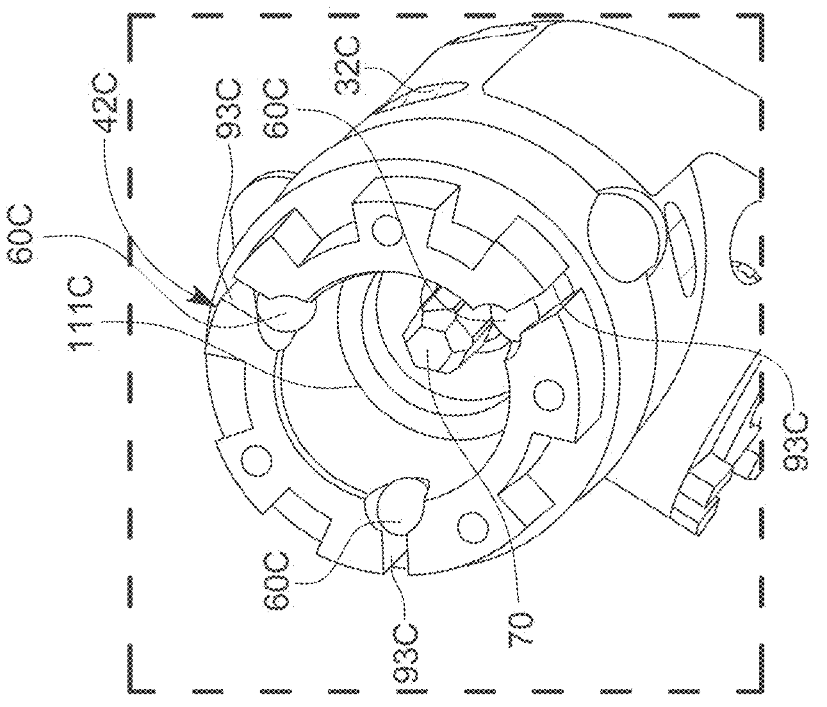

According to embodiments, a front surface of the pin cage 42C has grooves 91C, extension parts 92C, slots 93C, and pockets 94C, shown in FIGS. 73-75. Grooves 91C are provided in between extension parts 92C spaced around the front surface for receipt of push plate springs 87C therein. That is, push plate springs 87C are configured to extend between a back surface of push plate 105 and into the grooves 91C of pin cage 42C. Extension parts 92C are provided for extending and providing a connection with end plate 100C. That is, on the front surface of pin cage 42C there may be a number (e.g., three) of corresponding holes 161C (see FIGS. 74-75) in the extension parts 92C. As noted, these corresponding holes 161C may be used for alignment with fastener holes 95C on end cap 100C to receive fasteners 104C (e.g., screws) to connect to tool part housing 32C. More specifically, as shown in FIG. 71, collar 40C may be placed over the pin cage 42 and push plate 105 assembly of FIG. 72. The end cap 100C may then be placed against the collar 40C and over the pin cage 42C. As shown in FIG. 70, the end cap 100C may then be secured via fasteners 104C to secure all parts in the tool head element 30C.

Figure 72:
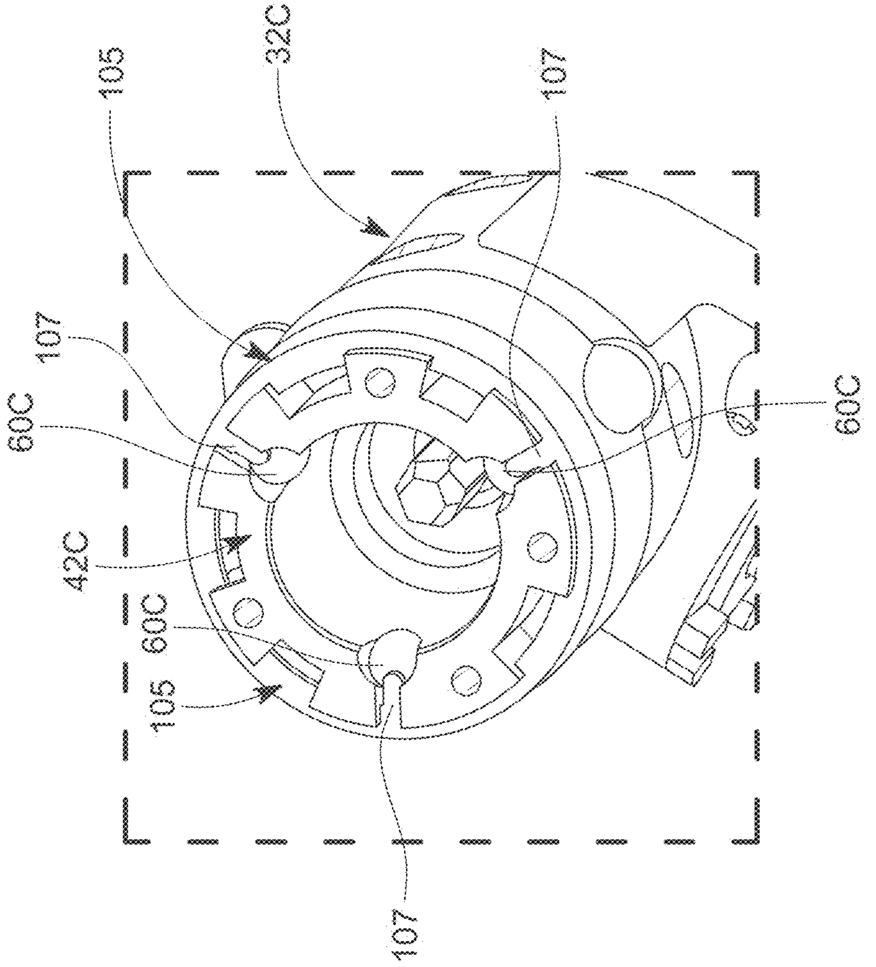

Pockets 94C of pin cage 42C are formed at an angle relative to a center (e.g., axis A-A) of the pin cage 42C and include radially extending slots 93C extending through the extension parts 92C. Radially extending slots 93C are configured for receipt of radially extending leg portions 107 of push plate 105 in assembly, which is shown in FIG. 72, for example. A front surface of the pin cage 42C engages part of the tool part housing 32C, shown in FIG. 76, for example. Pin cage 42C has a back end surface allowing for the push plate 105 to be aligned and stacked on top (see FIG. 72), such that the leg portions 107 extend into slots 93C and are in alignment with bottom parts of the locking elements 60C. Each of the pockets 94C of pin cage 42C allows movement or travel of a corresponding locking element 60C during locking of the tool head element 30C onto the head interface 44C. Each pocket 94C also includes receives a biasing element 86C therein. In particular, FIG. 78 shows an example of pocket 94 in the form of a channel used to hold each biasing element 86C. As visible in FIG. 78, a least part of the leg portion 107 is aligned relative to a bottom end of the locking pin 60C, while a top end of the locking pin 60C is biased relatively forward, i.e., biased towards the center, via biasing element 86C provided in each pocket 94 and in contact with the locking pin 60C. As will be understood, each of the locking pins 60C are able to extend and retract in the pockets 64C of the tool head element 30C, and are spring loaded into an extended position at rest. An opposite end of each biasing element 86 is in contact with an end wall formed at the end of each pocket 94C of the pin cage 42C. Accordingly, each locking element 60C may be biased inwardly towards the center by biasing elements 86C provided in pin cage 42C, according to embodiments herein.

Figures 79, 80, 81:
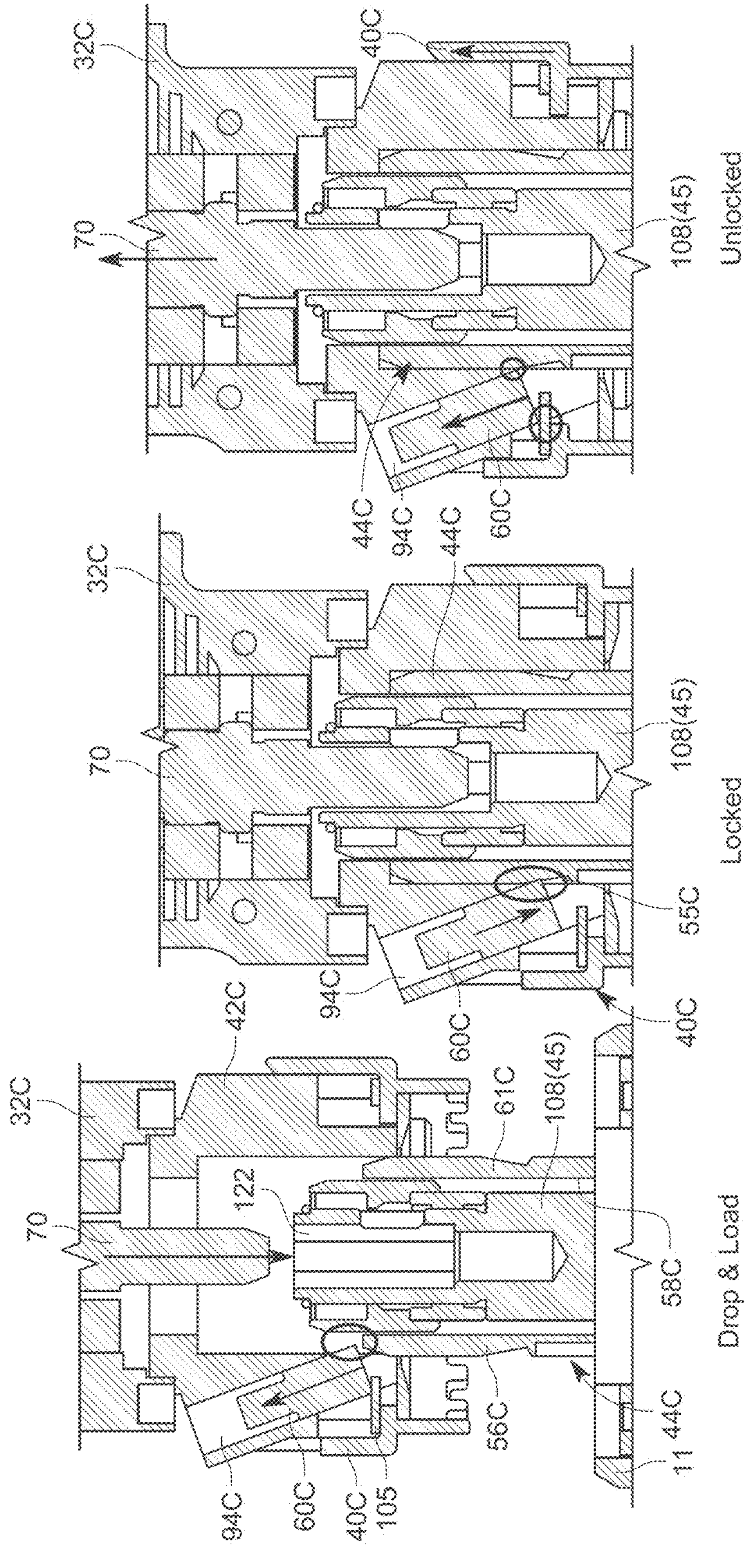
FIGS. 79-81 show a process of assembling and mounting the collar and its contained parts of tool head element of FIG. 67 onto head interface of FIG. 66 in accordance with an embodiment.

In assembly, spring-loaded angled pins or locking elements 60C in the body of the tool head element 30C are spring loaded via biasing springs 86C to provide a drop in load attachment that locks into place, once the spring-loaded angled pins 60C are pushed past a main outer diameter of the universal head attachment 44C of the main body portion 11 (tool side). FIGS. 79-81 show cross-sectional views of a process for assembling or locking a tool head element 30C onto a main body portion 11 of the power tool in accordance with an embodiment. FIG. 79 shows a detached tool head element 30C aligned with the universal head interface 44C for dropping and loading onto the universal head interface 44C secured to main body portion 11. In the detached state, the collar 40C is displaced towards the end cap 100C in the first collar position, away from tool head housing 32C, via push plate springs 87C (not shown in FIG. 79), into a first, unlocked position. Springs or biasing elements 86C are also at rest, pushing locking elements 60C towards the push plate 105.

The attachment of the tool head element 30C onto the head interface 44C is configured to occur in a first axial direction (along axis A-A). A user aligns and applies a pushing force to the tool head element 30C, i.e., pushing the tool head element 30C towards and onto the head interface 44C and thus the main body portion 11. During this action, as shown by the downward arrow in FIG. 79, as the tool head element 30C is pushed onto the universal head interface 44C, the universal head interface 44C is moved into the housing 32C. The leading flat edge 61C of universal head interface 44C is moved into contact with the bottom parts of the locking elements 60C in pin cage 42C and pushes the locking elements 60C within the pockets 94C, as indicated by arrow P. As the locking elements 60C are pushed in this direction, the biasing elements 86C are loaded or compressed within the pockets 94C. Further, the input shaft 70 is aligned with second end 118 such that it may be locked for rotation onto the spindle 108/output shaft 16. Moreover, as the universal head interface 44C is moved forward, teeth 78C (or castellations) on the first (back) end of the collar 40C are configured to engage corresponding receiving grooves 50C on the head interface 44C.

As shown in FIG. 80, once locked, the locking pins 60C are spring-loaded via biasing elements 86C into the universal head interface 44C. In particular, due to the spring force of the biasing elements 86C in pockets 94C being compressed during movement of the tool head element 30 onto the main body portion 11, once fully assembled, the biasing elements 86C preload bottom surfaces of the locking pins 60C against tapered groove 55C of the stationary shaft 56C of universal head element 44C when the tool head element 30C is fully seated. Accordingly, the force from the springs/biasing elements 86C pushes the locking pins 60C against the universal head interface 44C thereby holding the tool head element 30C in the locked state. While in the locked position, the pins 60C remain in contact with the head component 44C due to biasing elements 86C (or springs) in the pin pockets 94C. Also, when the tool head element 30C is attached to the main body portion 11, input shaft 70 is configured to removably couple and effectively rotate with the spindle and bearings arrangement 45/output shaft 16 of the main body portion 11 when the trigger of the power tool 10 is activated. As previously described (and thus not repeated in detail here), one end of the input shaft 70 (seen in FIG. 50) is aligned and inserted into the receiving opening 122 of the spindle body 108, while at the other or opposite end of the input shaft 70 or tool head element 30C is tool bit holder portion 23 which is accessible for use (with or without bearing arrangement therein for providing a right angle tool) and/or further attachments.

Pulling on the collar 40C in a second axial direction (along axis A-A) away from the main body portion 11, as depicted by the upward arrow in FIG. 81, enables unlocking of the tool head element 30C, accordingly allowing a user to impart rotation and/or removal of the tool head element 30C relative to the main body portion 11 of the tool. As the outer collar 40C is moved towards the second collar position towards the front, i.e., away from the main body portion 11, the spring force of biasing springs 86C is overcome. The leg portions 107 of push plate 105 within collar 40C are moved into contact with locking pins 60C and thus compress push plate springs 87C and biasing springs 86C simultaneously. Thus, the locking pins 60C are moved away or retracted from the universal head interface 44C into a retracted position within the pockets 94C, thereby pushing the pins back outside the outer diameter of the universal head interface of main body portion 11 (and compressing the biasing springs 86C). Accordingly, the tool head element 30C is unlocked for rotation and/or removal from the universal head interface 44C.

Figure 83:
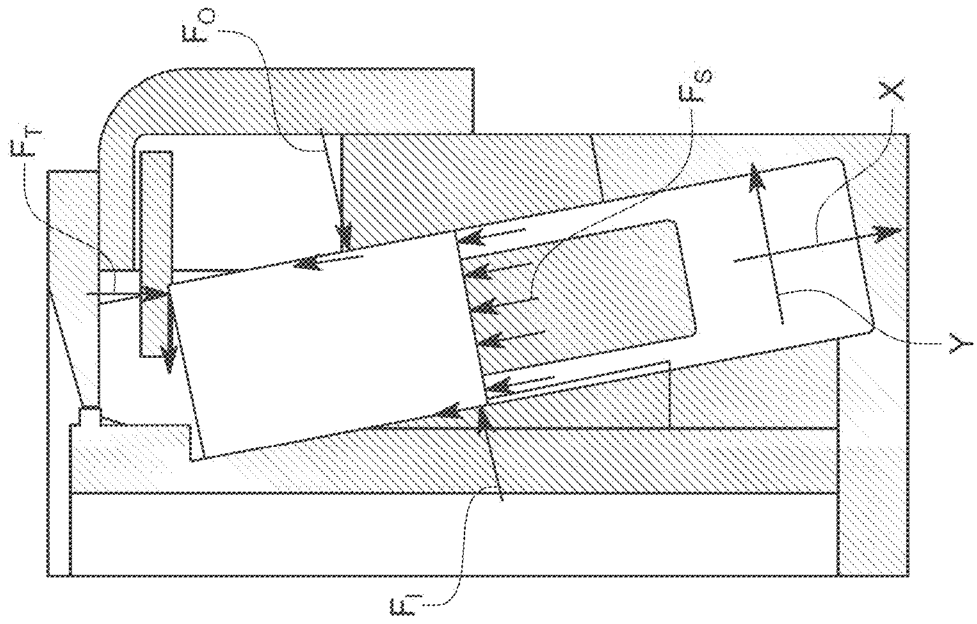
FIGS. 82-83 show, in cross sectional views, force diagrams on locking elements during assembly and disassembly, respectively, of the tool head element onto the main body portion, in accordance with an embodiment.
Figure 82:
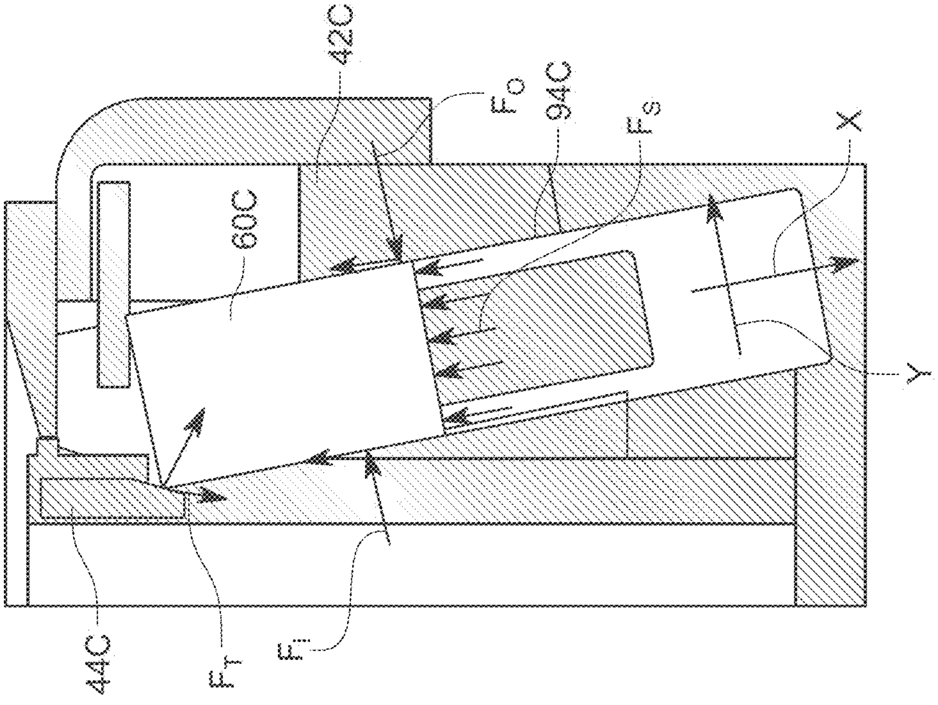

FIGS. 82-83 show, in cross sectional views, force diagrams of the forces and vectors on the locking elements 60C during insertion or assembly and during removal or unlocking/disassembly, respectively, of the tool head element 30C onto the main body portion 11, in accordance with an embodiment.

FIG. 82 illustrates a force diagram of the forces applied during insertion or the drop and load action for attaching the tool head element 30C to the main body portion 11. As shown, during pushing action of the tool head element 30C, the locking elements 60C apply a force FT onto head interface 44C due to a biasing force Fs from the biasing elements 86C being applied thereto in the angled direction (or diagonal direction) (labeled as X direction). The force FT is applied at an angle. Forces Fo and Fi from the pocket 94 (labeled as Y direction) are applied to the locking elements 60C as well.

FIG. 83 illustrates a force diagram of the forces applied during removal and unlocking of the tool head element 30C from the main body portion 11. As shown, during pulling action of the tool head element 30C, i.e., pushing the pins 60C using the movement of the collar 40C, the locking elements 60C receive a force FT thereon in at least the axial direction from the push plate 105, as well as forces Fo and Fi from the pocket 94 as the pins 60C are moved against the biasing force FS of the springs 86C in the angled direction (or diagonal direction).

Accordingly, in an exemplary alternate embodiment, a spring loaded pin locking mechanism is shown and incorporated into the tool head element 30C for quick release and attachment to the tool main body portion 11. A user is able feel the movement of the collar when overcoming spring forces. It provides a static attachment method that removes compliance from the attachment interface. When the tool head element 30 is bottomed out on the front of the head interface 44, the pins 60C are preloaded into contact with the head interface 44C to ensure a static retention. Also, collar castellations 78C maintain ability to change the tool head element 30C position without full removal. Angles on pin cage 42C and head interface 42C ensures contact while maintaining the ability to have modular quick release collar. Also, no action is needed from the user other than pushing the head element onto, or off of, the base unit/main body portion.

Accordingly, it should be understood that, according to embodiments herein, this disclosure provides a power tool including: a housing; a motor and transmission assembly received in the housing; a trigger for activating the motor and transmission assembly; an output shaft driven by the motor and transmission assembly via a back end thereof for rotation about an axis; a head interface coupled to a forward end of the output shaft, the head interface including a mating surface and a circumferential groove; a tool head element configured for selective engagement on the head interface, the tool head element including: a housing including an input shaft configured to removably couple with the output shaft; and a collar having a plurality of locking elements, each locking element being biased inwardly towards the input shaft by biasing elements; wherein, upon attachment of the tool head element to the head interface, the plurality of locking elements are aligned into the circumferential groove of the head interface and held by the biasing elements therein to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

In exemplary embodiments, the attachment of the tool head element onto the head interface is configured to occur in a first axial direction and wherein the plurality of locking elements are configured to be guided along the mating surface of the head interface so that the locking elements are configured to slide outwardly relative to the input shaft and against force from the biasing elements until the plurality of locking elements are aligned with and forced into the circumferential groove via the biasing elements.

In exemplary embodiments, removal of the tool head element from the head interface is configured to occur in a second axial direction that is opposite to the first axial direction, and wherein the collar is configured for axial movement between a first collar position and a second collar position, such that the axial movement of the collar results in a force that pushes the plurality of locking elements relatively outwardly from the circumferential groove and against forces of the biasing elements, thereby enabling movement of the tool head element axially away from the head interface.

According to exemplary embodiments herein, the collar further includes at least one ramped surface and wedging element therein extending radially towards a center thereof for pushing the plurality of locking elements relatively outwardly from the circumferential groove and against forces of the biasing elements.

In exemplary embodiments, the biasing elements are torsion springs.

In exemplary embodiments, the circumferential groove is provided axially behind the mating surface.

In exemplary embodiments, the plurality of locking elements includes pins or rolling elements.

In exemplary embodiments, the mating surface extends circumferentially around a bore in the head interface that is configured to receive the output shaft therein.

In exemplary embodiments, the mating surface of the head interface is a tapered surface or chamfered surface. According to non-limiting and exemplary embodiments herein, when a taper surface is included, the tapered surface is provided at an angle of about 45 degrees relative to the axis.

In exemplary embodiments, the tool head element further includes a housing with a backing plate and biasing elements positioned between the collar and the backing plate.

In exemplary embodiments, the collar further includes teeth configured to engage corresponding receiving grooves on the head interface; wherein, the collar is configured for linear movement in an axial direction for disengagement of the tool head element from the head interface and wherein the collar is further configured for rotational movement about the axis, without removing the tool head element off of the head interface, to rotate a position of the tool head element via withdrawing the teeth from the receiving grooves and rotationally repositioning the teeth into the receiving grooves.

In exemplary embodiments, in the power tool, the input shaft comprises a hex shaped interface.

In exemplary embodiments, in the power tool, the head interface is coupled to the output shaft via a spindle and bearings arrangement, a first end of the spindle and bearings arrangement being configured for insertion into an opening in the housing for attachment to the forward end of the output shaft and a second end of the spindle and bearings arrangement being configured for insertion into a bore of the head interface.

It should also be understood that, according to embodiments herein, this disclosure provides a power tool including: a housing; a motor and transmission assembly received in the housing; a trigger for activating the motor and transmission assembly; an output shaft driven by the motor and transmission assembly via a back end thereof for rotation about an axis; a head interface coupled to a forward end of the output shaft, the head interface including a mating surface; a tool head element configured for selective engagement on the head interface, the tool head element including: a housing including an input shaft configured to removably couple with the output shaft; and a collar having at least one locking element; wherein, upon attachment of the tool head element to the head interface, the at least one locking element is aligned onto the head interface and held by the at least one locking element to engage the tool head element onto the head interface and establish a drive connection between the output shaft and input shaft such that, when the motor and transmission assembly of the power tool is operated, the input shaft is configured to rotate with the output shaft about the axis and thus drive the tool head element.

In exemplary embodiments, the attachment of the tool head element onto the head interface is configured to occur in a first axial direction and wherein the at least one locking element is configured to be guided along the mating surface of the head interface so that the at least one locking element is configured to slide outwardly relative to the input shaft.

In exemplary embodiments, removal of the tool head element from the head interface is configured to occur in a second axial direction that is opposite to the first axial direction, and wherein the collar is configured for axial movement between a first collar position and a second collar position, such that the axial movement of the collar results in a force that pushes the at least one locking element relatively outwardly, thereby enabling movement of the tool head element axially away from the head interface.

In exemplary embodiments, the collar includes biasing elements therein configured to bias the at least one locking element in a locking direction.

In exemplary embodiments, the at least one locking element includes at least one magnet.

In exemplary embodiments, the at least one locking element is a plurality of locking elements in the form of balls.

In exemplary embodiments, the at least one locking element is a plurality of locking elements comprising pins or rolling elements.

In exemplary embodiments, the tool head element further includes a housing with a backing plate or cover and the at least one locking element is positioned between the collar and the backing plate, the at least one locking element configured to move within a housing of the tool head element.

In exemplary embodiments, the collar is further configured for rotational movement about the axis, without removing the tool head element off of the head interface, to rotate a position of the tool head element via withdrawing teeth from receiving grooves and rotationally repositioning the teeth into the receiving grooves.

In exemplary embodiments, the head interface includes as part of the mating surface a plurality of magnets therein.

In exemplary embodiments, the at least one magnet is a magnetic ring.

In exemplary embodiments, the collar further includes at least one ramped surface therein for moving elements within the collar as the collar is rotated.

In exemplary embodiments, the head interface includes as part of the mating surface a plurality of ball-receiving pockets therearound.

In exemplary embodiments, the tool head element further includes a pin cage for holding pins or rolling elements, and wherein the pins or rolling elements are biased via biasing springs within the pin cage to a locking position.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A power tool comprising:

a housing;

a motor and transmission assembly received in the housing;

a trigger for activating the motor and transmission assembly;

an output shaft driven by the motor and transmission assembly for rotation about an axis;

a head interface coupled to the output shaft, the head interface;

a tool head element configured for selective engagement on the head interface, the tool head element comprising:

a housing including an input shaft configured to removably couple with the output shaft; and a collar comprising at least one lock;

wherein, upon attachment of the tool head element to the head interface, the at least one lock is locked onto the head interface and held to engage the tool head element onto the head interface and establish a drive connection between the output shaft and input shaft such that, when the motor and transmission assembly of the power tool is operated, the input shaft is configured to rotate with the output shaft about the axis and thus drive the tool head element, wherein the collar includes biasing elements therein configured to bias the at least one lock in a locking direction.

2. The power tool according to claim 1, wherein the attachment of the tool head element onto the head interface is configured to occur in a first axial direction, wherein the head interface comprises a mating surface, and wherein the at least one lock is configured to be guided along the mating surface of the head interface so that the at least one lock is configured to slide outwardly relative to the input shaft.

3. The power tool according to claim 2, wherein removal of the tool head element from the head interface is configured to occur in a second axial direction that is opposite to the first axial direction, and wherein the collar is configured for axial movement between a first collar position and a second collar position, such that the axial movement of the collar results in a force that pushes the at least one lock relatively outwardly, thereby enabling movement of the tool head element axially away from the head interface.

4. The power tool according to claim 1, wherein the at least one lock comprises at least one magnet.

5. The power tool according to claim 4, wherein the head interface comprises a plurality of magnets therein.

6. The power tool according to claim 5, wherein the at least one magnet is a magnetic ring.

7. The power tool according to claim 4, wherein the collar further comprises at least one ramped surface therein for moving elements within the collar as the collar is rotated.

8. The power tool according to claim 1, wherein the at least one lock is a plurality of locks in the form of balls.

9. The power tool according to claim 8, wherein the head interface comprises a plurality of ball-receiving pockets therearound.

10. The power tool according to claim 1, wherein the input shaft comprises a hex shaped interface.

11. The power tool according to claim 1, wherein the head interface is coupled to the output shaft via a spindle and bearings arrangement, a first end of the spindle and bearings arrangement being configured for insertion into an opening in the housing for attachment to the output shaft and a second end of the spindle and bearings arrangement being configured for insertion into a bore of the head interface.

12. A power tool comprising:

a housing;

a motor and transmission assembly received in the housing;

a trigger for activating the motor and transmission assembly;

an output shaft driven by the motor and transmission assembly for rotation about an axis;

a head interface coupled to the output shaft, the head interface;

a tool head element configured for selective engagement on the head interface, the tool head element comprising:

a housing including an input shaft configured to removably couple with the output shaft; and a collar comprising at least one lock;

wherein, upon attachment of the tool head element to the head interface, the at least one lock is locked onto the head interface and held to engage the tool head element onto the head interface and establish a drive connection between the output shaft and input shaft such that, when the motor and transmission assembly of the power tool is operated, the input shaft is configured to rotate with the output shaft about the axis and thus drive the tool head element, wherein the at least one lock is a plurality of locks comprising pins or rolling elements.

13. The power tool according to claim 12, wherein the tool head element further comprises a pin cage for holding the pins or rolling elements, and wherein the pins or rolling elements are biased via biasing springs within the pin cage to a locking position.

14. A power tool comprising:

a housing;

a motor and transmission assembly received in the housing;

a trigger for activating the motor and transmission assembly;

an output shaft driven by the motor and transmission assembly for rotation about an axis;

a head interface coupled to the output shaft, the head interface;

a tool head element configured for selective engagement on the head interface, the tool head element comprising:

a housing including an input shaft configured to removably couple with the output shaft; and a collar comprising at least one lock;

wherein, upon attachment of the tool head element to the head interface, the at least one lock is locked onto the head interface and held to engage the tool head element onto the head interface and establish a drive connection between the output shaft and input shaft such that, when the motor and transmission assembly of the power tool is operated, the input shaft is configured to rotate with the output shaft about the axis and thus drive the tool head element, wherein the tool head element further comprises a housing with a backing plate or cover and the at least one lock is positioned between the collar and the backing plate, the at least one lock configured to move within a housing of the tool head element.

15. A power tool comprising:

a housing;

a motor and transmission assembly received in the housing;

a trigger for activating the motor and transmission assembly;

an output shaft driven by the motor and transmission assembly for rotation about an axis;

a head interface coupled to the output shaft, the head interface;

a tool head element configured for selective engagement on the head interface, the tool head element comprising:

a housing including an input shaft configured to removably couple with the output shaft; and a collar comprising at least one lock;

wherein, upon attachment of the tool head element to the head interface, the at least one lock is locked onto the head interface and held to engage the tool head element onto the head interface and establish a drive connection between the output shaft and input shaft such that, when the motor and transmission assembly of the power tool is operated, the input shaft is configured to rotate with the output shaft about the axis and thus drive the tool head element, wherein the collar is further configured for rotational movement about the axis, without removing the tool head element off of the head interface, to rotate a position of the tool head element via withdrawing teeth from receiving grooves and rotationally repositioning the teeth into the receiving grooves.

* * * * *